United States Patent
Arai et al.

(10) Patent No.: US 10,100,134 B2
(45) Date of Patent: Oct. 16, 2018

(54) METHOD FOR MANUFACTURING POLYMER COMPOUND

(71) Applicant: TOKYO OHKA KOGYO CO., LTD., Kawasaki-shi (JP)

(72) Inventors: Masatoshi Arai, Kawasaki (JP); Yoshitaka Komuro, Kawasaki (JP); Akiya Kawaue, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/369,471

(22) Filed: Dec. 5, 2016

(65) Prior Publication Data
US 2017/0166664 A1 Jun. 15, 2017

(30) Foreign Application Priority Data
Dec. 15, 2015 (JP) ................. 2015-244592

(51) Int. Cl.
| | |
|---|---|
| *C08F 8/00* | (2006.01) |
| *C08F 220/18* | (2006.01) |
| *C08F 228/00* | (2006.01) |
| *C08F 224/00* | (2006.01) |
| *C08F 230/08* | (2006.01) |

(52) U.S. Cl.
CPC .............. *C08F 8/00* (2013.01); *C08F 220/18* (2013.01); *C08F 224/00* (2013.01); *C08F 228/00* (2013.01); *C08F 2230/085* (2013.01)

(58) Field of Classification Search
CPC .............. C08F 8/00; C08F 2230/085
See application file for complete search history.

(56) References Cited

U.S. PATENT DOCUMENTS

| | | | | |
|---|---|---|---|---|
| 5,683,856 A | * | 11/1997 | Aoai ................ | G03F 7/0045 430/270.1 |
| 6,365,321 B1 | * | 4/2002 | Chen ................ | G03F 7/0045 430/270.1 |
| 2004/0110085 A1 | | 6/2004 | Iwai et al. | |
| 2012/0202153 A1 | * | 8/2012 | Hatakeyama ........ | G03F 7/0045 430/283.1 |

FOREIGN PATENT DOCUMENTS

| | | |
|---|---|---|
| JP | A-2003-241385 | 8/2003 |
| JP | A-2009-025707 | 2/2009 |

OTHER PUBLICATIONS

Ito, Journal of Polymer Science: Part A: Polymer Chemistry, vol. 38, p. 2415-2427 (2000) (Year: 2000).*

* cited by examiner

*Primary Examiner* — Robert C Boyle
(74) *Attorney, Agent, or Firm* — Knobbe Martens Olson & Bear LLP

(57) ABSTRACT

A method for manufacturing a polymer compound which has a constituent unit (a10) which includes a hydroxy group and a constituent unit (a1) which includes an acid decomposable group of which a polarity increases due to an effect of an acid, the method including copolymerizing a monomer for deriving a constituent unit (a0) which includes a group which protects a phenolic hydroxyl group or a hydroxy group of a carboxy group with an organic silicon compound and a monomer for deriving the constituent unit (a1) and obtaining a prepolymer which has the constituent unit (a0) and the constituent unit (a1), and selectively deprotecting the constituent unit (a0) by reacting a compound which has a fluoride anion with the prepolymer and obtaining a polymer compound which has the constituent unit (a10) and the constituent unit (a1).

2 Claims, No Drawings

METHOD FOR MANUFACTURING POLYMER COMPOUND

RELATED APPLICATION

This application claims priority to Japanese Patent Application No. 2015-244592, filed Dec. 15, 2015, the contents of which are incorporated herein by reference.

BACKGROUND OF THE INVENTION

Field of the Invention

The present invention relates to a method for manufacturing a polymer compound.

Description of Related Art

In lithographic techniques, for example, a step of forming a resist pattern in a predetermined form on a resist film is performed by forming a resist film which is formed of a resist material on a substrate, selectively exposing the resist film via a mask on which a predetermined pattern is formed to radioactive rays such as light or electron beams, and carrying out a development process thereon.

A resist material in which an exposed portion changes to have a characteristic of being dissolved in a developing solution is called a positive type material and a resist material in which an exposed portion changes to have a characteristic of not being dissolved in a developing solution is called a negative type material.

In recent years, pattern refinement in the manufacturing of semiconductor elements or liquid crystal display elements has rapidly progressed due to the development of lithographic techniques.

As a refinement method, the wavelength of the exposure light source is generally shortened (the energy is increased).

In detail, ultraviolet rays which are represented by g-line and i-line are used in the prior art; however, currently, the mass production of semiconductor elements using KrF excimer lasers or ArF excimer lasers has started. In addition, research is also being undertaken into electron beams, extreme ultra violet rays (EUV), X-rays, or the like which have a shorter wavelength (higher energy) than these excimer lasers.

Lithographic characteristics such as sensitivity with respect to these exposure light source and resolution which is able to reproduce a pattern with fine dimensions are required for resist material.

As a resist material which satisfies these demands, a chemical amplification type resist composition which contains an acid generating agent component which generates an acid upon exposure to light and a base material component of which the solubility with respect to a developing solution changes due to the effect of the acid is used in the prior art.

A resin (a base resin) is generally used as the base material component which is used in the chemical amplification type resist composition.

For example, as a chemical amplification type resist composition for forming a positive type resist pattern in an alkali development process which uses an alkali developing solution as a developing solution, a composition which contains an acid generating agent component and a resin component of which the solubility with respect to an alkali developing solution increases due to the effect of the acid is generally used. Regarding the resist film which is formed using the resist composition, when performing selective exposure at the time of resist pattern forming, an acid is generated from an acid generating agent component in an exposed portion, the solubility with respect to an alkali developing solution of a resin component increases due to the effect of the acid, and the exposed portion is soluble with respect to the alkali developing solution. For this reason, carrying out the alkali development forms a positive type pattern in which a non-exposed portion remains as a pattern.

As the resin component, a component where the polarity of the resin increases due to the effect of the acid is generally used. When the polarity increases, the solubility with respect to the alkali developing solution increases, but the solubility with respect to the organic solvent decreases. Therefore, when applying a solvent development process which uses a developing solution (an organic type developing solution) which includes an organic solvent instead of an alkali development process, since the solubility with respect to an organic type developing solution is relatively decreased in the exposed portion, in the solvent development process, a non-exposed portion of a resist film is dissolved and removed by an organic type developing solution to form a negative type resist pattern where an exposed portion remains as a pattern. A solvent development process which forms a negative type resist pattern in this manner may be called a negative type development process (for example, refer to Japanese Unexamined Patent Application, First Publication No. 2009-25707).

Currently, as a base resin of a resist composition which is used in ArF excimer laser lithography or the like, a resin (an acryl-based resin) which has a constituent unit which is derived from (meth)acrylic acid ester in the main chain or the like is generally used since the transparency in the vicinity of 193 nm is excellent (for example, refer to Japanese Unexamined Patent Application, First Publication No. 2003-241385).

SUMMARY OF THE INVENTION

For the base resin of the resist material, various types of characteristics are demanded such as the solubility with respect to a developing solution, substrate adhesiveness, adjustment of the diffusion length of an acid which is generated from an acid generating agent component, and etching resistance. For this reason, a multi-component type copolymer, which is formed by copolymerizing monomers for deriving constituent units which exhibit each characteristic, is used for the base resin of the resist material.

In a case of obtaining a multi-component type copolymer, depending on the properties of each constituent unit, it may be difficult to obtain a copolymer while maintaining a chemical structure which exhibits each characteristic.

For example, in a case of obtaining a polymer compound which includes a constituent unit with a high acidity and a constituent unit which has acid decomposability, there is a problem in that the constituent unit which has the acid decomposability is decomposed due to the effect of the acid which is caused by the constituent unit with a high acidity when copolymerizing the monomers for deriving each of the constituent units.

The present invention has been made in consideration of the matters described above and has an object of providing a method for manufacturing a polymer compound which is able to stably manufacture a polymer compound which includes a constituent unit with a high acidity and a constituent unit which has acid decomposability.

The present invention provides a method for manufacturing a polymer compound which has a constituent unit (a10) which includes a hydroxy group and a constituent unit (a1) which includes an acid decomposable group of which a polarity increases due to an effect of an acid, the method including step 1 of copolymerizing a monomer for deriving a constituent unit (a0) which includes a group which protects a phenolic hydroxyl group or a hydroxy group of a carboxy group with an organic silicon compound and a monomer for deriving the constituent unit (a1) are copolymerized and obtaining a prepolymer (1) which has the constituent unit (a0) and the constituent unit (a1), and step 2 of selectively deprotecting the constituent unit (a0) by reacting a compound which has a fluoride anion with the prepolymer (1) and obtaining a polymer compound which has the constituent unit (a10) and the constituent unit (a1).

According to the present invention, it is possible to provide a method for manufacturing a polymer compound which is able to stably manufacture a polymer compound which includes a constituent unit with a high acidity and a constituent unit which has acid decomposability.

DETAILED DESCRIPTION OF THE INVENTION

In the present specification and the claims of the present patent, "aliphatic" is a concept relative to aromatic and is defined to mean a group, compound, or the like which does not have aromaticity.

Unless otherwise stated, an "alkyl group" includes a monovalent saturated hydrocarbon group in straight-chain form, branched-chain form, or cyclic form. The same applies to an alkyl group in an alkoxy group.

Unless otherwise stated, an "alkylene group" includes a divalent saturated hydrocarbon group in straight-chain form, branched-chain form, or cyclic form.

A "halogenated alkyl group" is a group where some or all of the hydrogen atoms of an alkyl group are substituted with halogen atoms and examples of the halogen atoms include a fluorine atom, a chlorine atom, a bromine atom, and an iodine atom.

A "fluorinated alkyl group" or a "fluorinated alkylene group" refers to a group where some or all of the hydrogen atoms of an alkyl group or an alkylene group are substituted with fluorine atoms.

A "constituent unit" has the meaning of a monomer unit which forms a polymer compound (a resin, a polymer, and a copolymer).

A "constituent unit which is derived from acrylic acid ester" has the meaning of a constituent unit which is formed by the ethylenic double bond of acrylic acid ester being cleaved.

"Acrylic acid ester" is a compound where a hydrogen atom of a carboxy group terminal of acrylic acid ($CH_2=CH-COOH$) is substituted with an organic group.

In the acrylic acid ester, a hydrogen atom which is bonded with a carbon atom at an α-position may be substituted with a substituent group. The substituent group ($R^\alpha$) which substitutes the hydrogen atom which is bonded with the carbon atom at the α-position is an atom or a group other than a hydrogen atom and examples thereof include an alkyl group with 1 to 5 carbon atoms, a halogenated alkyl group with 1 to 5 carbon atoms, a hydroxy alkyl group, and the like. Here, unless otherwise stated, a carbon atom at an α-position of acrylic acid ester refers to a carbon atom with which a carbonyl group is bonded.

Below, an acrylic acid ester where a hydrogen atom which is bonded with a carbon atom at an α-position is substituted with a substituent group may be referred to as a substituted acrylic acid ester. In addition, the acrylic acid ester and α substituted acrylic acid ester may be referred to together as "(α substituted) acrylic acid esters".

A "constituent unit which is derived from hydroxy styrene" or a "constituent unit which is derived from a hydroxy styrene derivative" has a meaning of a constituent unit which is formed by an ethylenic double bond of hydroxy styrene or a hydroxy styrene derivative being cleaved.

A "hydroxy styrene derivative" is a concept which includes derivatives where a hydrogen atom at an α-position of hydroxy styrene is substituted with another substituent group such as an alkyl group and a halogenated alkyl group and derivatives thereof. Examples of the derivatives include derivatives where a hydrogen atom of a hydroxyl group of hydroxy styrene where a hydrogen atom at an α-position may be substituted with a substituent group is substituted with an organic group, derivatives where a substituent group other than a hydroxyl group is bonded with a benzene ring of hydroxy styrene where a hydrogen atom at an α-position may be substituted with a substituent group, and the like. Here, unless otherwise stated, an α-position (a carbon atom at an α-position) refers to a carbon atom with which a benzene ring is bonded.

Examples of a substituent group which substitutes a hydrogen atom at an α-position of hydroxy styrene include the same examples as the examples which were given as a substituent group at an α-position in the α substituted acrylic acid ester.

A "constituent unit which is derived from vinyl benzoic acid or a vinyl benzoic acid derivative" has the meaning of a constituent unit which is formed by an ethylenic double bond of vinyl benzoic acid or a vinyl benzoic acid derivative being cleaved.

The "vinyl benzoic acid derivative" is a concept which includes derivatives where a hydrogen atom at an α-position of vinyl benzoic acid is substituted with another substituent group such as an alkyl group and a halogenated alkyl group and derivatives thereof. Examples of the derivatives include derivatives where a hydrogen atom of a carboxy group of vinyl benzoic acid where a hydrogen atom at an α-position may be substituted with a substituent group is substituted with an organic group, derivatives where a substituent group other than a hydroxyl group and a carboxy group is bonded with a benzene ring of vinyl benzoic acid where a hydrogen atom at an α-position may be substituted with a substituent group, and the like. Here, unless otherwise stated, an α-position (a carbon atom at an α-position) refers to a carbon atom with which a benzene ring is bonded.

A "styrene derivative" has the meaning of a derivative where a hydrogen atom at an α-position of styrene is substituted with another substituent group such as an alkyl group and a halogenated alkyl group.

A "constituent unit which is derived from styrene" and a "constituent unit which is derived from a styrene derivative" have the meaning of a constituent unit which is formed by an ethylenic double bond of styrene or a styrene derivative being cleaved.

The alkyl group as the substituent group at an α-position described above is preferably an alkyl group in straight-chain form or branched-chain form and specific examples thereof include an alkyl group (a methyl group, an ethyl group, a propyl group, an isopropyl group, an n-butyl group, an isobutyl group, a tert-butyl group, a pentyl group, an isopentyl group, and a neopentyl group) with 1 to 5 carbon atoms and the like.

In addition, specific examples of the halogenated alkyl group as a substituent group at an α-position include a group where some or all of the hydrogen atoms of the "alkyl group as a substituent group at an α-position" are substituted with halogen atoms. Examples of the halogen atoms include a fluorine atom, a chlorine atom, a bromine atom, an iodine atom, and the like and a fluorine atom is particularly preferable.

In addition, specific examples of a hydroxy alkyl group as a substituent group at an α-position include a group where some or all of the hydrogen atoms of the "alkyl group as a substituent group at an α-position" described above are substituted with hydroxyl groups. The number of the hydroxyl groups in the hydroxy alkyl group is preferably 1 to 5 and most preferably 1.

The description "may have a substituent group" includes both a case where a hydrogen atom (—H) is substituted with a monovalent group and a case where a methylene group (—$CH_2$—) is substituted with a divalent group.

"Exposure" is a concept which includes general irradiation with radioactive rays.

Method for Manufacturing Polymer Compound
First Embodiment

The first embodiment of the present invention is a method for manufacturing a polymer compound which has a constituent unit (a10) which includes a hydroxy group and a constituent unit (a1) which includes an acid decomposable group of which a polarity increases due to an effect of an acid, which has step 1 of copolymerizing a monomer for deriving a constituent unit (a0) which includes a group which protects a phenolic hydroxyl group or a hydroxy group of a carboxy group with an organic silicon compound and a monomer for deriving the constituent unit (a1) and obtaining a prepolymer (1) which has the constituent unit (a0) and the constituent unit (a1), and step 2 of selectively deprotecting the constituent unit (a0) by reacting a compound which has a fluoride anion with the prepolymer (1) and obtaining a polymer compound which has the constituent unit (a10) and the constituent unit (a1).

According to the method for manufacturing a polymer compound of the first embodiment, it is possible to stably manufacture a polymer compound which has a constituent unit (a10) which includes a hydroxy group (simply referred to below as a "constituent unit (a10)) and a constituent unit (a1) which includes an acid decomposable group of which a polarity increases due to an effect of an acid (simply referred to below as a "constituent unit (a1)).

The constituent unit (a10) is a constituent unit with a high acidity which includes a hydroxy group. The constituent unit (a10) will be described below.

In addition, the constituent unit (a1) includes an acid decomposable group of which a polarity increases due to an effect of an acid. The "acid decomposable group" is a group which has acid decomposability which may cleave at least one bond in the structure of the acid decomposable group due to the effect of an acid. The constituent unit (a1) will be described below.

According to the first embodiment, firstly, a copolymer is polymerized in a state of being converted into a compound with a low acidity by protecting a hydroxy group of the constituent unit (a10) with a high acidity. Next, by carrying out a reaction with a specific component, it is possible to selectively deprotect a protective group which protects a hydroxy group of the constituent unit (a10) and to manufacture a polymer compound (a copolymer) which has the constituent unit (a10) with a high acidity and the constituent unit (a1) which has acid decomposability.

According to the manufacturing method of the first embodiment, since the hydroxy group of the constituent unit (a10) is protected in the polymerization stage, the acid which is caused by the constituent unit (a10) does not have an effect during the polymerization and copolymerization is possible without the constituent unit (a1) being decomposed.

Description will be given below of step 1 and step 2 of the manufacturing method of the first embodiment.

Step 1

Step 1 is a step of obtaining a prepolymer (1) which has the constituent unit (a0) and the constituent unit (a1) by copolymerizing a monomer for deriving a constituent unit (a0) which includes a group which protects a phenolic hydroxyl group or a hydroxy group of a carboxy group with an organic silicon compound and a monomer for deriving the constituent unit (a1).

Examples of the method for manufacturing a polymer compound include a radical polymerization method which is known in the art in which a monomer for deriving the constituent unit (a0) which includes a group which is protected by an organic silicon compound and a monomer for deriving the constituent unit (a1) are dissolved in a polymerization solvent, and a radical polymerization initiator such as azobisisobutyronitrile (AIBN) or azobisisobutyric acid dimethyl (for example, V-601 and the like) is added thereto to carry out the polymerization. Due to this, it is possible to obtain the prepolymer (1) which has the constituent unit (a0) and the constituent unit (a1).

The reaction temperature is preferably 50° C. to 100° C. and more preferably 65° C. to 85° C.

The reaction time varies according to the reactivity between monomers, the reaction temperature, and the like; however, in general, 60 to 480 minutes is preferable, and 60 to 420 minutes is more preferable.

A description will be given below of a monomer for deriving the constituent unit (a0) which includes a group which protects a phenolic hydroxyl group or a hydroxy group of a carboxy group with an organic silicon compound and a monomer for deriving the constituent unit (a1) which are polymerized in step 1.

Step 2

Step 2 is a step of selectively deprotecting the constituent unit (a0) by reacting a compound which has a fluoride anion with the prepolymer (1) and obtaining a polymer compound which has the constituent unit (a10) and the constituent unit (a1).

In step 2, by reacting a compound which has a fluoride anion with the prepolymer (1) which is obtained in step 1, it is possible to selectively desilylate (deprotect) the constituent unit (a0) and to obtain a polymer compound which has the constituent unit (a10) and the constituent unit (a1).

Examples of the compound which has a fluoride anion which is used in step 2 include fluorinated potassium, fluorinated cesium, tetrabutyl ammonium fluoride, hydrofluoric pyridine, triethylamine trihydrofluoride salt, tributylamine trihydrofluoride salt, difluorotrimethyl silicic acid tris(dimethylamino) sulfonium, and the like.

Among these, tetrabutyl ammonium fluoride is preferable from the point of view of being easily obtained and safety.

In step 2, the compound which has the fluoride anion is preferably used by being dissolved in an organic solvent such as tetrahydrofuran, tert-butylmethyl ether, dichloromethane, acetonitrile, chloroform, and methylene chloride.

In more detail, as the operation of step 2, it is preferable to carry out the reaction by dropwise adding a solution where a compound which has a fluoride anion is dissolved in an organic solvent, in a reaction solution which includes the prepolymer (1) which is obtained in step 1 and stirring. At this time, it is preferable to cool the reaction solution which includes the prepolymer (1) which is obtained in step 1 to a temperature of room temperature or lower and react the prepolymer (1) and the compound which has a fluoride anion at room temperature or lower. Reacting the prepolymer (1) and the compound which has a fluoride anion under the mild conditions of a temperature of room temperature or lower makes it possible to selectively desilylate (deprotect) the constituent unit (a0).

"Room temperature" here refers to a range of 20° C. to 30° C. The "a temperature of room temperature or lower" is preferably −20° C. to 30° C.

Other Steps

A polymer compound may be obtained by precipitating a polymer compound by dropwise addition or the like of the reaction polymerization solution in, for example, a large amount of water or organic solvent (isopropanol, hexane, heptane, methanol, and the like) after step 2 and performing filtration or the like.

In addition, the polymer compound which is obtained as described above is also preferably washed using an organic solvent. In detail, it is possible to perform washing by performing filtration, drying, and the like after bringing the polymer compound into contact with an organic solvent or the like. It is possible to remove a non-reacted monomer or remove a basic compound by washing depending on the organic solvent used. For example, in a case of using a triethylamine or aniline as a basic compound, it is possible to remove the basic compound after manufacturing a polymer compound using an alcohol-based solvent such as ethanol as a washing solvent.

Furthermore, the synthesized and washed polymer compound may be isolated and purified as necessary. It is possible to use a method which is known in the art for isolation and purification and, for example, it is possible to use any of concentration, solvent extraction, distillation, crystallization, recrystallization, chromatography, and the like individually or in a combination of two or more types.

In the polymer compound which is manufactured by the manufacturing method of the first embodiment, the ratio of each of the constituent units which are copolymerized is not particularly limited and it is possible to carry out appropriate selection according to characteristics or the like of a desired polymer compound. In the first embodiment, the ratio of the constituent unit (a1) with respect to all the constituent units which form the polymer compound is preferably 20 to 80 mol %, more preferably 20 to 75 mol %, and even more preferably 25 to 70 mol %.

In addition, in the first embodiment, the ratio of the constituent unit (a10) with respect to all the constituent units which form the polymer compound is preferably 20 to 80 mol %, more preferably 20 to 75 mol %, and even more preferably 25 to 70 mol %.

Second Embodiment

The second embodiment of the present invention is a method for manufacturing a polymer compound which has the constituent unit (a10) which includes a hydroxy group, the constituent unit (a1) which includes an acid decomposable group of which a polarity increases due to an effect of an acid, and the constituent unit (a20) which includes a base decomposable group, the method including step 1 of obtaining a prepolymer (2) which has the constituent unit (a0), the constituent unit (a1), and the constituent unit (a20), by copolymerizing a monomer for deriving the constituent unit (a0) which includes a group which protects a phenolic hydroxyl group or a hydroxy group of a carboxy group with an organic silicon compound, a monomer for deriving the constituent unit (a1), and a monomer for deriving the constituent unit (a20) which includes a base decomposable group, and step 2 of selectively deprotecting the constituent unit (a0) by reacting a compound which has a fluoride anion with the prepolymer (2) and obtaining a polymer compound which has the constituent unit (a10), the constituent unit (a1), and the constituent unit (a20).

A description will be given below of step 1 and step 2 of the method for manufacturing a polymer compound of the second embodiment.

Step 1

Step 1 is a step of obtaining a prepolymer (2) which has the constituent unit (a0), the constituent unit (a1), and the constituent unit (a20) by copolymerizing a monomer for deriving the constituent unit (a0) which includes a group which protects a phenolic hydroxyl group or a hydroxy group of a carboxy group with an organic silicon compound, a monomer for deriving the constituent unit (a1), and a monomer for deriving the constituent unit (a20) which includes a base decomposable group.

Examples of the method for manufacturing a polymer compound include a radical polymerization method which is known in the art which dissolves a monomer for deriving the constituent unit (a0) which includes a group which is protected by an organic silicon compound, a monomer for deriving the constituent unit (a1), and a monomer for deriving the constituent unit (a20) in a polymerization solvent, adds a radical polymerization initiator such as azobisisobutyronitrile (AIBN) and azobisisobutyric acid dimethyl (for example, V-601 and the like) thereto, and carries out polymerization. Due to this, it is possible to obtain the prepolymer (2) which has the constituent unit (a0), the constituent unit (a1), and the constituent unit (a20).

The description relating to step 1 in the second embodiment is the same as the description of step 1 in the first embodiment of the present invention apart from copolymerizing a monomer for deriving the constituent unit (a20) which includes a base decomposable group.

Step 2

Step 2 is a step of selectively deprotecting the constituent unit (a0) by reacting a compound which has a fluoride anion with the prepolymer (2) and obtaining a polymer compound which has the constituent unit (a10), the constituent unit (a1), and the constituent unit (a20).

In step 2, by reacting a compound which has a fluoride anion with the prepolymer (2) which is obtained in step 1, it is possible to selectively desilylate (deprotect) the constituent unit (a0) and to obtain a polymer compound which has the constituent unit (a10), the constituent unit (a1), and the constituent unit (a20).

The description relating to step 2 in the second embodiment is the same as the description of step 2 in the first embodiment of the present invention apart from using the prepolymer (2) instead of the prepolymer (1).

In the prior art, when manufacturing a polymer compound which has the constituent unit (a10) which includes a hydroxy group, the constituent unit (a1) which includes an acid decomposable group of which a polarity increases due to an effect of an acid, and the constituent unit (a20) which includes a base decomposable group, there is a method of neutralizing an acid which is generated from the constituent unit (a10) by adding a basic compound or the like in order to prevent the constituent unit (a1) from being decomposed due to the effect of an acid which is caused by the constituent unit (a10) which is a constituent unit with a high acidity.

However, in a case of further copolymerizing a monomer for deriving the constituent unit (a20) which includes a base decomposable group, there is a problem in that the constituent unit (a20) is decomposed due to the effect of the basic compound.

According to the second embodiment of the present invention, by firstly protecting a hydroxy group of the constituent unit (a10) with a high acidity, a copolymer is polymerized in a state of being converted into a compound with a low acidity. For this reason, since it is not necessary to add a basic compound or the like in order to neutralize an acid which is caused by the constituent unit (a10), it is possible to carry out copolymerization without a monomer for deriving the constituent unit (a20) which includes a base decomposable group being decomposed.

In the second embodiment, the ratio of each of the constituent units which are copolymerized is not particularly limited and it is possible to carry out appropriate selection according to the characteristics or the like of the desired polymer compound. In the second embodiment, the ratio of the constituent unit (a1) with respect to all the constituent units which form the polymer compound is preferably 20 to 80 mol %, more preferably 20 to 75 mol %, and even more preferably 25 to 70 mol %.

In addition, a ratio of the constituent unit (a20) with respect to all the constituent units which form the polymer compound is preferably 1 to 20 mol %, more preferably 5 to 15 mol %, and even more preferably 8 to 12 mol %.

In addition, the ratio of the constituent unit (a10) with respect to all the constituent units which form the polymer compound is preferably 20 to 80 mol %, more preferably 20 to 75 mol %, and even more preferably 25 to 70 mol %.

Description will be given below of each material which is used for the method for manufacturing a polymer compound of the present invention and the constituent units which form the polymer compound.

Constituent Unit (a10)

The constituent unit (a10) is a constituent unit which includes a hydroxy group.

The constituent unit (a10) is a constituent unit which includes a hydroxy group and a constituent unit with a high acidity. In more detail, "with a high acidity" preferably means that an acid dissociation constant (pKa) is 4.0 or more.

In the present embodiment, the "acid dissociation constant (pKa)" refers to a constant which is generally used as an index which indicates the acid strength of the target substance. Here, the pKa in the present specification is a value under the condition of a temperature of 25° C. In addition, it is possible to obtain the pKa value by measuring by the method which is known in the art. In addition, it is also possible to use a calculation value using software such as "ACD/Labs" (product name, manufactured by Advanced Chemistry Development Inc.) which is known in the art.

The constituent unit (a10) is preferably a constituent unit which has a phenolic hydroxyl group or a carboxy group.

The constituent unit (a10) is preferably a constituent unit which is represented by, for example, General Formula (a10-1) described below.

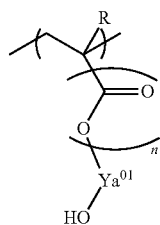

(a10-1)

[In General Formula (a10-1), R is a hydrogen atom, an alkyl group with 1 to 5 carbon atoms, or a halogenated alkyl group with 1 to 5 carbon atoms. n is 0 or 1. $Ya^{01}$ is a single bond or a divalent linking group.]

R

In General Formula (a10-1), the alkyl group with 1 to 5 carbon atoms as R is preferably an alkyl group with 1 to 5 carbon atoms in straight-chain form or branched-chain form and specific examples thereof include a methyl group, an ethyl group, a propyl group, an isopropyl group, an n-butyl group, an isobutyl group, a tert-butyl group, a pentyl group, an isopentyl group, a neopentyl group, and the like. The halogenated alkyl group with 1 to 5 carbon atoms is a group where some or all of the hydrogen atoms of the alkyl group with 1 to 5 carbon atoms are substituted with halogen atoms. Examples of the halogen atoms include a fluorine atom, a chlorine atom, a bromine atom, an iodine atom, and the like and a fluorine atom is particularly preferable.

R is preferably a hydrogen atom, an alkyl group with 1 to 5 carbon atoms or a fluorinated alkyl group with 1 to 5 carbon atoms and a hydrogen atom or a methyl group is most preferable in terms of being easily obtained industrially.

n

In General Formula (a10-1), n is 0 or 1.

$Ya^{01}$

In General Formula (a10-1), $Ya^{01}$ is a single bond or a divalent linking group.

The divalent linking group is not particularly limited; however, favorable examples thereof include a divalent hydrocarbon group which may have a substituent group, a divalent linking group which includes a hetero atom, and the like.

Divalent Hydrocarbon Group which May have a Substituent Group

A hydrocarbon group as a divalent linking group may be an aliphatic hydrocarbon group or may be an aromatic hydrocarbon group.

The aliphatic hydrocarbon group has the meaning of a hydrocarbon group which does not have aromaticity. The aliphatic hydrocarbon group may be saturated or may be unsaturated and is generally preferably saturated.

Examples of the aliphatic hydrocarbon group include an aliphatic hydrocarbon group in straight-chain form or branched-chain form, an aliphatic hydrocarbon group which includes a ring in a structure, and the like and specific examples thereof include a group which is exemplified by $Va^1$ in General Formula (a1-1) which will be described below.

The aliphatic hydrocarbon group in straight-chain form or branched-chain form may or may not have a substituent group. Examples of the substituent group include a fluorine atom, a fluorinated alkyl group with 1 to 5 carbon atoms which is substituted with a fluorine atom, a carbonyl group, and the like.

Examples of the aliphatic hydrocarbon group which includes a ring in the structure thereof include an aliphatic hydrocarbon group in cyclic form (a group where two hydrogen atoms are removed from an aliphatic hydrocarbon ring) which may include a substituent group which includes a hetero atom in a ring structure, a group where the aliphatic hydrocarbon group in cyclic form is bonded with an end of an aliphatic hydrocarbon group in straight-chain form or branched-chain form, a group where the aliphatic hydrocarbon group in cyclic form is interposed in the aliphatic hydrocarbon group in straight-chain form or branched-chain form, and the like. Examples of the aliphatic hydrocarbon group in straight-chain form or branched-chain form include the same examples as the description above.

The aliphatic hydrocarbon group in cyclic form preferably has 3 to 20 carbon atoms and more preferably 3 to 12 carbon atoms.

Specific examples of the aliphatic hydrocarbon group in cyclic form include a group which is exemplified by $Va^1$ in General Formula (a1-1) which will be described below.

The aliphatic hydrocarbon group in cyclic form may or may not have a substituent group. Examples of the substituent group include an alkyl group, an alkoxy group, a halogen atom, a halogenated alkyl group, a hydroxyl group, a carbonyl group, and the like.

The alkyl group as the substituent group is preferably an alkyl group with 1 to 5 carbon atoms and most preferably a methyl group, an ethyl group, a propyl group, an n-butyl group, and a tert-butyl group.

The alkoxy group as the substituent group is preferably an alkoxy group with 1 to 5 carbon atoms, more preferably a methoxy group, an ethoxy group, an n-propoxy group, an iso-propoxy group, an n-butoxy group, and a tert-butoxy group, and most preferably a methoxy group and an ethoxy group.

Examples of the halogen atom as the substituent group include a fluorine atom, a chlorine atom, a bromine atom, an iodine atom, and the like and a fluorine atom is preferable.

Examples of the halogenated alkyl group as the substituent group include a group where some or all of the hydrogen atoms of the alkyl group are substituted with the halogen atoms.

Regarding the aliphatic hydrocarbon group in a cyclic form, some carbon atoms which form the ring structure thereof may be substituted with substituent groups which include hetero atoms. The substituent group which includes the hetero atom is preferably —O—, —C(=O)—O—, —S—, —S(=O)$_2$—, —S(=O)$_2$—O—.

Specific examples of an aromatic hydrocarbon group as a divalent hydrocarbon group include a group which is exemplified by $Va^1$ in General Formula (a1-1) which will be described below.

Regarding the aromatic hydrocarbon group, a hydrogen atom of the aromatic hydrocarbon group may be substituted with a substituent group. For example, a hydrogen atom which is bonded with an aromatic ring in the aromatic hydrocarbon group may be substituted with a substituent group. Examples of the substituent group include an alkyl group, an alkoxy group, a halogen atom, a halogenated alkyl group, a hydroxyl group, and the like.

The alkyl group as the substituent group is preferably an alkyl group with 1 to 5 carbon atoms and most preferably a methyl group, an ethyl group, a propyl group, an n-butyl group, and a tert-butyl group.

Examples of an alkoxy group, a halogen atom, and a halogenated alkyl group as the substituent group include ones which are exemplified as a substituent group which substitutes a hydrogen atom of the aliphatic hydrocarbon group in a cyclic form.

Divalent Linking Group Including Hetero Atom

The hetero atom in a divalent linking group which includes a hetero atom is an atom other than a carbon atom and a hydrogen atom and examples thereof include an oxygen atom, a nitrogen atom, a sulfur atom, a halogen atom, and the like.

In a case where $Ya^{01}$ is a divalent linking group including a hetero atom, preferable examples of the linking group include —O—, —C(=O)—O—, —C(=O)—, —O—C(=O)—O—, —C(=O)—NH—, —NH—, —NH—C(=NH)— (H may be substituted with a substituent group such as an alkyl group or an acyl group), —S—, —S(=O)$_2$—, —S(=O)$_2$—O—, a group which is represented by General Formula —$Y^{21}$—O—$Y^{22}$—O—, —$Y^{21}$—C(=O)—O—, —C(=O)—O—$Y^{21}$—, —[$Y^{21}$—C(=O)—O]$_{m'}$—$Y^{22}$— or —$Y^{21}$—O—C(=O)—$Y^{22}$—, [in the formula, $Y^{21}$ and $Y^{22}$ are each independently divalent hydrocarbon groups which may have a substituent group, 0 is an oxygen atom, m' is an integer of 0 to 3.] and the like.

In a case where the divalent linking group including the hetero atom is —C(=O)—NH—, —NH—, or —NH—C(=NH)—, the H thereof may be substituted with a substituent group such as an alkyl group, or an acyl group. The substituent group (alkyl group, acyl group, or the like) preferably has 1 to 10 carbon atoms, more preferably 1 to 8, and particularly preferably 1 to 5.

In General Formula —$Y^{21}$—O—$Y^{22}$—, —$Y^{21}$—O—, —$Y^{21}$—C(=O)—O—, —C(=O)—O—$Y^{21}$—, —[$Y^{21}$—C(=O)—O]$_{m'}$—$Y^{22}$— or —$Y^{21}$—O—C(=O)—$Y^{22}$—, $Y^{21}$ and $Y^{22}$ are each independently divalent hydrocarbon groups which may have a substituent group. Examples of the divalent hydrocarbon group include the same as the "divalent hydrocarbon group which may have a substituent group" as described in the divalent linking group.

$Y^{21}$ is preferably a straight-chain aliphatic hydrocarbon group, more preferably a straight-chain alkylene group, even more preferably a straight-chain alkylene group with 1 to 5 carbon atoms, and particularly preferably a methylene group or an ethylene group.

$Y^{22}$ is preferably a straight-chain or branched-chain aliphatic hydrocarbon group, more preferably a methylene group, an ethylene group, or an alkyl methylene group. The alkyl group in the alkyl methylene group is preferably a straight-chain alkyl group with 1 to 5 carbon atoms, more preferably a straight-chain alkyl group with 1 to 3 carbon atoms, and most preferably a methyl group.

In a group represented by General Formula —[$Y^{21}$—C(=O)—O]$_{m'}$—$Y^{22}$—, m' is an integer of 0 to 3, preferably an integer of 0 to 2, more preferably 0 or 1, and 1 is particularly preferable. That is, the group represented by General Formula —[$Y^{21}$—C(=O)—O]$_{m'}$—$Y^{22}$— is particularly preferably a group which is represented by formula —$Y^{21}$—C(=O)—O—$Y^{22}$—. Among the above, the group which is represented by General Formula —(CH$_2$)$_{a'}$—C(=O)—O—(CH$_2$)$_{b'}$— is preferable. In the formula, a' is an integer of 1 to 10, preferably an integer of 1 to 8, more preferably an integer of 1 to 5, even more preferably 1 or 2, and 1 is most preferable. b' is an integer of 1 to 10, preferably an integer of 1 to 8, more preferably an integer of 1 to 5, even more preferably 1 or 2, and 1 is most preferable.

A constituent unit which is represented by General Formula (a10-1) is preferably a constituent unit represented by the following General Formula (a10-1-1).

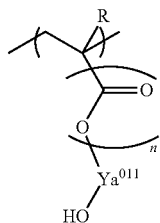

(a10-1-1)

[In General Formula (a10-1-1), R is a hydrogen atom, an alkyl group with 1 to 5 carbon atoms, or a halogenated alkyl group with 1 to 5 carbon atoms. n is 0 or 1. $Ya^{o11}$ is a straight-chain or branched-chain divalent aliphatic hydrocarbon group, or a divalent aromatic hydrocarbon group.]

In General Formula (a10-1-1), the description relating to R and n is the same as the description relating to R and n in General Formula (a10-1) described above.

In General Formula (a10-1-1), the description relating to a straight-chain or a branched-chain divalent aliphatic hydrocarbon group or a divalent aromatic hydrocarbon group of $Ya^{o11}$ is the same as the description relating to a straight-chain or a branched-chain divalent aliphatic hydrocarbon group or a divalent aromatic hydrocarbon group in the description relating to the divalent linking group of $Ya^{o11}$ in General Formula (a10-1) described above.

Among the above, in General Formula (a10-1-1), the straight-chain or branched-chain aliphatic hydrocarbon group of $Ya^{o11}$ preferably has 1 to 10 carbon atoms, more preferably 1 to 6, even more preferably 1 to 4, and most preferably 1 to 3.

As the straight-chain aliphatic hydrocarbon group, a straight-chain alkylene group is preferable and specific examples thereof include a methylene group [—CH$_2$—], an ethylene group [—(CH$_2$)$_2$—], a trimethylene group [—(CH$_2$)$_3$—], a tetramethylene group [—(CH$_2$)$_4$—], a pentamethylene group [—(CH$_2$)$_5$—], and the like.

As the branched-chain aliphatic hydrocarbon group, a branched-chain alkylene group is preferable and specific examples thereof include alkyl alkylene groups such as alkyl methylene groups such as —CH(CH$_3$)—, —CH(CH$_2$CH$_3$)—, —C(CH$_3$)$_2$—, —C(CH$_3$)(CH$_2$CH$_3$)—, —C(CH$_3$)(CH$_2$CH$_2$CH$_3$)—, —C(CH$_2$CH$_3$)$_2$—; alkyl ethylene groups such as —CH(CH$_3$)CH$_2$—, —CH(CH$_3$)CH(CH$_3$)—, —C(CH$_3$)$_2$CH$_2$—, —CH(CH$_2$CH$_3$)CH$_2$—, —C(CH$_2$CH$_3$)$_2$—CH$_2$—; alkyl trimethylene groups such as —CH(CH$_3$)CH$_2$CH$_2$—, —CH$_2$CH(CH$_3$)CH$_2$—; and alkyl tetramethylene groups such as —CH(CH$_3$)CH$_2$CH$_2$CH$_2$—, —CH$_2$CH(CH$_3$)CH$_2$CH$_2$—. As the alkyl group in the alkyl alkylene group, a straight-chain alkyl group with 1 to 5 carbon atoms is preferable.

Specific examples of constituent units which are represented by General Formula (a10-1) will be described below. In the following, R is the same as above.

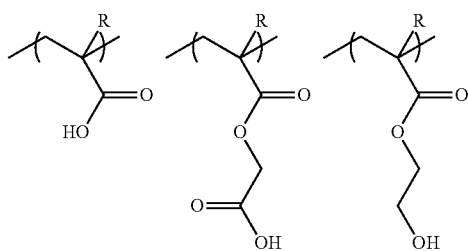

-continued

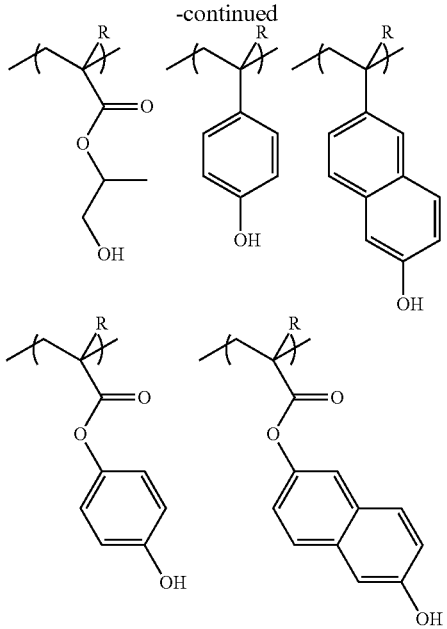

Constituent Unit (a0)

The constituent unit (a0) is derived from a monomer which includes a group which protects a hydroxy group of a phenolic hydroxy group or a carboxy group with an organic silicon compound.

In the present embodiment, "protects a hydroxy group" refers to substituting a hydrogen atom of a phenolic hydroxyl group or a hydroxy group of a carboxy group with a silyl group.

In addition, in the present embodiment, "deprotecting" refers to a silyl group which protects a hydrogen atom of a phenolic hydroxyl group or a hydroxy group of a carboxy group being dissociated to generate a phenolic hydroxyl group or a carboxy group.

Examples of the constituent unit (a0) include a constituent unit which is represented by General Formula (a0-1) described below.

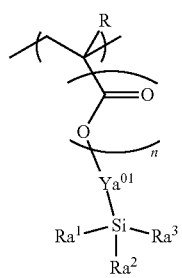

(a0-1)

[In General Formula (a0-1), R is a hydrogen atom, an alkyl group with 1 to 5 carbon atoms, or a halogenated alkyl group with 1 to 5 carbon atoms. $Ya^{o1}$ is a single bond or a divalent linking group. $Ra^1$ to $Ra^3$ are each independently a hydrocarbon group. n is 0 or 1.]

R

The description of R is the same as the description of R in General Formula (a0-1) described above.

n

In General Formula (a0-1), n is 0 or 1.

$Ya^{o1}$

In General Formula (a0-1), $Ya^{o1}$ is a single bond or a divalent linking group.

The divalent linking group is not particularly limited; however, favorable examples thereof include a divalent hydrocarbon group which may have a substituent group, a divalent linking group which includes a hetero atom, and the like. The description of Ya$^{01}$ in General Formula (a0-1) is the same as the description of Ya$^{01}$ in General Formula (a10-1) described above.

[Ra$^1$ to Ra$^3$]

In General Formula (a0-1), Ra$^1$ to Ra$^3$ are each independently a hydrocarbon group. As the hydrocarbon group, an alkyl group with 1 to 20 carbon atoms is preferable, an alkyl group with 1 to 10 carbon atoms is more preferable; a straight-chain or branched-chain alkyl group is preferable and specific examples thereof include a methyl group, an ethyl group, a propyl group, an isopropyl group, an n-butyl group, an isobutyl group, a tert-butyl group, a pentyl group, an isopentyl group, a neopentyl group, a 1,1-dimethyl ethyl group, a 1,1-diethyl propyl group, a 2,2-dimethyl propyl group, a 2,2-dimethyl butyl group, and the like.

In a case where Ra$^1$ to Ra$^3$ are cyclic hydrocarbon groups, Ra$^1$ to Ra$^3$ may be an aliphatic or aromatic, and may also be a polycyclic or monocyclic. As the monocyclic alicyclic hydrocarbon group, a group where one hydrogen atom is removed from a monocycloalkane is preferable. As the monocycloalkane, a monocycloalkane with 3 to 8 carbon atoms is preferable and specific examples thereof include cyclopentane, cyclohexane, cyclooctane, and the like. As the polycyclic alicyclic hydrocarbon group, a group where one hydrogen atom is removed from a polycycloalkane is preferable and, as the polycycloalkane, a polycycloalkane with 7 to 12 carbon atoms is preferable, specific examples thereof include adamantane, norbornane, isobornane, tricyclodecane, tetracyclododecane, and the like.

In a case where Ra$^1$ to Ra$^3$ are aromatic hydrocarbon groups, specific examples of aromatic rings which are included therein include aromatic hydrocarbon rings such as benzene, biphenyl, fluorene, naphthalene, anthracene, phenanthrene; aromatic heterocyclic rings where a part of carbon atoms constituting the aromatic hydrocarbon rings are substituted with hetero atoms; and the like. Examples of hetero atoms in the aromatic heterocyclic rings include oxygen atoms, sulfur atoms, nitrogen atoms, and the like.

Specific examples of the aromatic hydrocarbon groups include a group (an aryl group) where one hydrogen atom is removed from the aromatic hydrocarbon rings; a group (for example, an aryl alkyl group such as a benzyl group, a phenethyl group, a 1-naphthylmethyl group, a 2-naphthylmethyl group, a 1-naphthylethyl group, a 2-naphthylethyl group) where one of the hydrogen atoms of the aryl group is substituted with an alkylene group; and the like. The number of carbon atoms of the alkylene group (alkyl chain in the aryl alkyl group) is preferably 1 to 4, more preferably 1 to 2, and particularly preferably 1.

A constituent unit which is represented by General Formula (a0-1) is preferably a constituent unit which is represented by the following General Formula (a0-1-1).

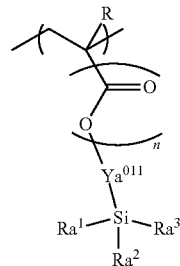

(a0-1-1)

[In General Formula (a0-1-1), R is a hydrogen atom, an alkyl group with 1 to 5 carbon atoms, or a halogenated alkyl group with 1 to 5 carbon atoms. Ya$^{011}$ is a straight-chain or branched-chain divalent aliphatic hydrocarbon group or a divalent aromatic hydrocarbon group. Ra$^1$ to Ra$^3$ are each independently a hydrocarbon group. n is 0 or 1.]

In General Formula (a0-1-1), description relating to R, Ra$^1$ to Ra$^3$ is the same as the description relating to R, Ra$^1$ to Ra$^3$ in General Formula (a0-1) described above.

In General Formula (a0-1-1), description relating to Ya$^{011}$ is the same as the description relating to Ya$^{011}$ in General Formula (a10-1-1) described above.

Specific examples of the constituent units which are represented by General Formula (a0-1) will be described below. In the following, R is the same as the above.

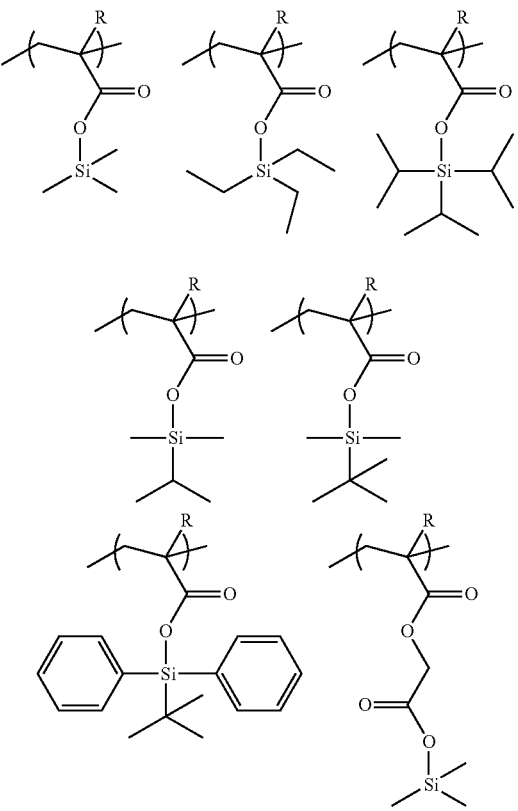

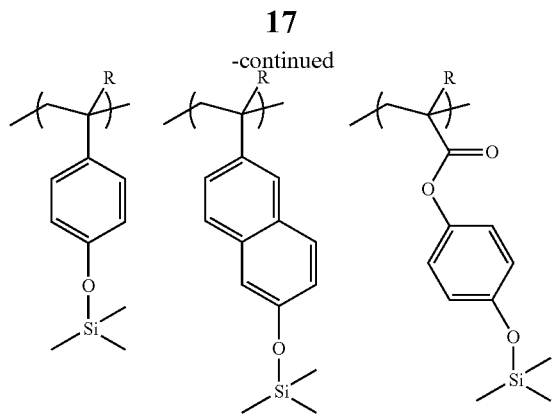

Constituent Unit (a1)

The constituent unit (a1) is a constituent unit which includes an acid decomposable group of which a polarity increases due to an effect of an acid.

An "acid decomposable group" is a group which has acid decomposability which may cleave at least one bond in the structure of the acid decomposable group due to the effect of an acid.

Examples of an acid decomposable group of which a polarity increases due to an effect of an acid include a group which generates a polar group by being decomposed due to the effect of an acid.

Examples of the polar group include a carboxy group, a hydroxyl group, an amino group, a sulfo group ($—SO_3H$), and the like. Among these, a polar group (also referred to below as an "OH-containing polar group") which contains —OH in the structure is preferable, a carboxy group or a hydroxyl group is more preferable, and a carboxy group is particularly preferable.

More specific examples of an acid decomposable group include a group where the polar group is protected by an acid dissociable group (for example, a group which protects a hydrogen atom of an OH-containing polar group with an acid dissociable group).

Here, an "acid dissociable group" refers to both (i) a group which has acid dissociability where a bond between the acid dissociable group and an atom which is adjacent to the acid dissociable group may be cleaved due to an effect of an acid and (ii) a group where a bond between the acid dissociable group and an atom which is adjacent to the acid dissociable group may be cleaved due to decarboxylation reaction being further generated after some bonds are cleaved due to the effect of an acid.

It is necessary for an acid dissociable group which forms an acid decomposable group to be a group of which a polarity is lower than that of a polar group which is generated by the dissociation of the acid dissociable group and, due to this, when the acid dissociable group is dissociated due to an effect of an acid, a polar group of which a polarity is higher than that of the acid dissociable group is generated and the polarity increases.

The acid dissociable group is not particularly limited and it is possible to use groups which have been proposed so far as an acid dissociable group of a base resin for a chemical amplification type resist.

Out of the polar groups described above, examples of an acid dissociable group which protects a carboxy group or a hydroxyl group include an acid dissociable group (also referred to below as an "acetal type acid dissociable group" for convenience) which is represented by General Formula (a1-r-1) described below.

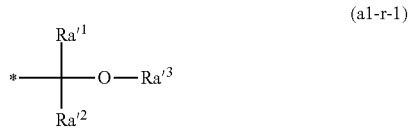

(a1-r-1)

[In the formula, $Ra'^1$ and $Ra'^2$ are each independently a hydrogen atom or an alkyl group, $Ra'^3$ is a hydrocarbon group, and $Ra'^3$ may be bonded with one of $Ra'^1$ and $Ra'^2$ to form a ring. * has the meaning of an atomic bond.]

In General Formula (a1-r-1), examples of an alkyl group of $Ra'^1$ and $Ra'^2$ include the same alkyl groups which are exemplified as a substituent group which may be bonded with a carbon atom at an α-position in the description of the α substituted acrylic acid ester, and a methyl group or an ethyl group is preferable, and a methyl group is most preferable.

As the hydrocarbon group of $Ra'^3$, an alkyl group with 1 to 20 carbon atoms is preferable, and an alkyl group with 1 to 10 carbon atoms is more preferable; an alkyl group in straight-chain form or branched-chain form is preferable and specific examples thereof include a methyl group, an ethyl group, a propyl group, an isopropyl group, an n-butyl group, an isobutyl group, a tert-butyl group, a pentyl group, an isopentyl group, a neopentyl group, a 1,1-dimethyl ethyl group, a 1,1-diethyl propyl group, a 2,2-dimethyl propyl group, a 2,2-dimethyl butyl group, and the like.

In a case where $Ra'^3$ is a hydrocarbon group in a cyclic form, $Ra'^3$ may be aliphatic or aromatic and also may be polycyclic or monocyclic. A monocyclic alicyclic hydrocarbon group is preferably a group where one hydrogen atom is removed from monocycloalkane. The monocycloalkane preferably has 3 to 8 carbon atoms and specific examples thereof include cyclopentane, cyclohexane, cyclooctane, and the like. A polycyclic alicyclic hydrocarbon group is preferably a group where one hydrogen atom is removed from polycycloalkane and the polycycloalkane preferably has 7 to 12 carbon atoms and specific examples thereof include adamantane, norbornane, isobornane, tricyclodecane, tetracyclododecane, and the like.

In a case where $Ra'^3$ is an aromatic hydrocarbon group, specific examples of an aromatic ring which is included therein include an aromatic hydrocarbon ring such as benzene, biphenyl, fluorene, naphthalene, anthracene, and phenanthrene; an aromatic heterocyclic ring where some carbon atoms which form the aromatic hydrocarbon ring are substituted with hetero atoms; and the like. Examples of the hetero atom in the aromatic heterocyclic ring include an oxygen atom, a sulfur atom, a nitrogen atom, and the like.

Specific examples of the aromatic hydrocarbon group include a group (an aryl group) where one hydrogen atom is removed from the aromatic hydrocarbon ring; a group (for example, an aryl alkyl group such as a benzyl group, a phenethyl group, a 1-naphthyl methyl group, a 2-naphthyl methyl group, a 1-naphthyl ethyl group, and a 2-naphthyl ethyl group) where one hydrogen atom of the aryl group is substituted with an alkylene group; and the like. The number of carbon atoms of the alkylene group (an alkyl chain in the aryl alkyl group) is preferably 1 to 4, more preferably 1 or 2, and particularly preferably 1.

In a case where $Ra'^3$ is bonded with one of $Ra'^1$ and $Ra'^2$ to form a ring, the cyclic group is preferably a 4-membered to 7-membered ring and more preferably a 4-membered to 6-membered ring. Specific examples of the cyclic group include a tetrahydropyranyl group, a tetrahydrofuranyl group, and the like.

Out of the polar groups described above, examples of the acid dissociable group which protects a carboxy group include an acid dissociable group which is represented by General Formula (a1-r-2) described below (in the acid dissociable groups which are represented by Formula (a1-r-2) described below, groups which are formed by alkyl groups may be referred to below as "tertiary alkylester type acid dissociable groups" for convenience).

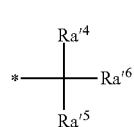
(a1-r-2)

[In General Formula (a1-r-2), $Ra'^4$ to $Ra'^6$ are each independently a hydrocarbon group and $Ra'^5$ and $Ra'^6$ may be bonded with each other to form a ring. * has the meaning of an atomic bond.]

Examples of the hydrocarbon group of $Ra'^4$ to $Ra'^6$ include the same examples as $Ra'^3$ described above. $Ra'^4$ is preferably an alkyl group with 1 to 5 carbon atoms. In a case where $Ra'^5$ and $Ra'^6$ are bonded with each other to form a ring, examples thereof include a group which is represented by General Formula (a1-r2-1) described below.

On the other hand, in a case where $Ra'^5$ and $Ra'^6$ are not bonded with each other and are an independent hydrocarbon group, examples thereof include a group which is represented by General Formula (a1-r2-2) described below.

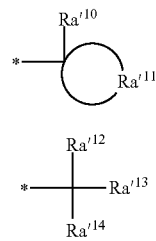
(a1-r2-1)

(a1-r2-2)

[In General Formula (a1-r2-1) or (a1-r2-2), $Ra'^{10}$ indicates an alkyl group with 1 to 10 carbon atoms, $Ra'^{11}$ indicates a group which forms an aliphatic cyclic group with a carbon atom with which $Ra'^{10}$ is bonded, and $Ra'^{12}$ to $Ra'^{14}$ each independently indicate a hydrocarbon group. * has the meaning of an atomic bond.]

In General Formula (a1-r2-1), an alkyl group of an alkyl group with 1 to 10 carbon atoms of $Ra'^{10}$ is preferably a group which is exemplified as an alkyl group in straight-chain form or branched-chain form of $Ra'^3$ in General Formula (a1-r-1). In General Formula (a1-r2-1), an aliphatic cyclic group formed by $Ra'^{11}$ is preferably a group which is exemplified as the alkyl group in cyclic form of $Ra'^3$ in General Formula (a1-r-1).

In General Formula (a1-r2-2), $Ra'^{12}$ and $Ra'^{14}$ are each independently preferably an alkyl group with 1 to 10 carbon atoms, the alkyl group is more preferably a group which is exemplified as an alkyl group in straight-chain form or branched-chain form of $Ra'^3$ in General Formula (a1-r-1), even more preferably an alkyl group in straight-chain form with 1 to 5 carbon atoms, and particularly preferably a methyl group or an ethyl group.

In General Formula (a1-r2-2), $Ra'^{13}$ is preferably an alkyl group in straight-chain form, a branched-chain form, or a cyclic form which is exemplified as a hydrocarbon group of $Ra'^3$ in General Formula (a1-r-1). Among these, a group which is exemplified as the alkyl group in cyclic form of $Ra'^3$ is more preferable.

Specific examples of a group which is represented by General Formula (a1-r2-1) described above will be given below. In the following formula, "*" indicates an atomic bond.

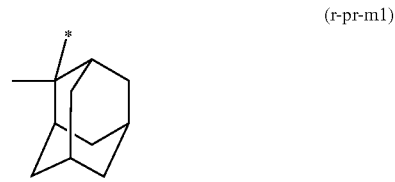
(r-pr-m1)

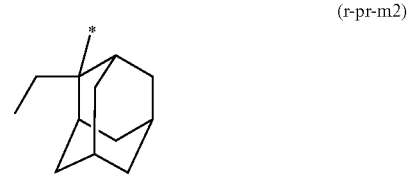
(r-pr-m2)

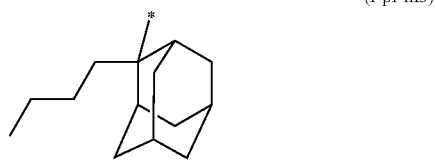
(r-pr-m3)

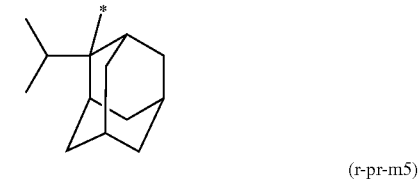
(r-pr-m4)

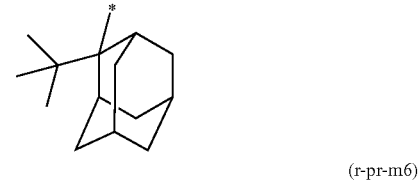
(r-pr-m5)

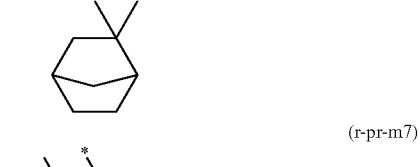
(r-pr-m6)

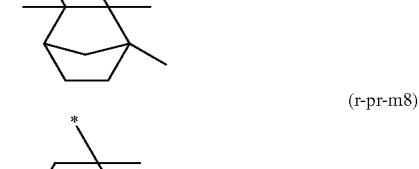
(r-pr-m7)

(r-pr-m8)

-continued
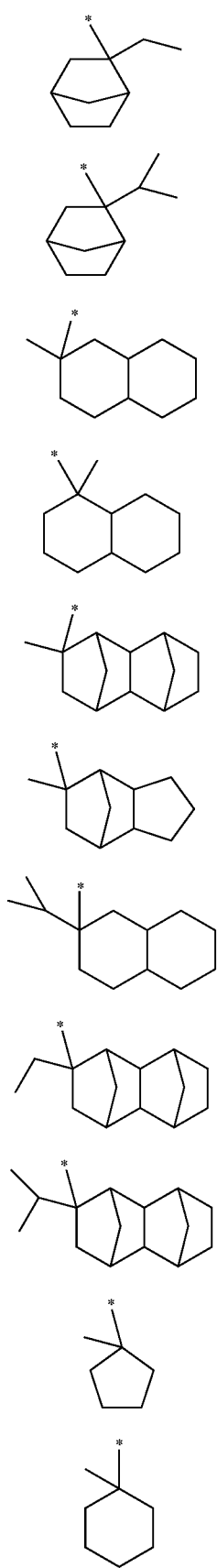
(r-pr-m9)
(r-pr-m10)
(r-pr-m11)
(r-pr-m12)
(r-pr-m13)
(r-pr-m14)
(r-pr-m15)
(r-pr-m16)
(r-pr-m17)
(r-pr-s1)
(r-pr-s2)
-continued
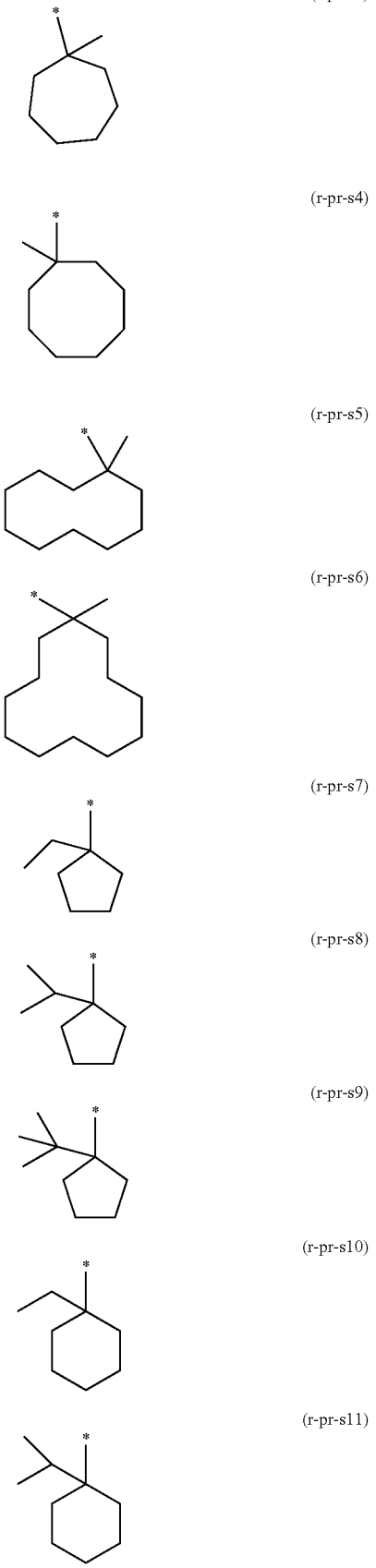
(r-pr-s3)
(r-pr-s4)
(r-pr-s5)
(r-pr-s6)
(r-pr-s7)
(r-pr-s8)
(r-pr-s9)
(r-pr-s10)
(r-pr-s11)

(r-pr-s12)
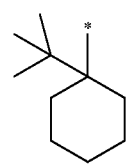
(r-pr-s13)
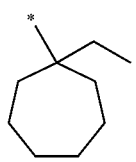
(r-pr-s14)
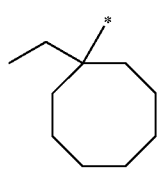
(r-pr-s15)
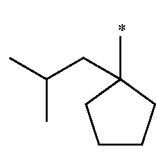
(r-pr-s16)
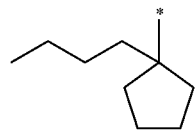
(r-pr-s17)
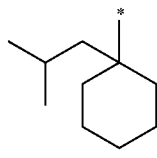
(r-pr-s18)
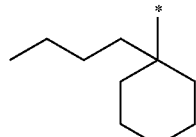
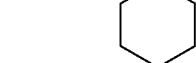
Specific examples of a group which is represented by General Formula (a1-r2-2) described above will be given below.
(r-pr-cm1)
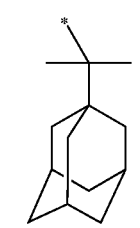
(r-pr-cm2)
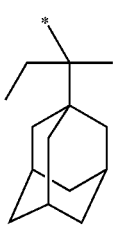
(r-pr-cm3)
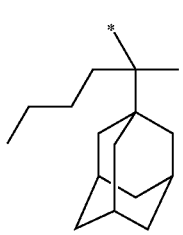
(r-rp-cm4)
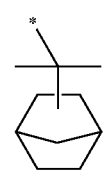
(r-pr-cm5)
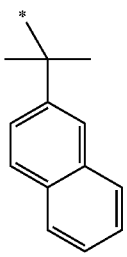
(r-pr-cm6)
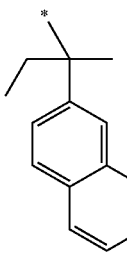
(r-pr-cm7)
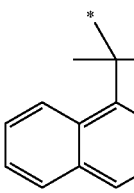
(r-pr-cm8)
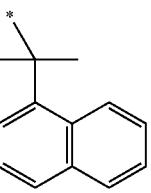

(r-pr-cs1)

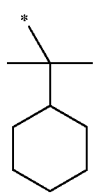

(r-pr-cs2)

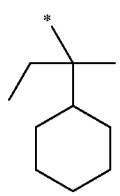

(r-pr-cs3)

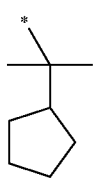

(r-pr-cs4)

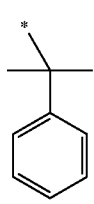

(r-pr-cs5)

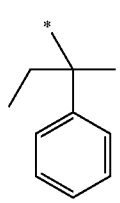

(r-pr-c1)

(r-pr-c2)

(r-pr-c3)

In addition, examples of the acid dissociable group which protects a hydroxyl group out of the polar groups described above include an acid dissociable group which is represented by General Formula (a1-r-3) described below (may be referred to below as a "tertiary alkyloxycarbonyl acid dissociable group" for convenience).

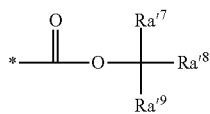

(a1-r-3)

[In General Formula (a1-r-3), $Ra'^7$ to $Ra'^9$ each independently indicate an alkyl group. * has the meaning of an atomic bond.]

In General Formula (a1-r-3), $Ra'^7$ to $Ra'^9$ are preferably an alkyl group with 1 to 5 carbon atoms and more preferably an alkyl group with 1 to 3 carbon atoms.

In addition, the total number of carbon atoms of each of the alkyl groups is preferably 3 to 7, more preferably 3 to 5, and most preferably 3 or 4.

Examples of the constituent unit (a1) include a constituent unit which is a constituent unit which is derived from acrylic acid ester where a hydrogen atom which is bonded with a carbon atom at an α-position may be substituted with a substituent group and which includes an acid decomposable group of which a polarity increases due to an effect of an acid; a constituent unit where at least one hydrogen atom in a hydroxyl group of a constituent unit which is derived from hydroxy styrene or a hydroxy styrene derivative is protected by a substituent group which includes the acid dissociable group; a constituent unit where at least one hydrogen atom in —C(=O)—OH of a constituent unit which is derived from vinyl benzoic acid or a vinyl benzoic acid derivative is protected by a substituent group which includes the acid dissociable group, and the like.

Out of the above, the constituent unit (a1) is preferably a constituent unit which is derived from acrylic acid ester where a hydrogen atom which is bonded with a carbon atom at an α-position may be substituted with a substituent group.

The constituent unit (a1) is preferably a constituent unit which is represented by General Formula (a1-1) or (a1-2) described below.

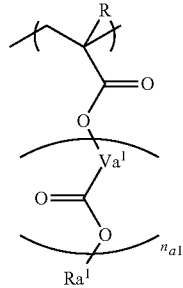

(a1-1)

(a1-2)

[In General Formula (a1-1) or (a1-2), R is a hydrogen atom, an alkyl group with 1 to 5 carbon atoms or a halogenated alkyl group with 1 to 5 carbon atoms. $Va^1$ is a divalent hydrocarbon group which may have an ether bond, a urethane bond, or an amide bond, $n_{a1}$ is an integer of 0 to 2, and $Ra^1$ is an acid dissociable group which is represented by General Formula (a1-r-1) or (a1-r-2) described above. $Wa^1$ is an $n_{a2}+1$-valent hydrocarbon group, $n_{a2}$ is an integer of 1 to 3, and $Ra^2$ is an acid dissociable group which is represented by General Formula (a1-r-1) or (a1-r-3) described above.]

In General Formula (a1-1) described above, an alkyl group with 1 to 5 carbon atoms is preferably an alkyl group in straight-chain form or branched-chain form with 1 to 5 carbon atoms and specific examples thereof include a methyl group, an ethyl group, a propyl group, an isopropyl group, an n-butyl group, an isobutyl group, a tert-butyl group, a pentyl group, an isopentyl group, a neopentyl group, and the like. A halogenated alkyl group with 1 to 5 carbon atoms is a group where some or all of the hydrogen atoms of the alkyl group with 1 to 5 carbon atoms are substituted with halogen atoms. Examples of the halogen atoms include a fluorine atom, a chlorine atom, a bromine atom, an iodine atom, and the like and a fluorine atom is particularly preferable.

R is preferably a hydrogen atom, an alkyl group with 1 to 5 carbon atoms or a fluorinated alkyl group with 1 to 5 carbon atoms and, in terms of being easily obtained industrially, a hydrogen atom or a methyl group is most preferable.

A hydrocarbon group of $Va^1$ may be an aliphatic hydrocarbon group and may be an aromatic hydrocarbon group. An aliphatic hydrocarbon group has the meaning of a hydrocarbon group which does not have aromaticity. An aliphatic hydrocarbon group as a divalent hydrocarbon group in $Va^1$ may be saturated or may be unsaturated and is generally preferably saturated.

More specific examples of the aliphatic hydrocarbon group include an aliphatic hydrocarbon group in straight-chain form or branched-chain form, an aliphatic hydrocarbon group which includes a ring in the structure, and the like.

In addition, examples of $Va^1$ include one where the divalent hydrocarbon group is bonded via an ether bond, a urethane bond, or an amide bond.

The aliphatic hydrocarbon group in straight-chain form or branched-chain form preferably has 1 to 10 carbon atoms, more preferably 1 to 6 carbon atoms, even more preferably 1 to 4 carbon atoms, and most preferably 1 to 3 carbon atoms.

An aliphatic hydrocarbon group in straight-chain form is preferably an alkylene group in straight-chain form and specific examples thereof include a methylene group [—$CH_2$—], an ethylene group [—$(CH_2)_2$—], a trimethylene group [—$(CH_2)_3$—], a tetramethylene group [—$(CH_2)_4$—], a pentamethylene group [—$(CH_2)_5$—], and the like.

An aliphatic hydrocarbon group in a branched-chain form is preferably an alkylene group in a branched-chain form and specific examples thereof include an alkyl alkylene group such as an alkyl methylene group such as —CH($CH_3$)—, —CH($CH_2CH_3$)—, —C($CH_3$)$_2$—, —C($CH_3$)($CH_2CH_3$)—, —C($CH_3$)($CH_2CH_2CH_3$)—, and —C($CH_2CH_3$)$_2$—; an alkyl ethylene group such as —CH($CH_3$)$CH_2$—, —CH($CH_3$)CH($CH_3$)—, —C($CH_3$)$_2CH_2$—, —CH($CH_2CH_3$)$CH_2$—, and —C($CH_2CH_3$)$_2$—$CH_2$—; an alkyl trimethylene group such as —CH($CH_3$)$CH_2CH_2$— and —$CH_2CH$($CH_3$)$CH_2$—; and an alkyl tetramethylene group such as —CH($CH_3$)$CH_2CH_2CH_2$— and —$CH_2CH$($CH_3$)$CH_2CH_2$—, and the like. The alkyl group in the alkyl alkylene group is preferably an alkyl group in straight-chain form with 1 to 5 carbon atoms.

Examples of an aliphatic hydrocarbon group which includes a ring in the structure thereof include an alicyclic hydrocarbon group (a group where two hydrogen atoms are removed from an aliphatic hydrocarbon ring), a group where an alicyclic hydrocarbon group is bonded with an end of an aliphatic hydrocarbon group in straight-chain form or branched-chain form, a group where an alicyclic hydrocarbon group is interposed in an aliphatic hydrocarbon group in straight-chain form or branched-chain form, and the like. Examples of the aliphatic hydrocarbon group in straight-chain form or branched-chain form include the same examples as described above.

The alicyclic hydrocarbon group preferably has 3 to 20 carbon atoms and more preferably 3 to 12 carbon atoms.

The alicyclic hydrocarbon group may be polycyclic or may be monocyclic. The monocyclic alicyclic hydrocarbon group is preferably a group where two hydrogen atoms are removed from monocycloalkane. The monocycloalkane preferably has 3 to 6 carbon atoms and specific examples thereof include cyclopentane, cyclohexane, and the like. The polycyclic alicyclic hydrocarbon group is preferably a group where two hydrogen atoms are removed from polycycloalkane, the polycycloalkane preferably has 7 to 12 carbon atoms, and specific examples thereof include adamantane, norbornane, isobornane, tricyclodecane, tetracyclodecane, and the like.

An aromatic hydrocarbon group is a hydrocarbon group which has an aromatic ring.

The aromatic hydrocarbon group as the divalent hydrocarbon group in $Va^1$ preferably has 3 to 30 carbon atoms, more preferably 5 to 30 carbon atoms, even more preferably 5 to 20 carbon atoms, and particularly preferably 6 to 15 carbon atoms, and most preferably 6 to 10 carbon atoms. However, the number of carbon atoms does not include the number of carbon atoms in a substituent group.

Specific examples of the aromatic ring of the aromatic hydrocarbon group include an aromatic hydrocarbon ring such as benzene, biphenyl, fluorene, naphthalene, anthracene, and phenanthrene; an aromatic heterocyclic ring where some carbon atoms which form the aromatic hydrocarbon ring are substituted with hetero atoms; and the like. Examples of the hetero atom in the aromatic heterocyclic ring include an oxygen atom, a sulfur atom, a nitrogen atom, and the like.

Specific examples of the aromatic hydrocarbon group include a group (an arylene group) where two hydrogen atoms are removed from the aromatic hydrocarbon ring; a group (for example, a group where one hydrogen atom is further removed from an aryl group in an aryl alkyl group such as a benzyl group, a phenethyl group, a 1-naphthyl methyl group, a 2-naphthyl methyl group, a 1-naphthyl ethyl group, and a 2-naphthyl ethyl group) where one of the hydrogen atoms of a group (an aryl group) where one hydrogen atoms is removed from the aromatic hydrocarbon ring is substituted with an alkylene group; and the like. The number of carbon atoms of the alkylene group (an alkyl chain in an aryl alkyl group) is preferably 1 to 4, more preferably 1 or 2, and particularly preferably 1.

In General Formula (a1-2) described above, the $n_{a2}+1$-valent hydrocarbon group in $Wa^1$ may be an aliphatic hydrocarbon group and may be an aromatic hydrocarbon group. The aliphatic hydrocarbon group has the meaning of a hydrocarbon group which does not have aromaticity and may be saturated and may be unsaturated and is generally preferably saturated. Examples of the aliphatic hydrocarbon group include an aliphatic hydrocarbon group in a straight-chain from or branched-chain form, an aliphatic hydrocarbon group which includes a ring in the structure thereof, or a group which is a combination of an aliphatic hydrocarbon group in straight-chain form or branched-chain form and an aliphatic hydrocarbon group which includes a ring in the structure thereof and specific examples thereof include the same group as a group which is represented by $Va^1$ of General Formula (a1-1) described above.

The $n_{a2}+1$-valent is preferably divalent to tetravalent and more preferably divalent or trivalent.

A constituent unit which is represented by General Formula (a1-2) described above is particularly preferably a constituent unit which is represented by General Formula (a1-2-01) described below.

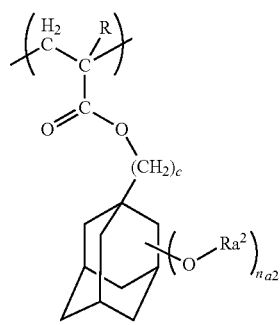

(a1-2-01)

In General Formula (a1-2-01), $Ra^2$ is an acid dissociable group which is represented by General Formula (a1-r-1) or (a1-r-3) described above. $n_{a2}$ is an integer of 1 to 3, preferably 1 or 2, and more preferably 1. c is an integer of 0 to 3, preferably 0 or 1, and more preferably 1. R is the same as described above.

Specific examples of a constituent unit which is represented by General Formula (a1-1) or (a1-2) described above will be shown below. In each of the formulas below, $R^\alpha$ indicates a hydrogen atom, a methyl group, or a trifluoromethyl group.

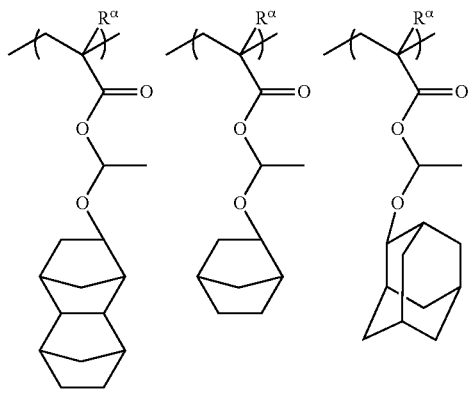

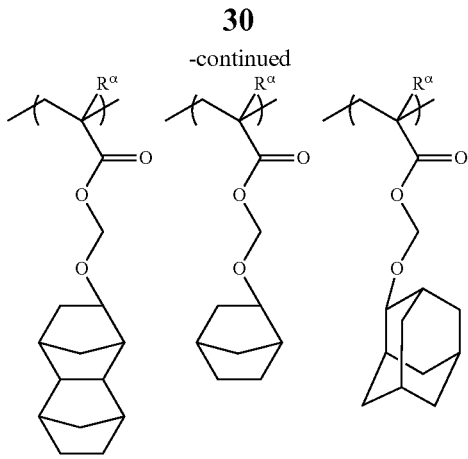

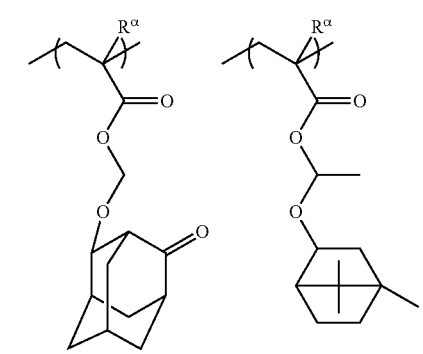

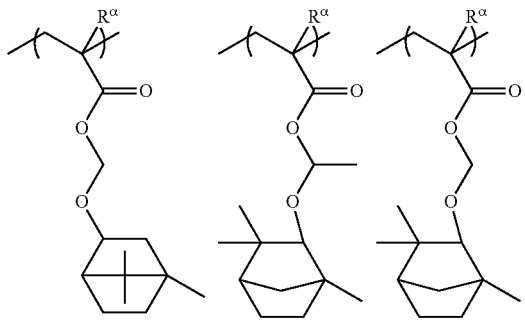

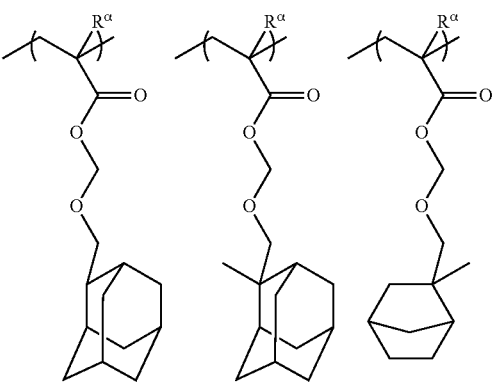

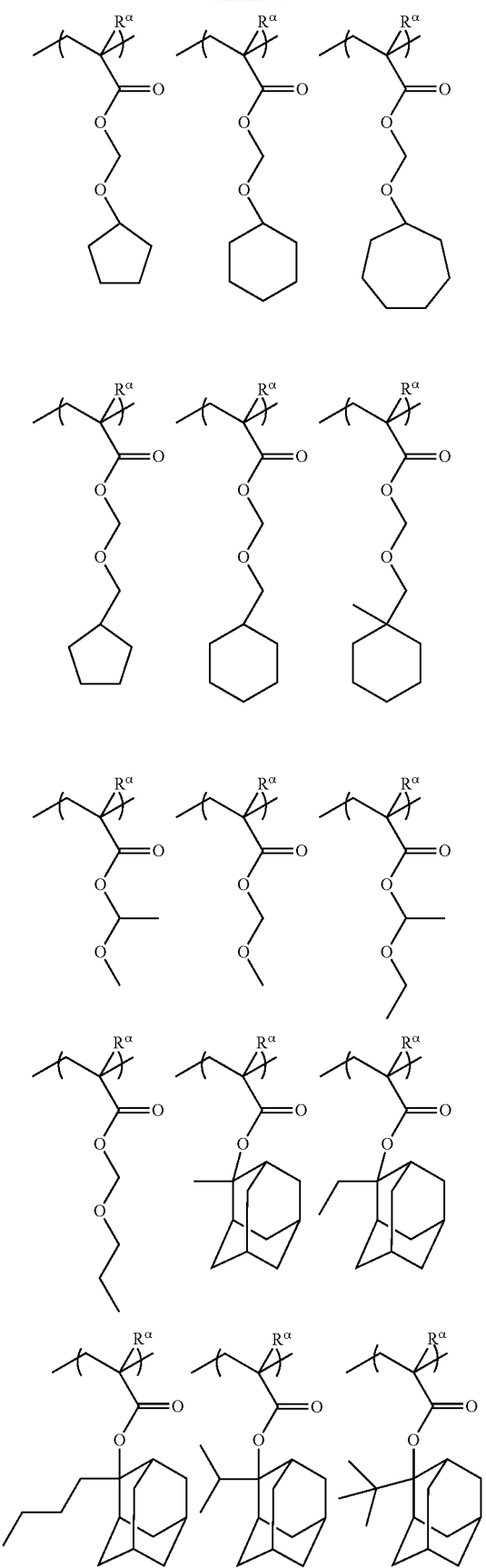
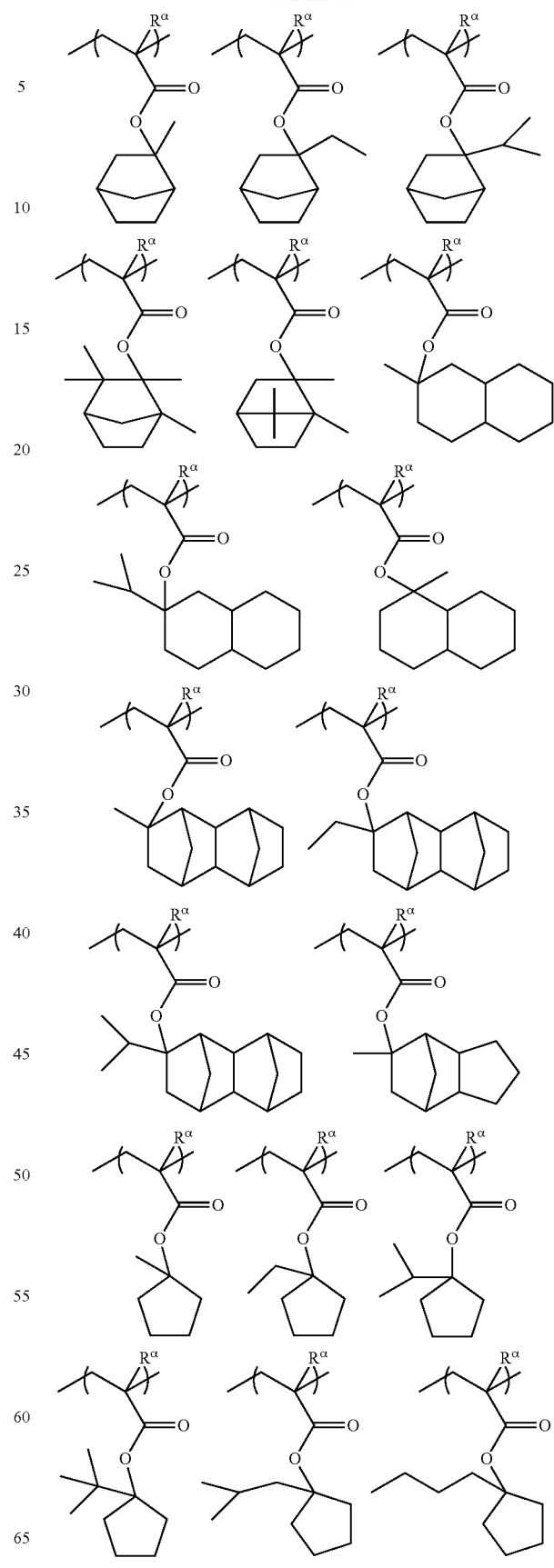

-continued
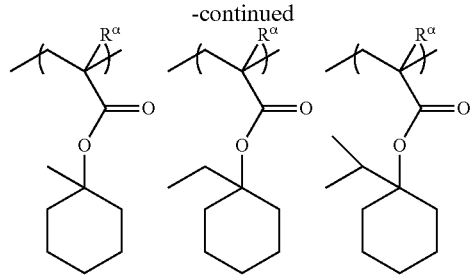
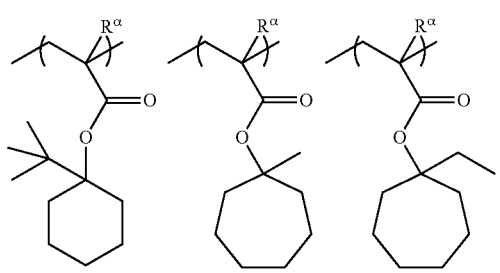
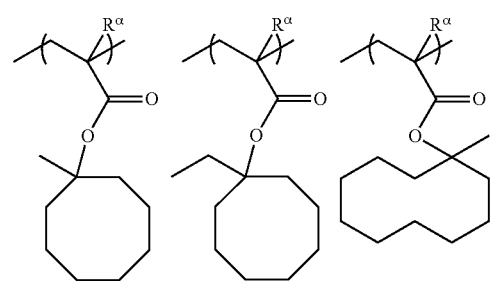
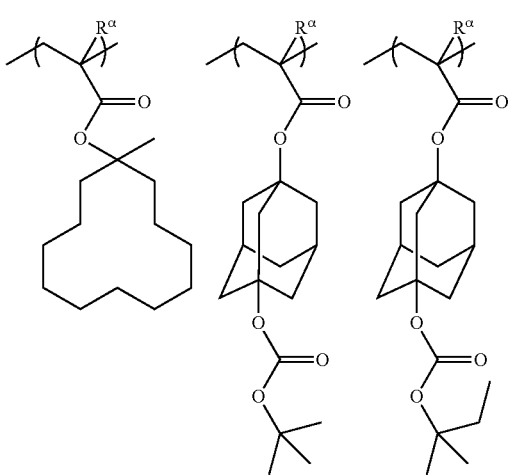
-continued
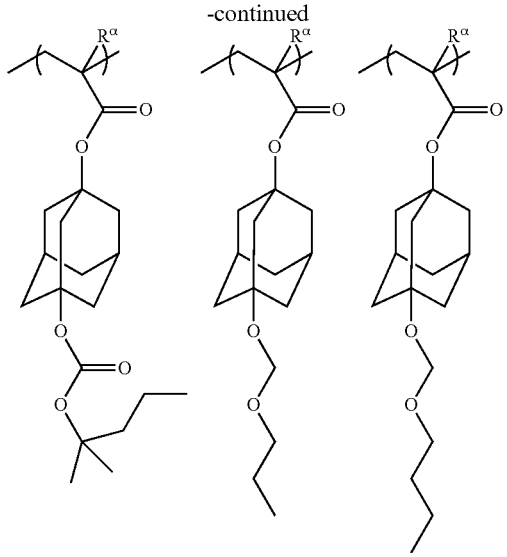
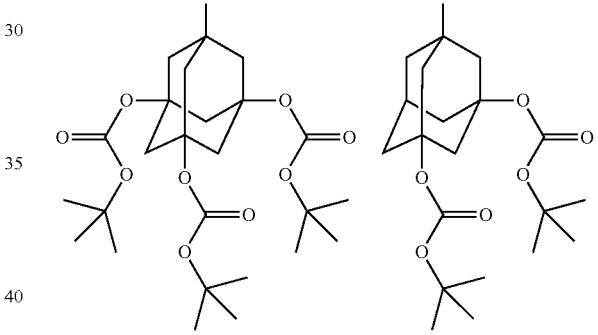
The constituent unit (a1) may be a constituent unit which is shown below in addition to the units described above. Below, R is the same as described above.

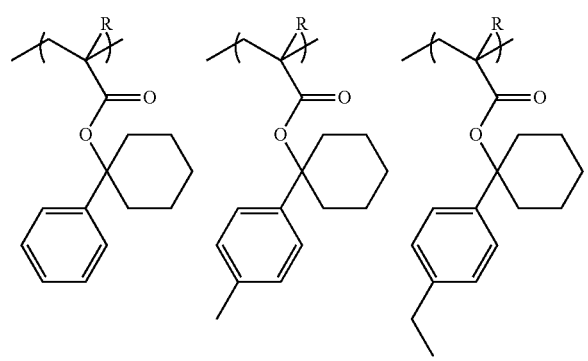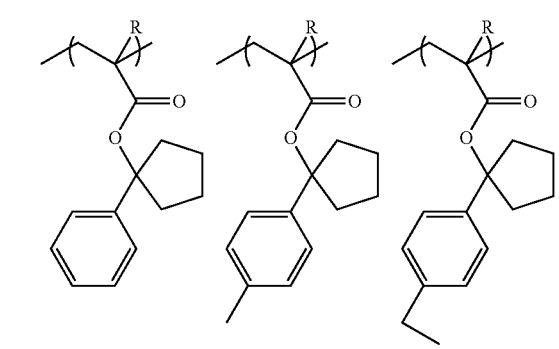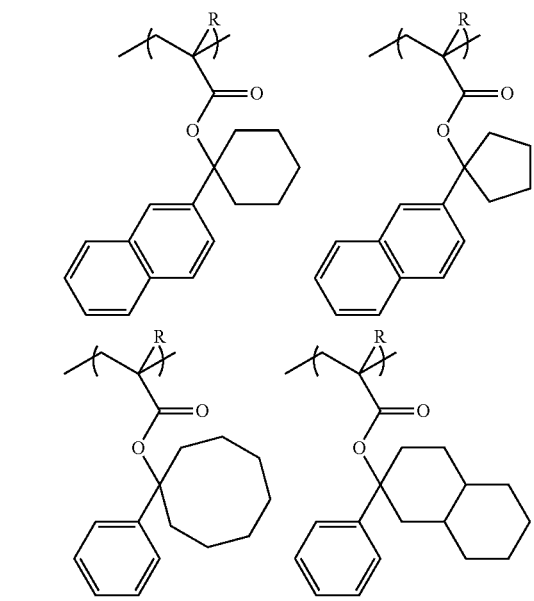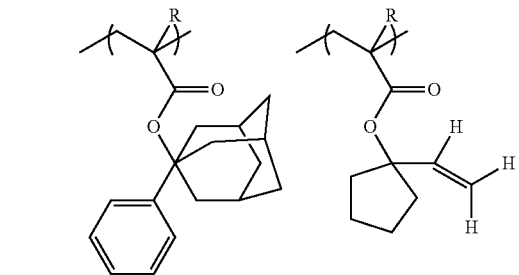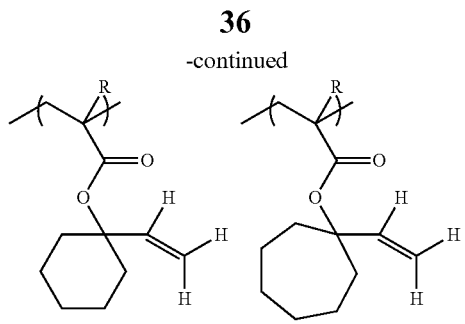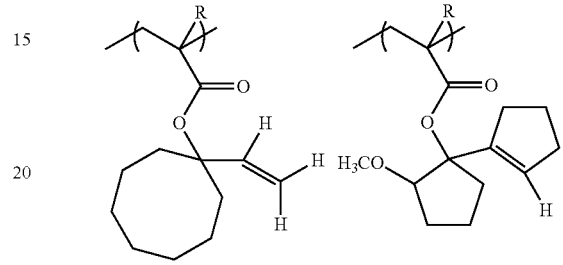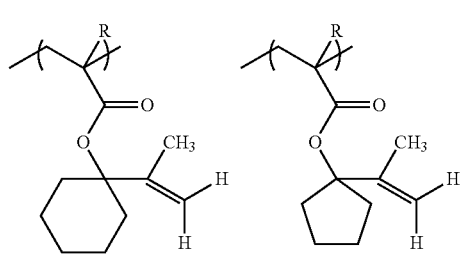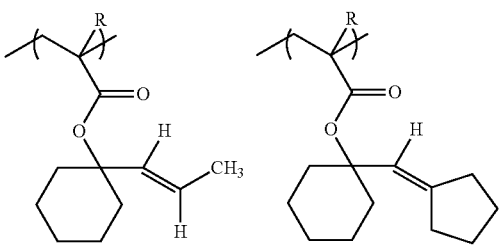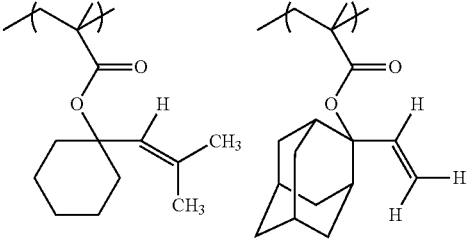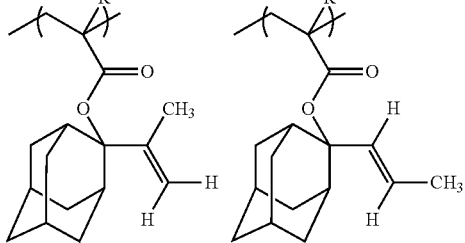

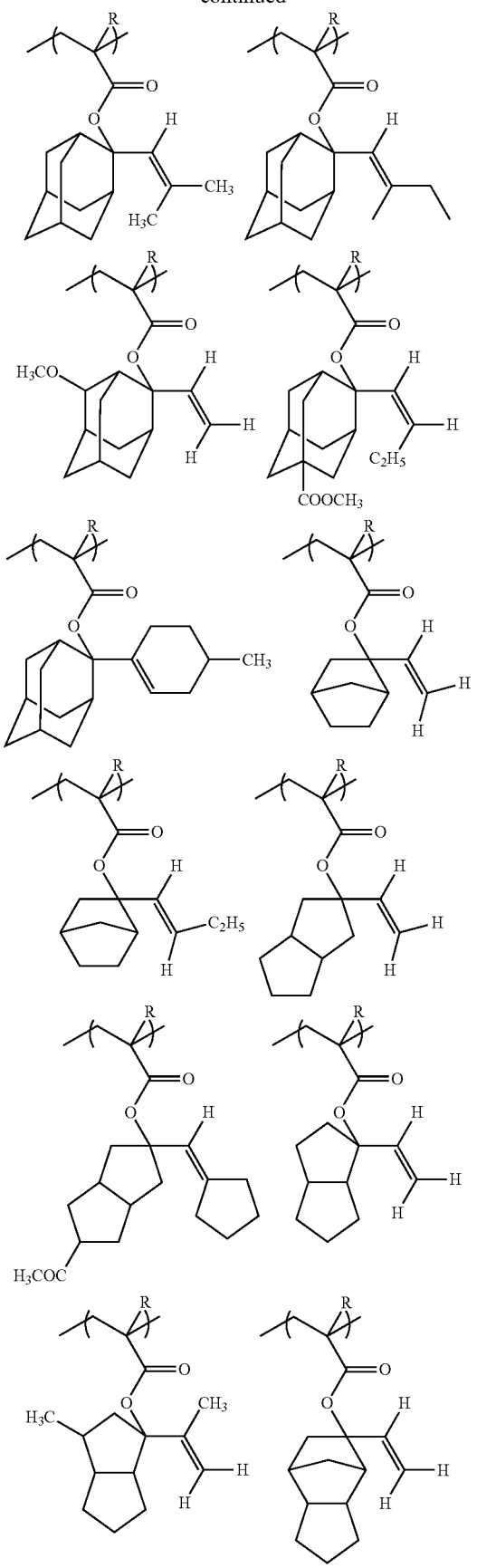
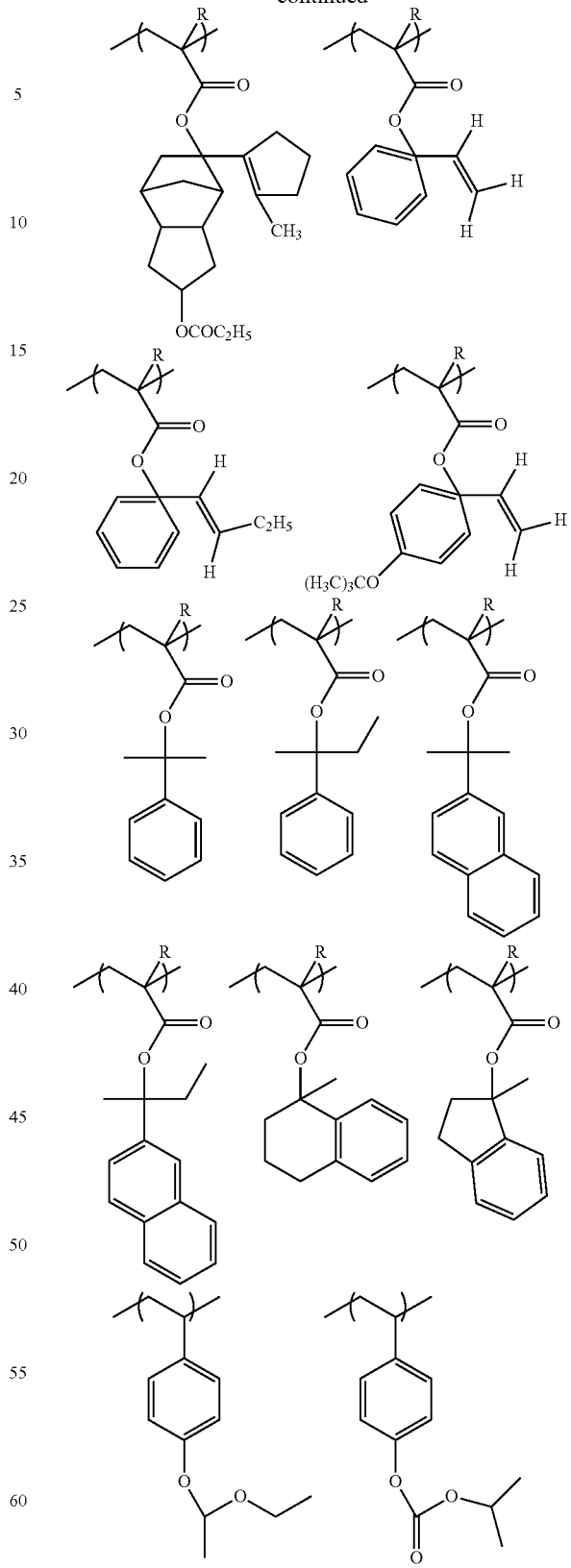
Constituent Unit (a20)
The constituent unit (a20) is a constituent unit which includes a base decomposable group. Examples of the constituent unit which includes a base decomposable group include a constituent unit (a2) (may be simply referred to below as a "constituent unit (a2)") which has a —$SO_2$— containing cyclic group, a lactone-containing cyclic group, a carbonate-containing cyclic group, or a heterocyclic group other than these, a constituent unit (a9), and a constituent unit (f).

Here, out of the constituent units (a1) described above, a constituent unit which is a constituent unit which is represented by General Formula (a1-1) and where $n_{a1}$ in General Formula (a1-1) is 1 or 2 is a constituent unit (a1) and, at the same time, also equivalent to a constituent unit which includes a base decomposable group.

Constituent Unit (a2)

The constituent unit (a2) is a constituent unit which has a —$SO_2$— containing cyclic group, a lactone-containing cyclic group, a carbonate-containing cyclic group, or a heterocyclic group other than these.

The constituent unit (a2) is preferably a constituent unit which is represented by General Formula (a2-1) described below.

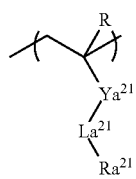

(a2-1)

[In General Formula (a2-1), R is a hydrogen atom, an alkyl group with 1 to 5 carbon atoms, or a halogenated alkyl group with 1 to 5 carbon atoms, $Ya^{21}$ is a single bond or a divalent linking group, $La^{21}$ is —O—, —COO—, —CON(R')—, —OCO—, —CONHCO—, or —CONHCS—, and R' indicates a hydrogen atom or a methyl group. However, in a case where $La^{21}$ is —O—, $Ya^{21}$ is not —CO—. $Ra^{21}$ is a —$SO_2$— containing cyclic group, a lactone-containing cyclic group, a carbonate-containing cyclic group, or a heterocyclic group other than these.]

A divalent linking group of $Ya^{21}$ is not particularly limited; however, favorable examples thereof include a divalent hydrocarbon group which may have a substituent group, a divalent linking group which includes a hetero atom, and the like.

Examples of the divalent linking group of $Ya^{21}$ include the same linking groups as the divalent linking group which is described in the $Ya^{01}$.

In the present embodiment, $Ya^{21}$ is preferably a single bond, an ester bond [—C(=O)—O—], an ether bond (—O—), an alkyl group in straight-chain form or branched-chain form, or a combination thereof In General Formula (a2-1) described above, $Ra^{21}$ is a —$SO_2$— containing cyclic group, a lactone-containing cyclic group, a carbonate-containing cyclic group, or a heterocyclic group other than these.

A "—$SO_2$— containing cyclic group" indicates a cyclic group which contains a ring which includes —$SO_2$— in the ring skeleton thereof and is specifically a cyclic group where a sulfur atom (S) in —$SO_2$— forms a part of the ring skeleton of a cyclic group. In a case of counting a ring which includes —$SO_2$— in the ring skeleton as the first ring, the ring itself is referred to as a monocyclic group and, in a case of also having another ring structure, as a polycyclic group, regardless of the structure thereof. The —$SO_2$-containing cyclic group may be monocyclic or may be polycyclic.

The —$SO_2$— containing cyclic group is particularly preferably a cyclic group which includes —O—$SO_2$— in the ring skeleton, that is, a cyclic group which contains a sultone ring where —O—S— in —O—$SO_2$— forms a part of a ring skeleton. More specific examples of the —$SO_2$— containing cyclic group include groups which are each represented by General Formulas (a5-r-1) to (a5-r-4) described below.

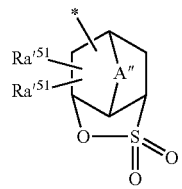

(a5-r-1)

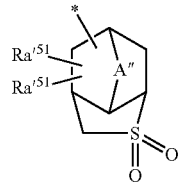

(a5-r-2)

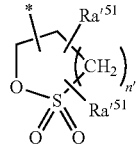

(a5-r-3)

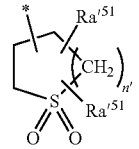

(a5-r-4)

[In the formula, $Ra'^{51}$ is each independently a hydrogen atom, an alkyl group, an alkoxy group, a halogen atom, a halogenated alkyl group, a hydroxyl group, —COOR", —OC(=O)R", a hydroxy alkyl group, or a cyano group; R" is a hydrogen atom or an alkyl group; A" is an alkylene group with 1 to 5 carbon atoms which may include an oxygen atom or a sulfur atom, an oxygen atom, or a sulfur atom, and n' is an integer of 0 to 2.]

In General Formulas (a5-r-1) to (a5-r-4) described above, A" is the same as A" in General Formulas (a2-r-1) to (a2-r-7) which will be described below. An alkyl group, an alkoxy group, a halogen atom, a halogenated alkyl group, —COOR", —OC(=O)R", and a hydroxy alkyl group in $Ra'^{51}$ are the same as in $Ra'^{21}$ in General Formulas (a2-r-1) to (a2-r-7) which will be described below.

Specific examples of a group which is each represented by General Formulas (a5-r-1) to (a5-r-4) will be given below. "Ac" in the formulas indicates an acetyl group. "*" indicates an atomic bond.

(r-sl-1-1) 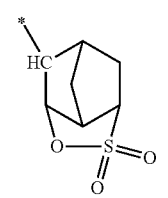
(r-sl-1-2) 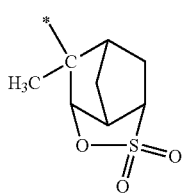
(r-sl-1-3) 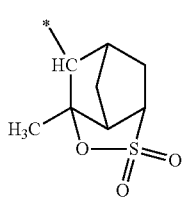
(r-sl-1-4) 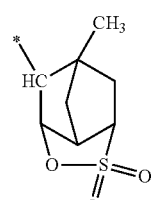
(r-sl-1-5) 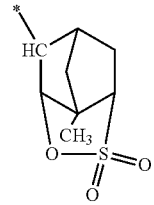
(r-sl-1-6) 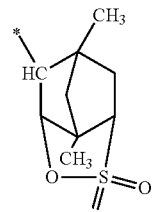
(r-sl-1-7) 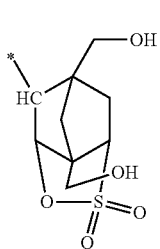
(r-sl-1-8) 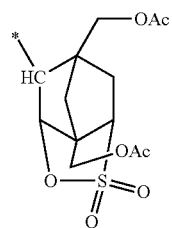
(r-sl-1-9) 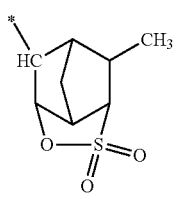
(r-sl-1-10) 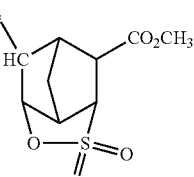
(r-sl-1-11) 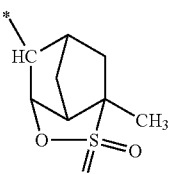
(r-sl-1-12) 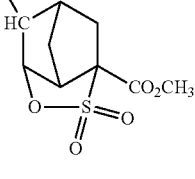
(r-sl-1-13) 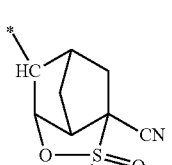
(r-sl-1-14) 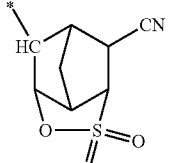
(r-sl-1-15) 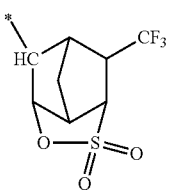

(r-sl-1-16)
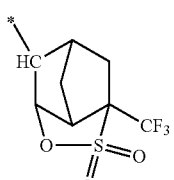
(r-sl-1-17)
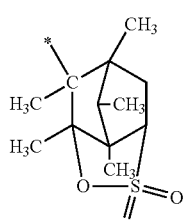
(r-sl-1-18)
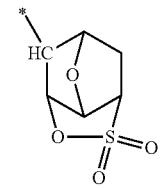
(r-sl-1-19)
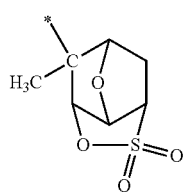
(r-sl-1-20)
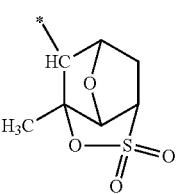
(r-sl-1-21)
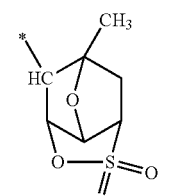
(r-sl-1-22)
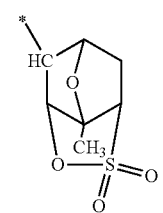
(r-sl-1-23)
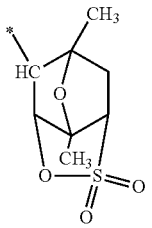
(r-sl-1-24)
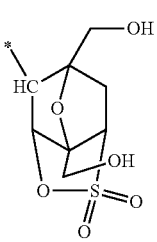
(r-sl-1-25)
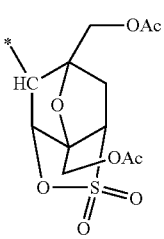
(r-sl-1-26)
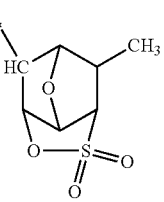
(r-sl-1-27)
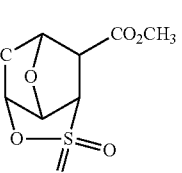
(r-sl-1-28)
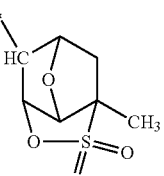
(r-sl-1-29)
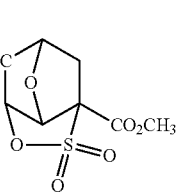

(r-sl-30)
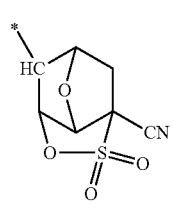

(r-sl-1-31)
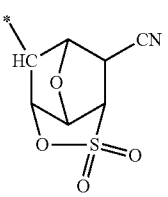

(r-sl-1-32)
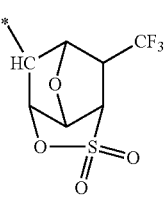

(r-sl-1-33)
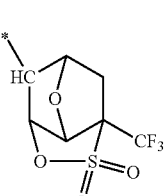

(r-sl-2-1)
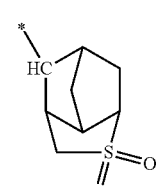

(r-sl-2-2)
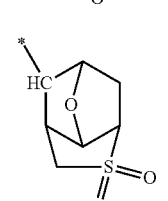

(r-sl-3-1)
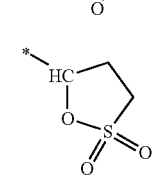

(r-sl-4-1)
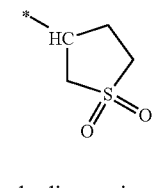

In the present embodiment, in a case where the constituent unit (a2) includes a —SO$_2$— containing cyclic group, among the described above, a group which is represented by General Formula (a5-r-1) is preferable, the use of at least one type selected from a group consisting of groups which are represented by any of Chemical Formulas (r-s1-1-1), (r-s1-1-18), (r-s1-3-1), and (r-s1-4-1) is more preferable, and a group which is represented by Chemical Formula (r-s1-1-1) described above is most preferable.

The "lactone-containing cyclic group" indicates a cyclic group which contains a ring (a lactone ring) which includes —O—C(=O)— in the ring skeleton thereof. In a case of counting a lactone ring as the first ring, the lactone ring itself is referred to as a monocyclic group and in a case of also having another ring structure, as a polycyclic group, regardless of the structure thereof. The lactone-containing cyclic group may be a monocyclic group or may be a polycyclic group.

As the lactone-containing cyclic group, it is possible to use an arbitrary group without being particularly limited. Specific examples thereof include groups which are each represented by General Formulas (a2-r-1) to (a2-r-7) described below. In the following formulas, "*" represents an atomic bond.

(a2-r-1)
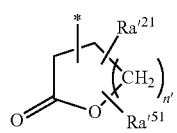

(a2-r-2)
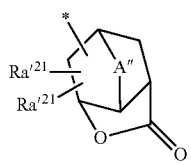

(a2-r-3)
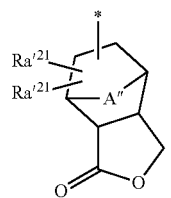

(a2-r-4)
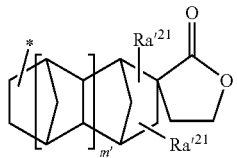

(a2-r-5)
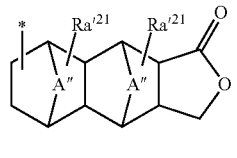

(a2-r-6)
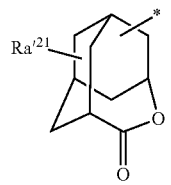

-continued

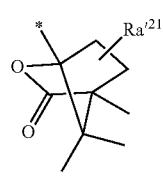
(a2-r-7)

[In the formulas, $Ra'^{21}$ is each independently a hydrogen atom, an alkyl group, an alkoxy group, a halogen atom, a halogenated alkyl group, a hydroxyl group, —COOR", —OC(=O)R", a hydroxy alkyl group, or a cyano group; R" is a hydrogen atom or an alkyl group; A" is an alkylene group with 1 to 5 carbon atoms which may include an oxygen atom or a sulfur atom, an oxygen atom, or a sulfur atom, n' is an integer of 0 to 2, and m' is 0 or 1.]

In General Formulas (a2-r-1) to (a2-r-7) described above, A" is an alkylene group with 1 to 5 carbon atoms which may include an oxygen atom (—O—) or a sulfur atom (—S—), an oxygen atom, or a sulfur atom. An alkylene group with 1 to 5 carbon atoms in A" is preferably an alkylene group in straight-chain form or branched-chain form and examples thereof include a methylene group, an ethylene group, an n-propylene group, an isopropylene group, and the like. In a case where the alkylene group includes an oxygen atom or a sulfur atom, specific examples thereof include a group where —O— or —S— is interposed at the end of the alkylene group or between carbon atoms and examples thereof include —O—CH$_2$—, —CH$_2$—O—CH$_2$—, —S—CH$_2$—, —CH$_2$—S—CH$_2$—, and the like. A" is preferably an alkylene group with 1 to 5 carbon atoms or —O—, more preferably an alkylene group with 1 to 5 carbon atoms, and most preferably a methylene group. $Ra'^{21}$ is each independently an alkyl group, an alkoxy group, a halogen atom, a halogenated alkyl group, —COOR", —OC(=O)R", a hydroxy alkyl group, or a cyano group.

An alkyl group in $Ra'^{21}$ is preferably an alkyl group with 1 to 5 carbon atoms.

An alkoxy group in $Ra'^{21}$ is preferably an alkoxy group with 1 to 6 carbon atoms. The alkoxy group is preferably in straight-chain form or branched-chain form. Specific examples thereof include a group where an alkyl group which is exemplified as the alkyl group in the $Ra'^{21}$ and an oxygen atom (—O—) are linked with each other.

Examples of a halogen atom in $Ra'^{21}$ include a fluorine atom, a chlorine atom, a bromine atom, an iodine atom, and the like and a fluorine atom is preferable.

Examples of a halogenated alkyl group in $Ra'^{21}$ include a group where some or all of the hydrogen atoms of the alkyl group in the $Ra'^{21}$ are substituted with the halogen atoms. The halogenated alkyl group is preferably a fluorinated alkyl group and particularly preferably a perfluoroalkyl group.

R" is a hydrogen atom or an alkyl group and an alkyl group of R" is preferably an alkyl group with 1 to 5 carbon atoms.

Specific examples of a group which is each represented by General Formulas (a2-r-1) to (a2-r-7) will be given below.

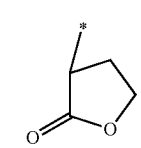
(r-lc-1-1)

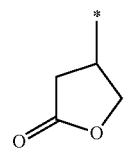
(r-lc-1-2)

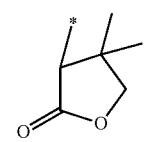
(r-lc-1-3)

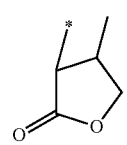
(r-lc-1-4)

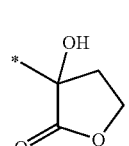
(r-lc-1-5)

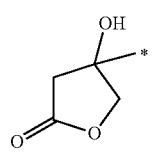
(r-lc-1-6)

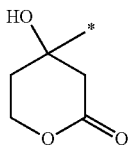
(r-lc-1-7)

(r-lc-2-1)

(r-lc-2-2)

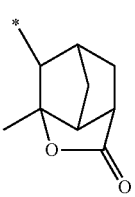
(r-lc-2-3)

(r-lc-2-4)
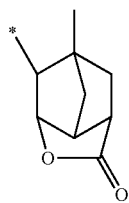
(r-lc-2-5)
(r-lc-2-6)
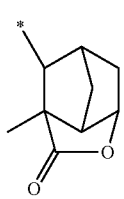
(r-lc-2-7)
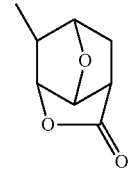
(r-lc-2-8)
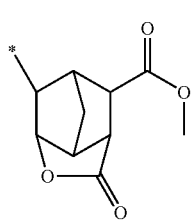
(r-lc-2-9)
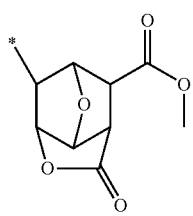
(r-lc-2-10)
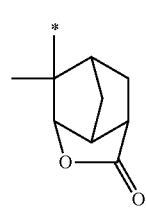
(r-lc-2-11)
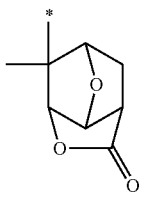
(r-lc-2-12)
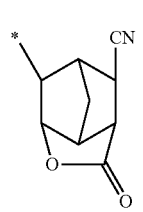
(r-lc-2-13)
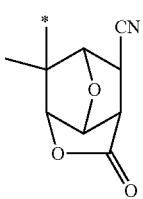
(r-lc-3-1)
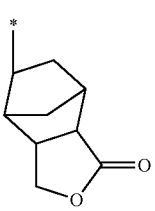
(r-lc-3-2)
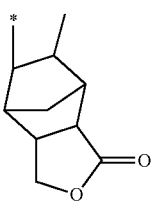
(r-lc-3-3)
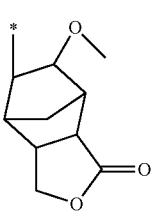
(r-lc-3-4)
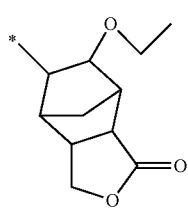

-continued
(r-lc-3-5)
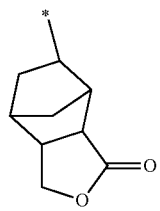
(r-lc-4-1)
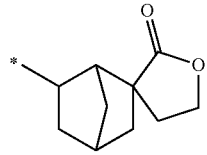
(r-lc-4-2)
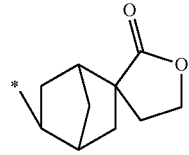
(r-lc-4-2)
(r-lc-4-3)
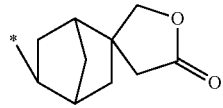
(r-lc-4-5)
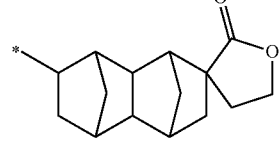
(r-lc-4-6)
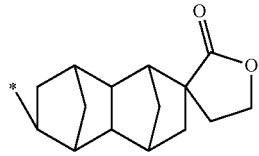
(r-lc-4-7)
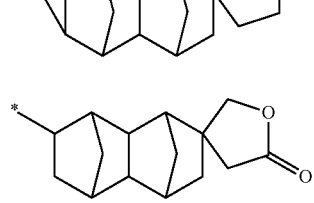
(r-lc-4-8)
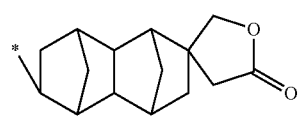
(r-lc-4-9)
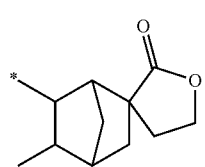
-continued
(r-lc-5-1)
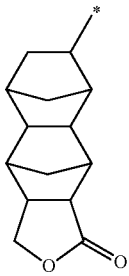
(r-lc-5-2)
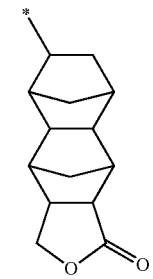
(r-lc-5-3)
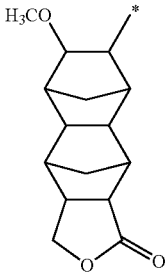
(r-lc-5-4)
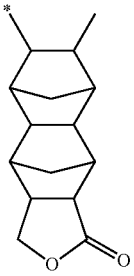
(r-lc-6-1)
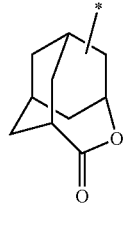
(r-lc-7-1)
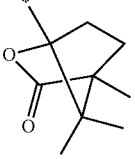
In the present embodiment, the constituent unit (a2) is preferably groups which are each represented by General Formula (a2-r-1) or (a2-r-2) described above and more preferably groups which are each represented by Chemical Formula (r-1c-1-1) or (r-1c-2-7) described above.

A "carbonate-containing cyclic group" indicates a cyclic group which contains a ring (a carbonate ring) which includes —O—C(═O)—O— in the ring skeleton thereof. In a case of counting a carbonate ring as the first ring, the carbonate ring itself is referred to as a monocyclic group and in a case of also having another ring structure, as a polycyclic group, regardless of the structure thereof. The carbonate-containing cyclic group may be a monocyclic group and may be a polycyclic group.

As the carbonate ring-containing cyclic group, it is possible to use an arbitrary group without being particularly limited. Specific examples thereof include groups which are each represented by General Formulas (ax3-r-1) to (ax3-r-3) described below.

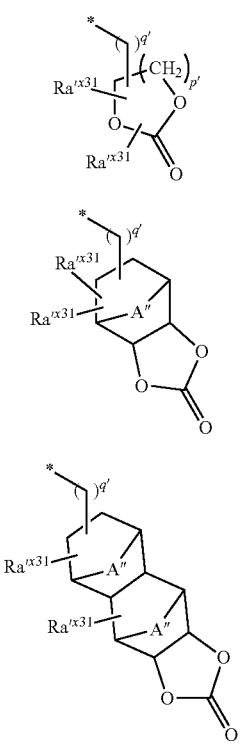

[In the formulas, Ra$'^{x31}$ is each independently a hydrogen atom, an alkyl group, an alkoxy group, a halogen atom, a halogenated alkyl group, a hydroxyl group, —COOR", —OC(═O)R", a hydroxy alkyl group, or a cyano group; R" is a hydrogen atom or an alkyl group; A" is an alkylene group having 1 to 5 carbons atoms which may include an oxygen atom or a sulfur atom, an oxygen atom, or a sulfur atom; and q' is 0 or 1. p' is an integer of 0 to 3.]

A" in General Formulas (ax3-r-1) to (ax3-r-3) described above is the same as A" in General Formula (a2-r-1) described above.

Examples of an alkyl group, an alkoxy group, a halogen atom, a halogenated alkyl group, —COOR", —OC(═O)R", and a hydroxy alkyl group in Ra$'^{31}$ include the same as the examples which are given in the description of Ra$'^{2t}$ in General Formulas (a2-r-1) to (a2-r-7) described above respectively.

Specific examples of groups which are each represented by General Formulas (ax3-r-1) to (ax3-r-3) will be given below.

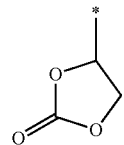 (r-cr-1-1)

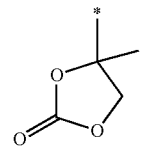 (r-cr-1-2)

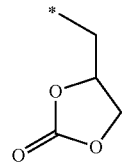 (r-cr-1-3)

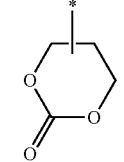 (r-cr1-4)

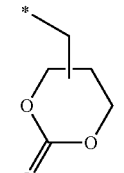 (r-cr-1-5)

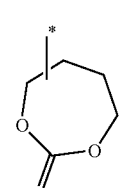 (r-cr-1-6)

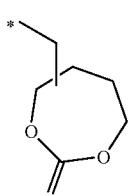 (r-cr-1-6)

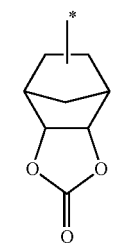 (r-cr-2-1)

(r-cr-2-2)

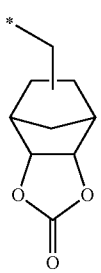

(r-cr-2-3)

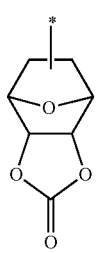

(r-cr-2-4)

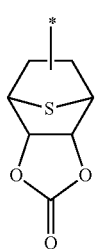

(r-cr-3-1)

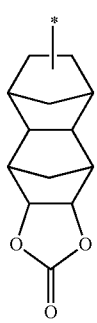

(r-cr-3-2)

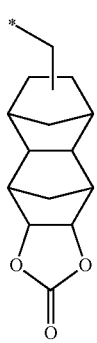

(r-cr-3-3)

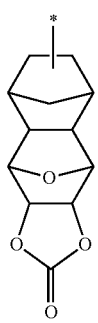

(r-cr-3-4)

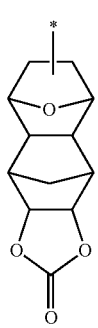

(r-cr-3-5)

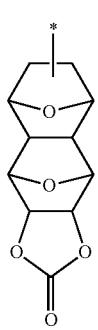

A "heterocyclic group" other than the groups described above refers to a cyclic group which includes one or more atoms other than a carbon atom in addition to carbon atoms and examples thereof include a heterocyclic group, a nitrogen-containing heterocyclic group, or the like which are each exemplified in Chemical Formulas (r-hr-1) to (r-hr-10) which will be described below. Examples of a nitrogen-containing heterocyclic group include a cycloalkyl group with 3 to 8 carbon atoms which may be substituted with one or two oxo groups. Favorable examples of the nitrogen-containing cycloalkyl group include a group where one or more hydrogen atoms are removed from 2,5-dioxopyrrolidine or 2,6-dioxopiperidine.

Constituent Unit (a9)

Examples of the constituent unit (a9) include a constituent unit which is represented by General Formula (a9-1) described below.

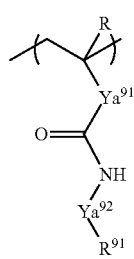

(a9-1)

[In the formula, R is the same as above and $Ya^{91}$ is a single bond or a divalent linking group, $R^{91}$ is a hydrocarbon group which may have a substituent group, and $Ya^{92}$ is a divalent linking group.]

In formula (a9-1) described above, examples of divalent linking groups in $Ya^{91}$ include the same examples as the divalent linking group of $Ya^{01}$ in General Formula (a10-1). $Ya^{91}$ is preferably a single bond.

In formula (a9-1) described above, examples of divalent linking groups in $Ya^{92}$ include the same examples as the divalent linking groups in $Ya^{01}$ in General Formula (a10-1) in the same manner as the divalent linking group in $Ya^{91}$ described above. Among them, in the divalent linking group in $Ya^{92}$ in formula (a9-1), as the divalent hydrocarbon group which may have a substituent group, a straight-chain or branched-chain aliphatic hydrocarbon group is preferable, preferably 1 to 10 carbon atoms, more preferably 1 to 6, even more preferably 1 to 4, and most preferably 1 to 3.

As the straight-chain aliphatic hydrocarbon group, a straight-chain alkylene group is preferable and specific examples thereof include a methylene group [—$CH_2$—], an ethylene group [—$(CH_2)_2$—], a trimethylene group [—$(CH_2)_3$—], a tetramethylene group [—$(CH_2)_4$—], a pentamethylene group [—$(CH_2)_5$—], and the like.

As the branched-chain aliphatic hydrocarbon group, branched alkylene group is preferable and specific examples thereof include an alkyl alkylene group such as an alkyl methylene group such as —$CH(CH_3)$—, —$CH(CH_2CH_3)$—, —$C(CH_3)_2$—$C(CH_3)(CH_2CH_3)$—, —$C(CH_3)(CH_2CH_2CH_3)$—, —$C(CH_2CH_3)_2$—; an alkyl ethylene group such as —$CH(CH_3)CH_2$—, —$CH(CH_3)CH(CH_3)$—, —$C(CH_3)_2CH_2$—, —$CH(CH_2CH_3)CH_2$—, —$C(CH_2CH_3)_2$—$CH_2$—; an alkyl trimethylene group such as —$CH(CH_3)CH_2CH_2$—, —$CH_2CH(CH_3)CH_2$—; an alkyl tetramethylene group such as —$CH(CH_3)CH_2CH_2CH_2$—, —$CH_2CH(CH_3)CH_2CH_2$— and the like. As the alkyl group in alkyl alkylene group, a straight-chain alkyl group with 1 to 5 carbon atoms is preferable.

In addition, in the divalent linking group in $Ya^{92}$ in formula (a9-1), examples of divalent linking groups which may have a hetero atom include —O—, —C(=O)—O—, —C(=O)—, —O—C(=O)—O—, —C(=O)—NH—, —NH—, —NH—C(=NH)— (H may be substituted with a substituent group such as an alkyl group or an acyl group), —S—, —S(=O)_2—, —S(=O)_2—O—, —C(=S)—, General Formula —$Y^{21}$—O—$Y^{22}$—, —$Y^{21}$—O—, —$Y^{21}$—C(=O)—O—, —C(=O)—O—$Y^{21}$—, a group which is represented by —[$Y^{21}$—C(=O)—O]_{m'}—$Y^{22}$— or —$Y^{21}$—O—C(=O)—$Y^{22}$— [in the formula, $Y^{21}$ and $Y^{22}$ are each independently a divalent hydrocarbon group which may have a substituent group, 0 is an oxygen atom, and m' is an integer of 0 to 3] and the like. Among them, —C(=O)— and —C(=S)— are preferable.

In formula (a9-1) described above, examples as the hydrocarbon group in $R^{91}$ include an alkyl group, a monovalent alicyclic hydrocarbon group, an aryl group, an aralkyl group, and the like.

An alkyl group in $R^{91}$ preferably has 1 to 8 carbon atoms, more preferably 1 to 6 carbon atoms, even more preferably 1 to 4 carbon atoms, and may be a straight-chain or branched-chain. Specific preferable examples thereof include a methyl group, an ethyl group, a propyl group, a butyl group, a hexyl group, an octyl group and the like.

A monovalent alicyclic hydrocarbon group in $R^{91}$ preferably has 3 to 20 carbon atoms, more preferably 3 to 12 carbon atoms, and may be polycyclic or monocyclic. As the monocyclic alicyclic hydrocarbon group, a group where one or more hydrogen atoms is removed from a monocycloalkane is preferable. As the monocycloalkane, a monocycloalkane with 3 to 6 carbon atoms is preferable, specific examples thereof include cyclobutane, cyclopentane, cyclohexane, and the like. As the polycyclic alicyclic hydrocarbon group, a group where one or more hydrogen atoms is removed from polycycloalkane is preferable, as the polycycloalkane, a polycycloalkane with 7 to 12 carbon atoms is preferable, and specific examples thereof include adamantane, norbornane, isobornane, tricyclodecane, tetracyclododecane, and the like.

An aryl group in $R^{91}$ preferably has 6 to 18 carbon atoms, more preferably 6 to 10 carbon atoms, specifically, a phenyl group is particularly preferable.

An aralkyl group in $R^{91}$ is preferably an aralkyl group with 7 to 10 carbon atoms and examples of the aralkyl group with 7 to 10 carbon atoms include aryl alkyl groups such as a benzyl group, a phenethyl group, a 1-naphthyl methyl group, a 2-naphthyl methyl group, a 1-naphthyl ethyl group, and a 2-naphthyl ethyl group.

A hydrocarbon group in $R^{91}$, some or all of the hydrogen atoms of the hydrocarbon group are preferably substituted with fluorine atoms, and more preferably 30% to 100% of the hydrogen atoms of the hydrocarbon group is substituted with fluorine atoms. Among these, a perfluoroalkyl group where all of the hydrogen atoms of the alkyl group described above are substituted with fluorine atoms is particularly preferable.

A hydrocarbon group in $R^{91}$ may have a substituent group. Examples of the substituent groups include a halogen atom, an oxo group (=O), a hydroxyl group (—OH), an amino group (—$NH_2$), —$SO_2$—$NH_2$, and the like. In addition, a part of the carbon atoms which form the hydrocarbon group may be substituted with a substituent group including a hetero atom. Examples of the substituent groups including the hetero atom include —O—, —NH—, —N=, —C(=O)—O—, —S—, —S(=O)_2—, and —S(=O)_2—O—.

In $R^{91}$, examples of the hydrocarbon group having a substituent group include a lactone-containing cyclic group which is respectively represented by General Formulas (a2-r-1) to (a2-r-7) described above.

In addition, in $R^{91}$, examples of the hydrocarbon group having a substituent group include a —$SO_2$— containing cyclic group which is respectively represented by General Formulas (a5-r-1) to (a5-r-4) described above; a substituted aryl group which is represented by the following chemical formulas, a monovalent heterocyclic group, and the like. In the formula below, "*" indicates an atomic bond with $Ya^{92}$.

(r-ar-1) 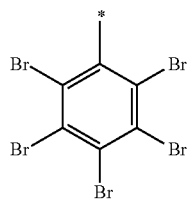
(r-ar-2) 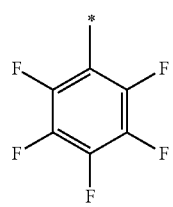
(r-ar-3) 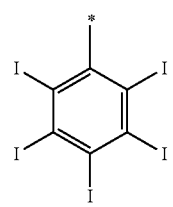
(r-ar-4) 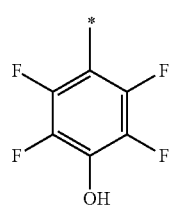
(r-ar-5) 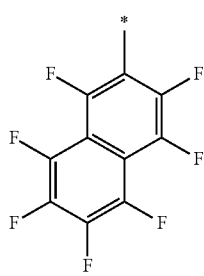
(r-ar-6) 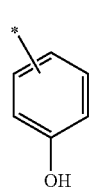
(r-ar-7) 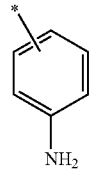
(r-ar-8) 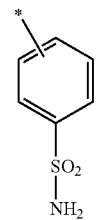
(r-hr-1) 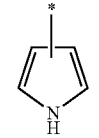
(r-hr-2) 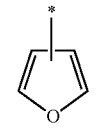
(r-hr-3) 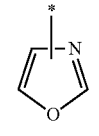
(r-hr-4) 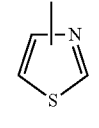
(r-hr-5) 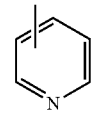
(r-hr-6) 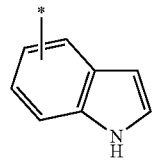
(r-hr-7) 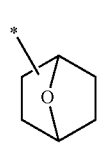
(r-hr-8) 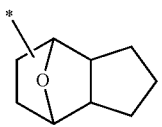
(r-hr-9) 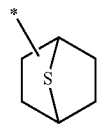

(r-hr-10)

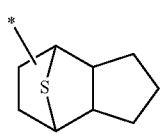

Specific examples of a constituent unit which is represented by General Formula (a9-1) described above will be shown below. In the formulas, $R^\alpha$ indicates a hydrogen atom, a methyl group, or a trifluoromethyl group.

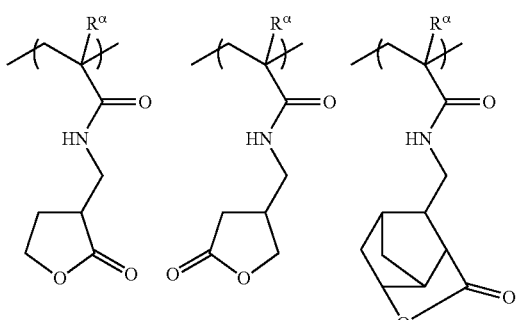

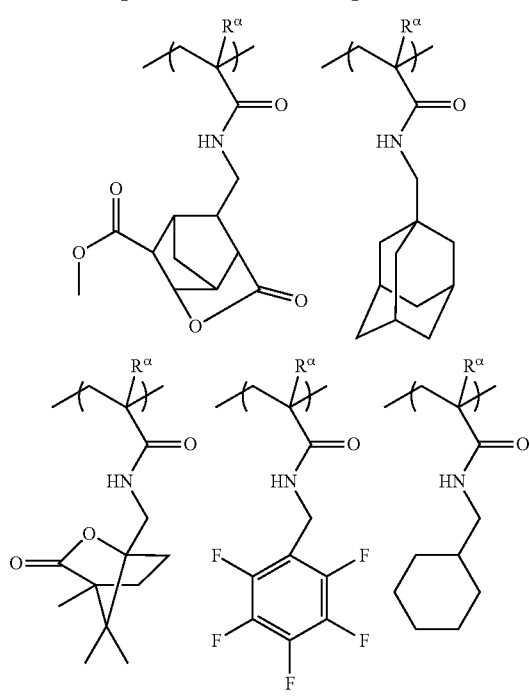

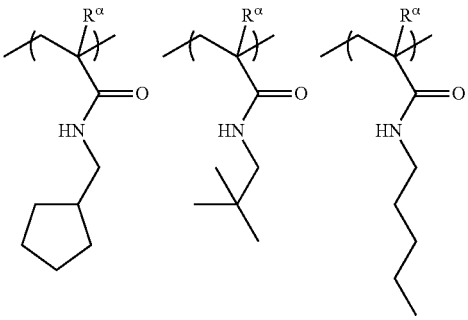

The constituent unit which is represented by General Formula (a9-1) described above is preferably a constituent unit which is represented by General Formula (a9-1-1) described below.

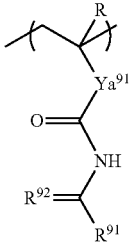

(a9-1-1)

[In the formula, R is the same as described above, $Ya^{91}$ is a single bond or a divalent linking group, $R^{91}$ is a hydrocarbon group which may have a substituent group, and $R^{92}$ is an oxygen atom or a sulfur atom.]

In General Formula (a9-1-1), description relating to $Ya^{91}$, $R^{91}$, and R is the same as described above. In addition, $R^{92}$ is an oxygen atom or a sulfur atom.

Specific examples of a constituent unit which is represented by General Formula (a9-1) described above will be shown below. In the formula, $R^\alpha$ indicates a hydrogen atom, a methyl group, or a trifluoromethyl group.

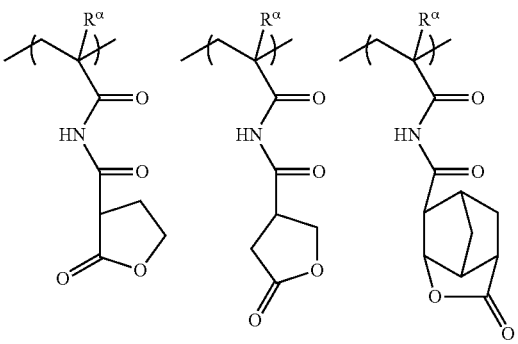

-continued

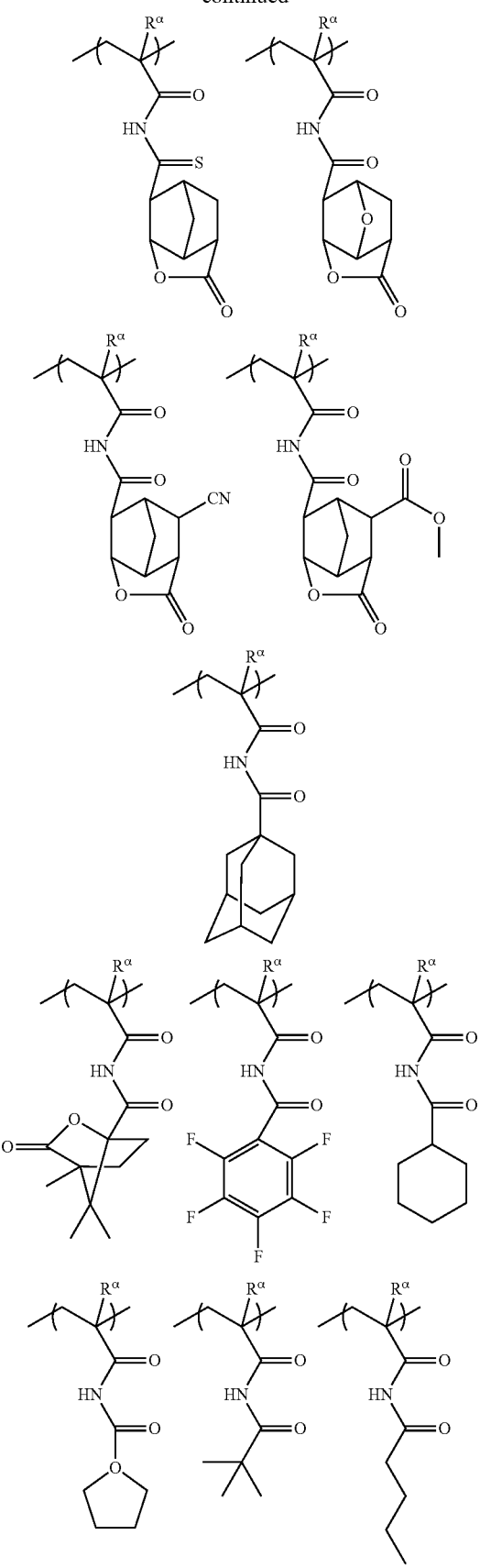

Constituent Unit (f)

Examples of the constituent unit (f) include a constituent unit which is represented by General Formula (f-1) described below.

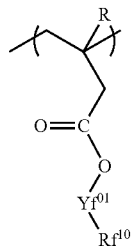

(f-1)

[In the formula, R is a hydrogen atom, an alkyl group with 1 to 5 carbon atoms, or a halogenated alkyl group with 1 to 5 carbon atoms. $Yf^{01}$ is a single bond or a divalent linking group, $Rf^{10}$ is an organic group, and at least one of $Yf^{01}$ and $Rf^{10}$ has a fluorine atom.]

In Formula (f-1), R is the same as described above and preferably a hydrogen atom or a methyl group.

In Formula (f-1), $Yf^{01}$ is a single bond or a divalent linking group.

Favorable examples of a divalent linking group of $Yf^{01}$ include a divalent hydrocarbon group which may have a substituent group, a divalent linking group which includes a hetero atom, and the like. Examples of a divalent linking group of $Yf^{01}$ include the same groups as the divalent linking groups which are described in $Ya^{01}$ in General Formula (a10-1).

Among the groups described above, $Yf^{01}$ is preferably a single bond or a divalent linking group which includes a hetero atom, more preferably a single bond, a group which is represented by General Formula —$Y^{21}$—O—$Y^{22}$— described above, a group which is represented by General Formula —[$Y^{21}$—C(=O)—O]$_m$—$Y^{22}$— described above, a group which is represented by General Formula —C(=O)—O—$Y^{22}$— described above, or a group which is represented by General Formula —$Y^{21}$—O—C(=O)—$Y^{22}$— described above, and particularly preferably a single bond and a group which is represented by General Formula —C(=O)—O—$Y^{22}$— described above.

$Yf^{01}$ is preferably a single bond or a divalent linking group which includes a hetero atom and more preferably a single bond, a divalent linking group which includes —C(=O)—O—, or a divalent linking group which includes —O—.

The divalent linking group of $Yf^{01}$ is preferably a divalent aromatic hydrocarbon group which may have a substituent group, a combination of a divalent aromatic hydrocarbon group which may have a substituent group and a divalent linking group which includes —O—C(=O)—, a divalent alicyclic group which may have a substituent group, and a combination of a divalent alicyclic group which may have a substituent group and a divalent linking group which includes —O—.

In more detail, a group where one hydrogen atom is further removed from a phenyl group or a naphthyl group which may have a substituent group, a combination of a group where one hydrogen atom is further removed from a phenyl group or a naphthyl group which may have a substituent group and —O—C(=O)—, a combination of a group where one hydrogen atom is further removed from a phenyl group or a naphthyl group which may have a substituent group and —O—C(═O)— and an alkylene group in straight-chain form, a group where two hydrogen atoms are removed from cycloalkane which may have a substituent group, and a combination of a group where two hydrogen atoms are removed from cycloalkane which may have a substituent group and —O— are particularly preferable.

In addition, in a case where v is 1, the divalent linking group of $Yf^{o1}$ is preferably a combination of a divalent hydrocarbon group which may have a substituent group and a divalent linking group which includes —C(═O)—O—, a combination of a divalent aromatic hydrocarbon group which may have a substituent group and a divalent linking group which includes —O—, and a combination of a divalent hydrocarbon group in a chain form which may have a substituent group and a divalent linking group which includes —O—C(═O)—; and more preferably a combination of a divalent hydrocarbon group in a chain form or an aromatic hydrocarbon group which may have a substituent group and —C(═O)—O—, a combination of a divalent hydrocarbon group in a chain form or an aromatic hydrocarbon group which may have a substituent group and —O—C(═O)—, a combination of a divalent aromatic hydrocarbon group which may have a substituent group and a divalent hydrocarbon group in a chain form which may have —O— and a substituent group, and a combination of a divalent hydrocarbon group in a chain form which may have a substituent group and a divalent hydrocarbon group in a chain form which may have —O—C(═O)— and a substituent group.

In a case where $Yf^{o1}$ is a divalent linking group, $Yf^{o1}$ may or may not have a fluorine atom. In a case where $Yf^{o1}$ is a single bond or a case where a divalent linking group of $Yf^{o1}$ does not have a fluorine atom, an organic group of $Rf^{10}$ which will be described below has a fluorine atom.

In Formula (f-1), $Rf^{10}$ is an organic group.

An organic group of $Rf^{10}$ may be an organic group which has a fluorine atom or may be an organic group which does not have a fluorine atom; however, in a case where the $Yf^{o1}$ described above is a single bond or a case where a divalent linking group of $Yf^{o1}$ does not have a fluorine atom, an organic group of $Rf^{10}$ has a fluorine atom.

Here, an "organic group which has a fluorine atom" refers to a group where some or all of the hydrogen atoms in an organic group are substituted with fluorine atoms.

Examples of an organic group of $Rf^{10}$ preferably include a hydrocarbon group which may have a fluorine atom. The hydrocarbon group which may have a fluorine atom may be an aliphatic hydrocarbon group and may be an aromatic hydrocarbon group.

Examples of an aliphatic hydrocarbon group of $Rf^{10}$ include an alkyl group in straight-chain form, a branched-chain form, or a cyclic form.

The alkyl group in straight-chain form or branched-chain form preferably has 1 to 15 carbon atoms, more preferably 1 to 10 carbon atoms, even more preferably 1 to 8 carbon atoms, and most preferably 1 to 5 carbon atoms.

The alkyl group in cyclic form (the alicyclic group) preferably has 4 to 15 carbon atoms, more preferably 4 to 10 carbon atoms, even more preferably 6 to 10 carbon atoms, and most preferably 5 to 7 carbon atoms.

The aromatic hydrocarbon group of $Rf^{10}$ preferably has 5 to 30 carbon atoms, more preferably 5 to 20 carbon atoms, even more preferably 6 to 15 carbon atoms, most preferably 6 to 12 carbon atoms, and particularly preferably a phenyl group or a naphthyl group.

These alkyl groups or aromatic hydrocarbon groups are preferably substituted with fluorine atoms, 25% or more of hydrogen atoms in the alkyl group or the aromatic hydrocarbon group are preferably substituted with fluorine atoms, 50% or more are more preferably substituted with fluorine atoms, and all of the hydrogen atoms may be substituted with fluorine atoms.

In addition, these alkyl groups or aromatic hydrocarbon groups may be substituted with substituent groups other than fluorine atoms. Examples of the other substituent groups other than fluorine atoms include a hydroxyl group, a chlorine atom, a bromine atom, an iodine atom, an alkoxy group with 1 to 5 carbon atoms, a fluorinated alkoxy group with 1 to 5 carbon atoms, and the like. In addition, the alkyl group or the aromatic hydrocarbon group in cyclic form may be substituted with an alkyl group with 1 to 5 carbon atoms. The alkyl group with 1 to 5 carbon atoms may be in straight-chain form or branched-chain form and is the same as the alkyl group with 1 to 5 carbon atoms as the substituent group at an α-position described above.

Out of the constituent units (0 which are represented by General Formula (f-1) described above, preferable specific examples of constituent units which have a fluorine atom include a constituent unit which is each represented by General Formulas (f-1-1) to (f-1-3) described below.

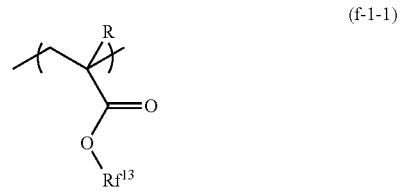

(f-1-1)

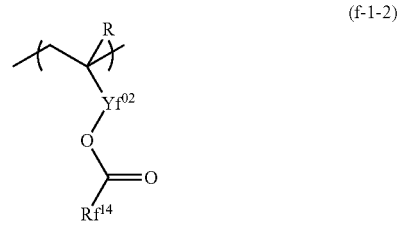

(f-1-2)

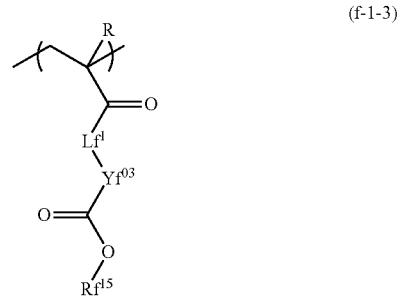

(f-1-3)

[In the formula, R is the same as described above and $Rf^{13}$ is an organic group which has a fluorine atom. $Lf^1$ is O or NH. $Yf^{o2}$ and $Yf^{o3}$ are each independently divalent linking groups and $Rf^{14}$ and $Rf^{15}$ are each independently organic groups which may have a fluorine atom. At least one of $Yf^{o2}$ and $Rf^{14}$ and at least one of $Yf^{o3}$ and $Rf^{15}$ have a fluorine atom.]

In Formula (f-1-1), $Rf^{13}$ is an organic group which has a fluorine atom and preferably an alkyl group in a chain form which has a fluorine atom, an alkyl group in cyclic form which has a fluorine atom, an aromatic hydrocarbon group which has a fluorine atom, an alkyl group in a chain form which is substituted with a fluorine atom and a hydroxyl group, an aromatic hydrocarbon group which is substituted with a fluorine atom and a hydroxyl group, or a combination of an alkyl group which is substituted with a fluorine atom and a hydroxyl group and an alkyl group in a cyclic form.

Examples of the alkyl group in cyclic form which has a fluorine atom and the aromatic hydrocarbon group which has a fluorine atom include examples where some or all of the hydrogen atoms of the alkyl group in cyclic form or the aromatic hydrocarbon group of the $Rf^{10}$ described above are substituted with fluorine atoms.

In Formula (f-1-2), $Yf^{02}$ is a divalent linking group and examples thereof include the same as the divalent linking group of the $Yf^{01}$ described above.

Among these, the $Yf^{02}$ is preferably a divalent aromatic hydrocarbon group which may have a substituent group and particularly preferably a group where one hydrogen atom is further removed from a phenyl group or a naphthyl group which may have a substituent group.

The substituent group is preferably a fluorine atom or an alkoxy group with 1 to 5 carbon atoms. In a case where $Yf^{02}$ does not have a fluorine atom, $Rf^{14}$ has a fluorine atom.

In Formula (f-1-2), $Rf^{14}$ is an organic group which may have a fluorine atom. $Rf^{14}$ preferably an alkyl group in straight-chain form or branched-chain form which may have a fluorine atom and the number of carbon atoms is preferably 1 to 5.

In Formula (f-1-3), $Lf^1$ is O or NH.

$Yf^{03}$ is a divalent linking group and examples thereof include the same as the divalent linking group of the $Yf^{01}$ described above.

Among these, $Yf^{03}$ is preferably a divalent aliphatic hydrocarbon group which may have a substituent group, a divalent aromatic hydrocarbon group which may have a substituent group, an ether bond (—O—), an ester bond (—C(=O)—O—, —O—C(=O)—), or a combination thereof.

The substituent group is preferably a fluorine atom or an alkoxy group with 1 to 5 carbon atoms.

Regarding the divalent aliphatic hydrocarbon group and the divalent aromatic hydrocarbon group in $Yf^{03}$, carbon atoms which form each of the hydrocarbon groups may be substituted with oxygen atoms or nitrogen atoms.

In a case where $Yf^{03}$ does not have a fluorine atom, $Rf^{15}$ has a fluorine atom.

In Formula (f-1-3), $Rf^{15}$ is an organic group which may have a fluorine atom and is the same as $Rf^{14}$ described above.

Specific examples of a constituent unit which is each represented by Formulas (f-1-1) to (f-1-3) will be shown below. In the formulas, $R^\beta$ is a hydrogen atom or a methyl group.

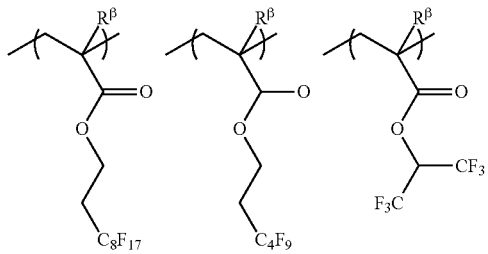

-continued

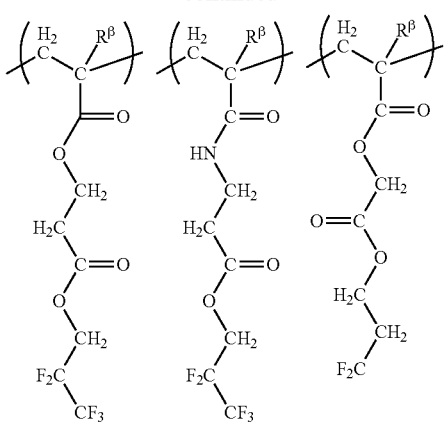

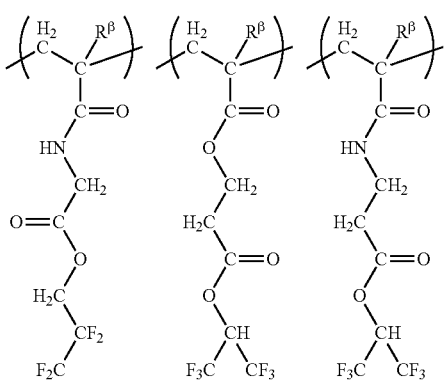

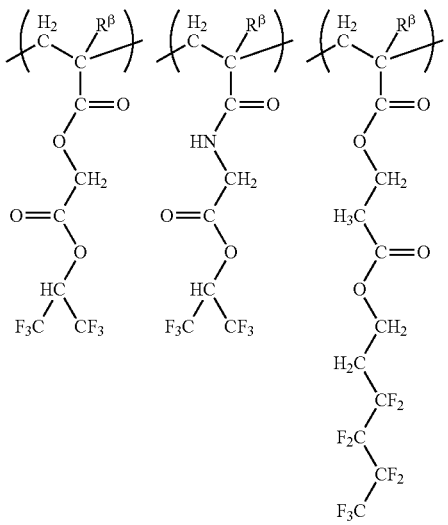

69
-continued
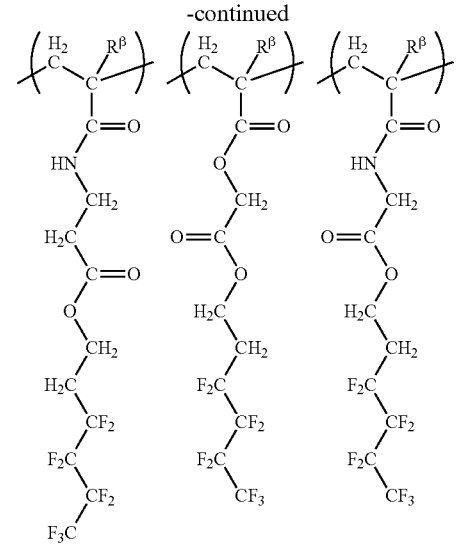
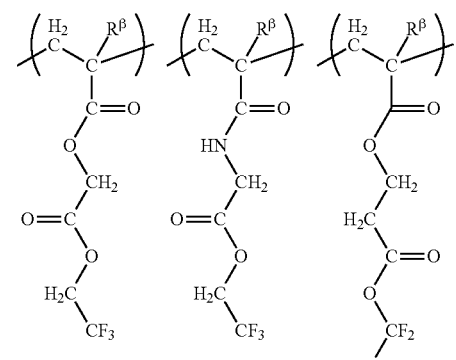
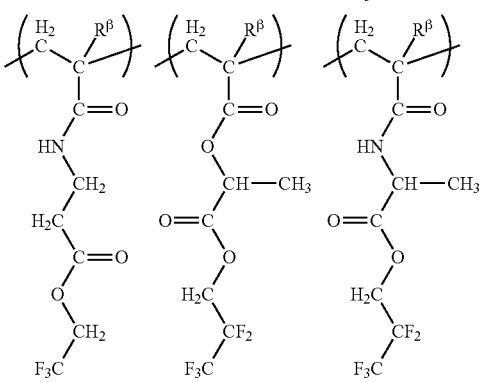
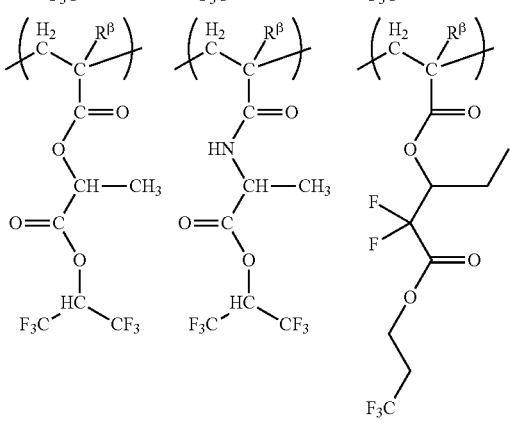
70
-continued
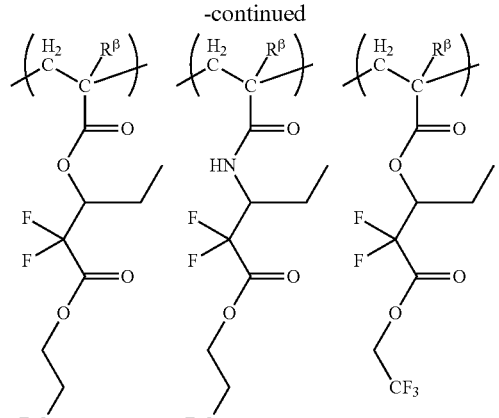
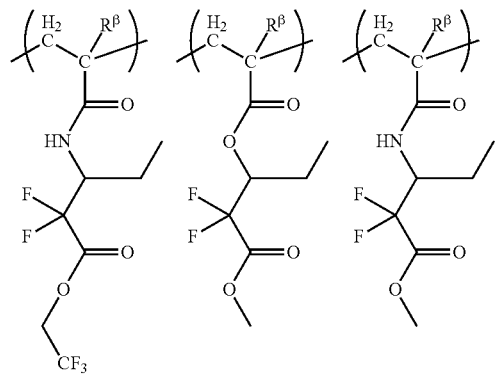
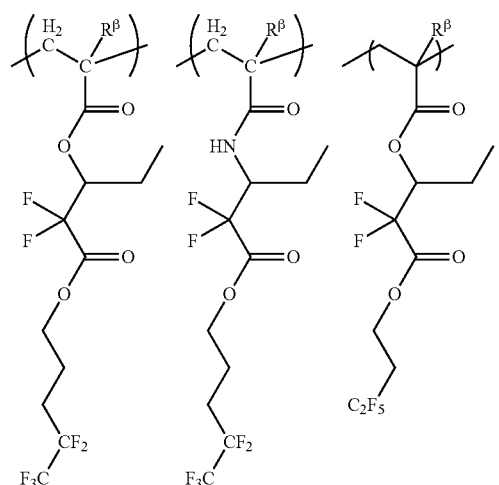
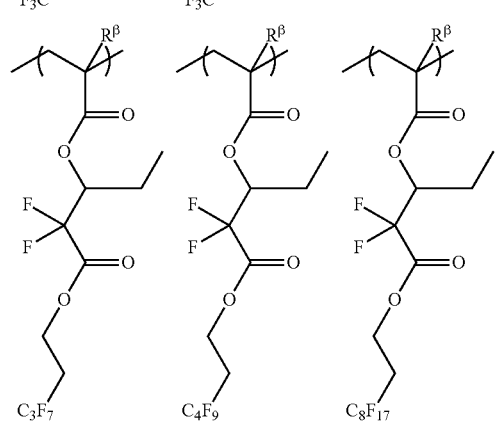

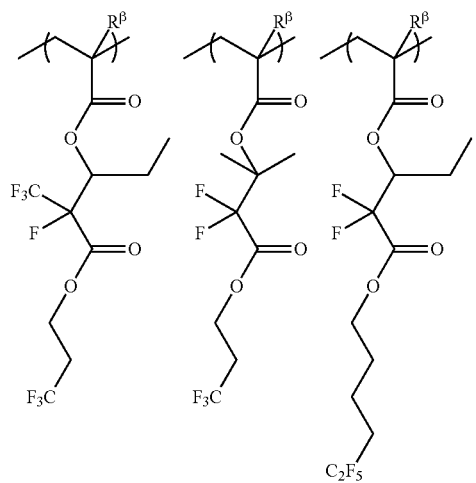
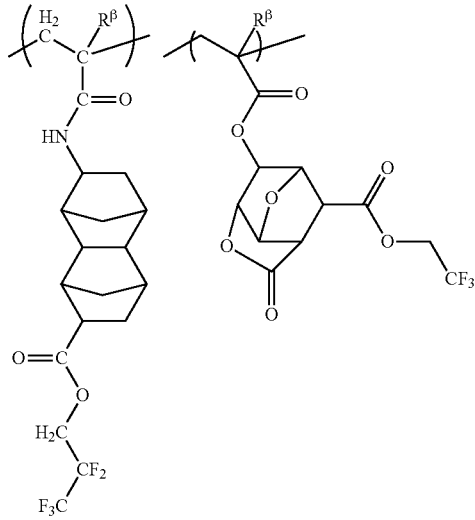
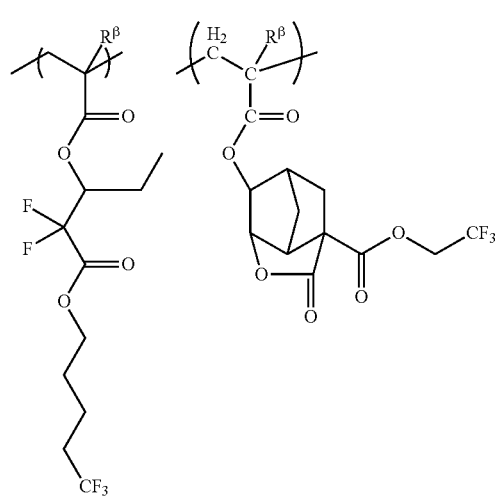
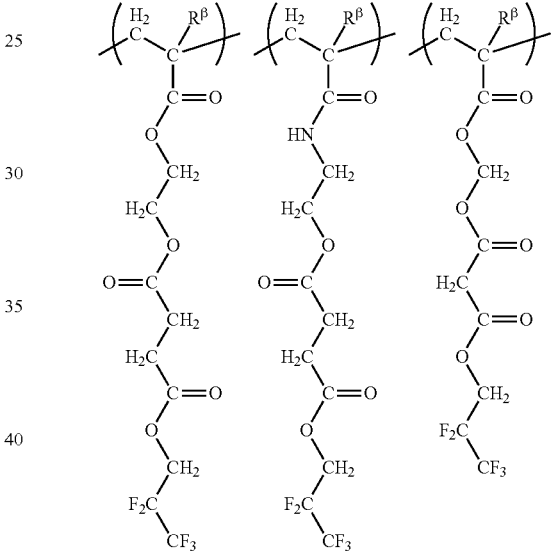
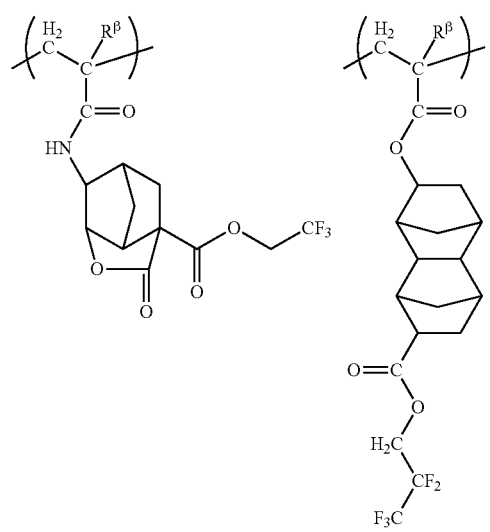
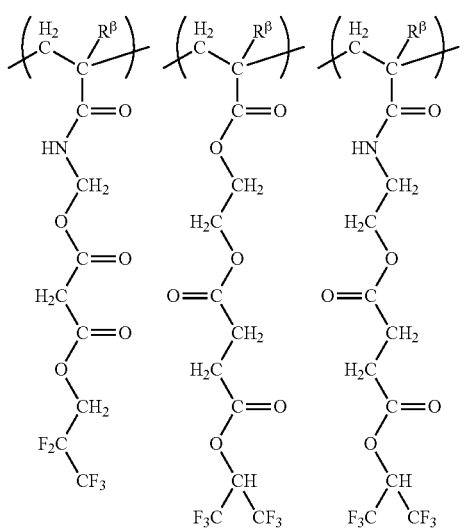

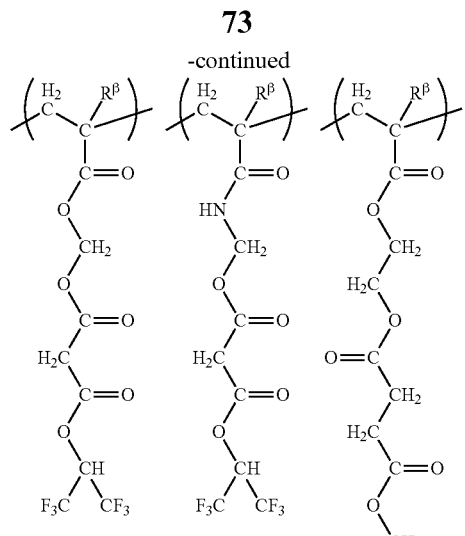
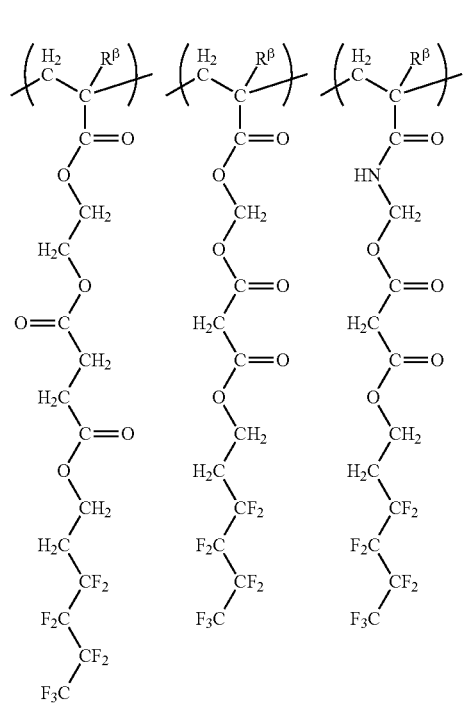
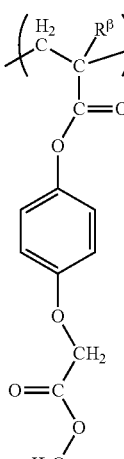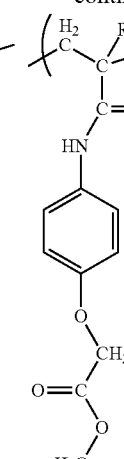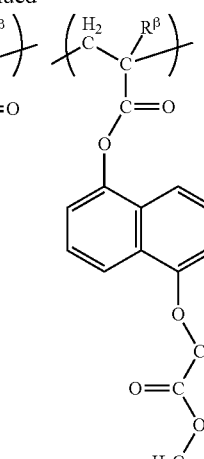
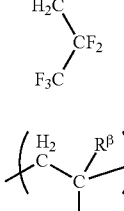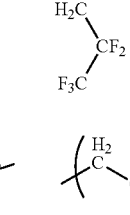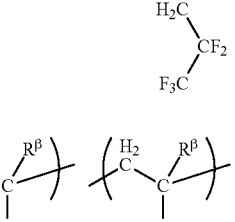
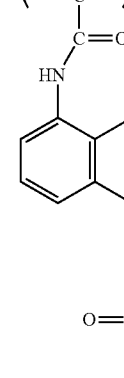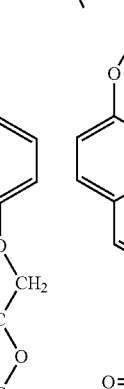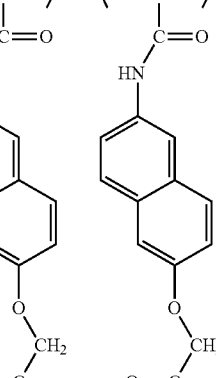

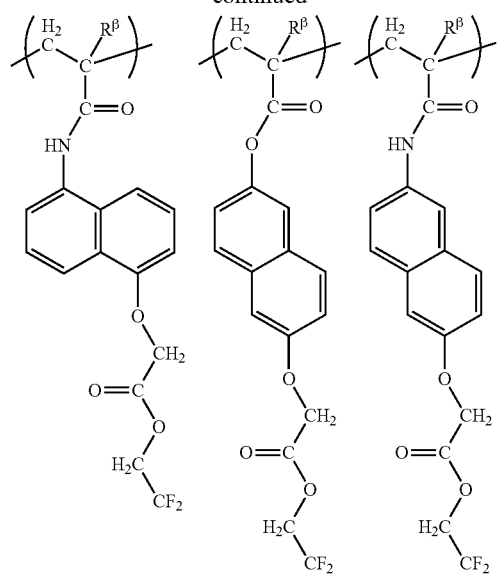
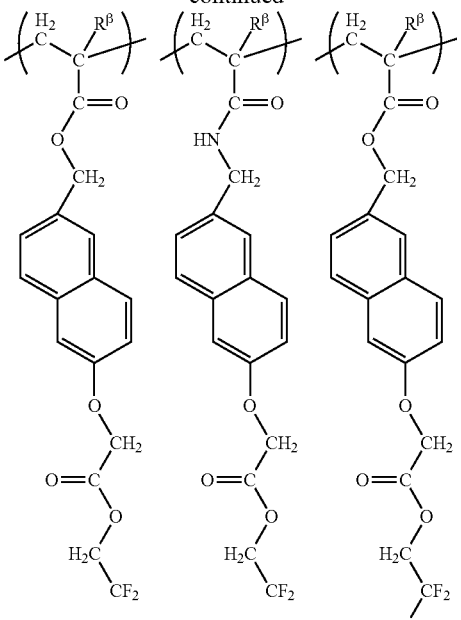
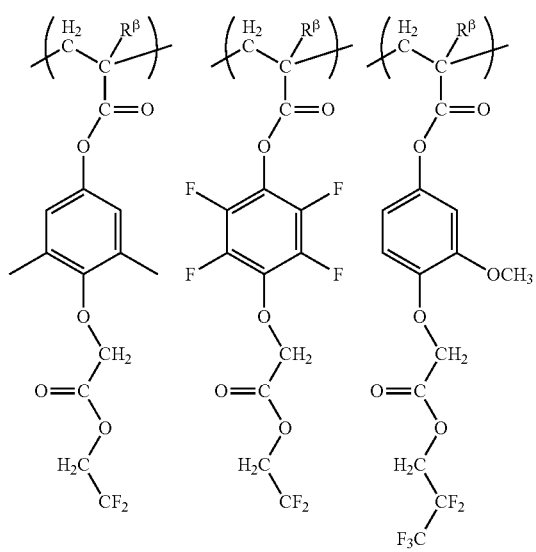
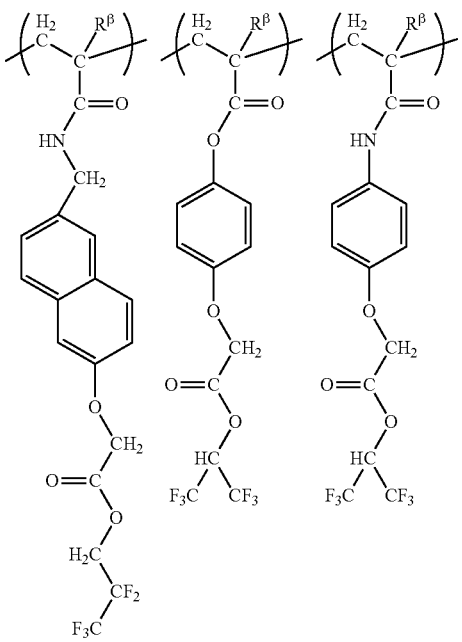

-continued

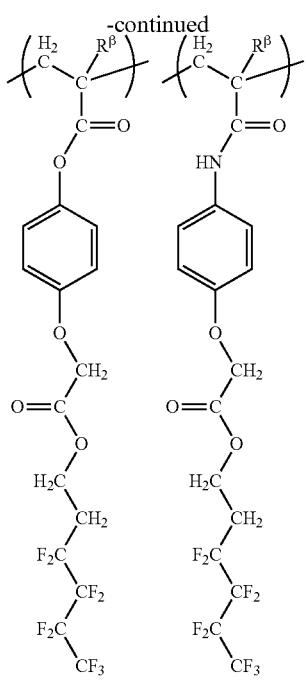

It is possible to favorably use a polymer compound which is manufactured by the method for manufacturing a polymer compound of the present invention for a base material component of a resist composition.

Examples of the resist composition include examples which contain a polymer compound which is manufactured by the method for manufacturing a polymer compound of the present invention as a base material component and where an acid generating agent component, a basic compound component, a fluorine additive agent, and the like are further dissolved in a solvent.

When forming a resist film using the resist composition and performing selective exposure with respect to the resist film, while an acid is generated in an exposed portion and the solubility with respect to a developing solution of a base material component (a polymer compound) changes due to the effect of the acid, since the solubility of a base material component (a polymer compound) with respect to the developing solution does not change in a non-exposure portion, a difference in the solubility with respect to the developing solution is generated between the exposed portion and the non-exposed portion. Therefore, when developing the resist film, the exposed portion is dissolved and removed and a positive type resist pattern is formed in a case where the resist composition is a positive type, and the non-exposed portion is dissolved and removed and a negative type resist pattern is formed in a case where the resist composition is a negative type.

EXAMPLES

More detailed description will be given below of the present invention using Examples; however, the present invention is not limited to the Examples below.

Example 1

17.9 g of methyl ethyl ketone (MEK) was added to a three-neck flask to which a thermometer, a flow back tube, and a nitrogen introducing tube were connected and heating and flow back were carried out under a nitrogen atmosphere.

A solution where 15.0 g of the compound M-1 described below, 14.9 g of the compound M-2 described below, 3.2 g of the compound M-3 described below, and 3.1 g of azobisisobutyric acid dimethyl (V-601) were dissolved in 67.2 g of MEK was prepared and added dropwise over 4 hours. After finishing the dropwise addition, the reaction solution was heated and stirred for 1 hour (step 1).

After the reaction solution was cooled to room temperature (20° C.), 104.6 g of 1.0 M tetrahydrofuran solution of tetrabutyl ammonium fluoride (TBAF) was added dropwise and stirred for 1 hour (step 2).

An operation of precipitating a polymer by dropwise adding the obtained reaction polymerization solution into a large amount of methanol was performed and settled white powder was filtered. The obtained solid substance was washed with methanol, filtered, and dried and 16.6 g of white powder was obtained.

When performing carbon 13 nuclear magnetic resonance spectrum (600 MHz _13C-NMR) measurement of the polymer compound, the polymer compound was confirmed to be a high molecular weight compound P-1 with a copolymerization composition ratio (a molar ratio) l/m/n=52/37/11. In addition, the standard polystyrene conversion mass average molecular weight (Mw) which was obtained by GPC measurement was 8400 and the molecular weight dispersion degree (Mw/Mn) was 1.71.

Steps 1 and 2 of the method for manufacturing a polymer compound of Example 1 will be described below.

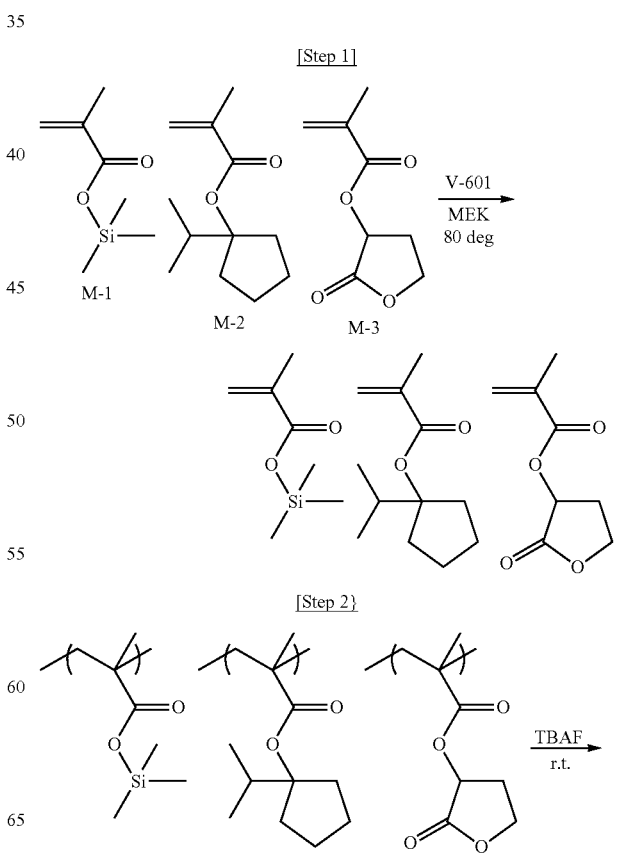

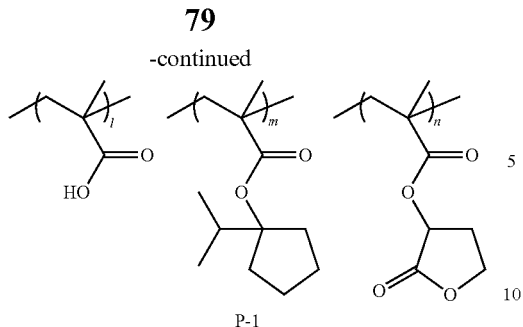

P-1

Example 2

21.1 g of MEK was added to a three-neck flask to which a thermometer, a flow back tube, and a nitrogen introducing tube were connected and heating and flow back were carried out under a nitrogen atmosphere.

A solution where 20.0 g of the compound M-4 described below, 15.7 g of the compound M-2 described below, 3.4 g of the compound M-3 described below, and 3.2 g of azobisisobutyric acid dimethyl (V-601) were dissolved in 79.3 g of MEK was prepared and added dropwise over 4 hours. After finishing the dropwise addition, the reaction solution was heated and stirred for 1 hour (step 1).

After the reaction solution was cooled to room temperature (20° C.), 110.2 g of a 1.0 M tetrahydrofuran solution of tetrabutyl ammonium fluoride (TBAF) was added dropwise thereto and stirred for 1 hour (step 2).

An operation of precipitating a polymer by dropwise adding the obtained reaction polymerization solution into a large amount of methanol was performed and settled white powder was filtered. The obtained solid substance was washed with methanol, filtered, and dried and 20.7 g of white powder was obtained.

When performing carbon 13 nuclear magnetic resonance spectrum (600 MHz _13C-NMR) measurement of the polymer compound, the polymer compound was confirmed to be a high molecular weight compound P-1 with a copolymerization composition ratio (a molar ratio) l/m/n=51/40/9. In addition, the standard polystyrene conversion mass average molecular weight (Mw) which was obtained by GPC measurement was 8400 and the molecular weight dispersion degree (Mw/Mn) was 1.67.

The steps 1 and 2 of the method for manufacturing a polymer compound of Example 2 will be described below.

[Step 1]

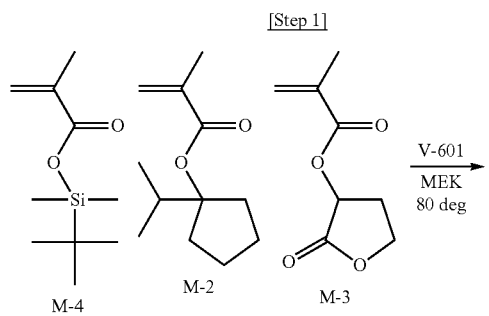

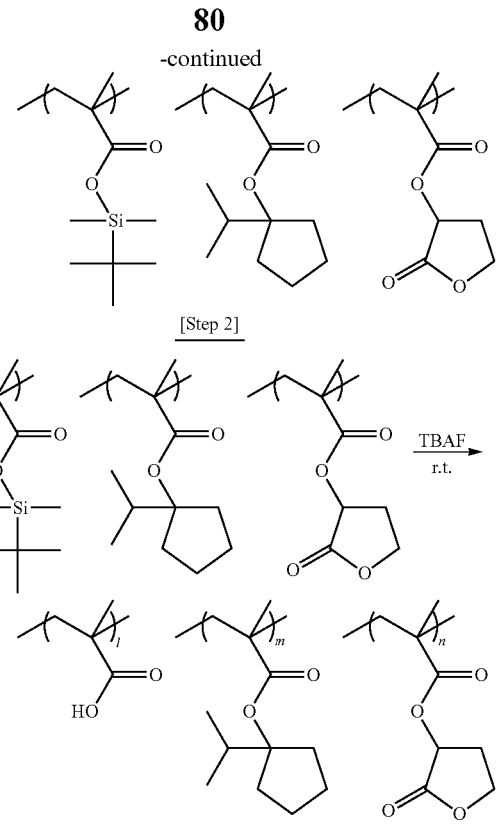

P-1

Comparative Example 1

17.4 g of MEK was added to a three-neck flask to which a thermometer, a flow back tube, and a nitrogen introducing tube were connected and heating and flow back were carried out under a nitrogen atmosphere.

A solution where 10.0 g of the compound M-5 described below, 18.2 g of the compound M-2 described below, 4.0 g of the compound M-3 described below, and 3.7 g of azobisisobutyric acid dimethyl (V-601) were dissolved in 65.4 g of MEK was prepared and added dropwise over 4 hours. After finishing the dropwise addition, the reaction solution was heated and stirred for 1 hour and cooled to room temperature (20° C.).

An operation of precipitating a polymer by dropwise adding the obtained reaction polymerization solution into a large amount of methanol was performed and settled white powder was filtered. The obtained solid substance was washed with methanol, filtered, and dried and 11.3 g of white powder was obtained.

When performing carbon 13 nuclear magnetic resonance spectrum (600 MHz_13C-NMR) measurement of the polymer compound, decomposition of the constituent unit which was derived from the compound M-2 was observed and the compound was confirmed to be a high molecular weight compound P-2 with a copolymerization composition ratio (a molar ratio) l/m=88/12. In addition, the standard polystyrene conversion mass average molecular weight (Mw) which was obtained by GPC measurement was 5000 and the molecular weight dispersion degree (Mw/Mn) was 1.48.

The steps of the method for manufacturing a polymer compound of Comparative Example 1 will be described below.

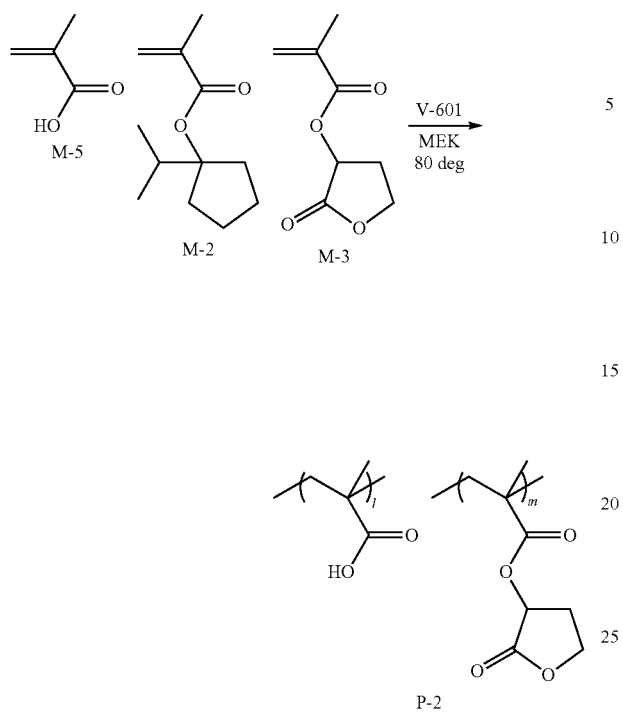

Comparative Example 2

17.4 g of MEK was added to a three-neck flask to which a thermometer, a flow back tube, and a nitrogen introducing tube were connected and heating and flow back were carried out under a nitrogen atmosphere.

A solution where 10.0 g of the compound M-5 described below, 18.2 g of the compound M-2 described below, 4.0 g of the compound M-3 described below, 11.8 g of triethylamine (TEA), and 3.7 g of azobisisobutyric acid dimethyl (V-601) were dissolved in 65.4 g of MEK was prepared and added dropwise over 4 hours. After finishing the dropwise addition, the reaction solution was heated and stirred for 1 hour and cooled to room temperature (20° C.).

An operation of precipitating a polymer by dropwise adding the obtained reaction polymerization solution into a large amount of methanol was performed and settled white powder was filtered. The obtained solid substance was washed with methanol, filtered, and dried and 19.3 g of white powder was obtained.

When performing carbon 13 nuclear magnetic resonance spectrum (600 MHz_13C-NMR) measurement of the polymer compound, decomposition of a constituent unit which was derived from the compound M-3 was observed and the polymer compound was confirmed to be a high molecular weight compound P-3 of a copolymerization composition ratio (a molar ratio) l/m/n=51/37/12. In addition, a standard polystyrene conversion mass average molecular weight (Mw) which was obtained by GPC measurement was 7800 and the molecular weight dispersion degree (Mw/Mn) was 1.68.

The steps of the method for manufacturing a polymer compound of Comparative Example 2 will be described below.

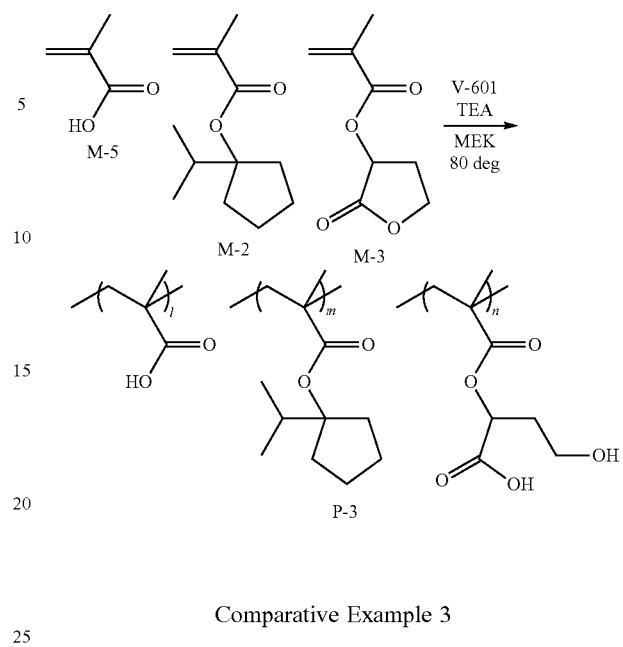

Comparative Example 3

15.7 g of MEK was added to a three-neck flask to which a thermometer, a flow back tube, and a nitrogen introducing tube were connected and heating and flow back were carried out under a nitrogen atmosphere.

A solution where 10.0 g of the compound M-6 described below, 15.7 g of the compound M-2 described below, 3.4 g of the compound M-3 described below, and 3.2 g of azobisisobutyric acid dimethyl (V-601) were dissolved in 59.1 g of MEK was prepared and added dropwise over 4 hours. After finishing the dropwise addition, the reaction solution was heated and stirred for 1 hour and cooled to room temperature (20° C.).

An operation of precipitating a polymer by dropwise adding the obtained reaction polymerization solution into a large amount of methanol was performed and settled white powder was filtered. The obtained solid substance was washed with methanol, filtered, and dried and 17.5 g of white powder was obtained.

After 52.5 g of methanol and 12.9 g of TEA were added into and dissolved in the white powder and heating and flow back were carried out for 7 hours, an operation of precipitating a polymer by dropwise adding the reaction solution into a large amount of water was performed, filtration and drying were carried out, and 14.9 g of white powder was obtained.

When performing carbon 13 nuclear magnetic resonance spectrum (600 MHz_13C-NMR) measurement of the polymer compound, decomposition of a constituent unit which was derived from the compound M-3 was observed and the polymer compound was confirmed to be a high molecular weight compound P-3 with a copolymerization composition ratio (a molar ratio) l/m/n=55/35/10. In addition, a standard polystyrene conversion mass average molecular weight (Mw) which was obtained by GPC measurement was 8000 and the molecular weight dispersion degree (Mw/Mn) was 1.60.

The steps of the method for manufacturing a polymer compound of Comparative Example 3 will be described below.

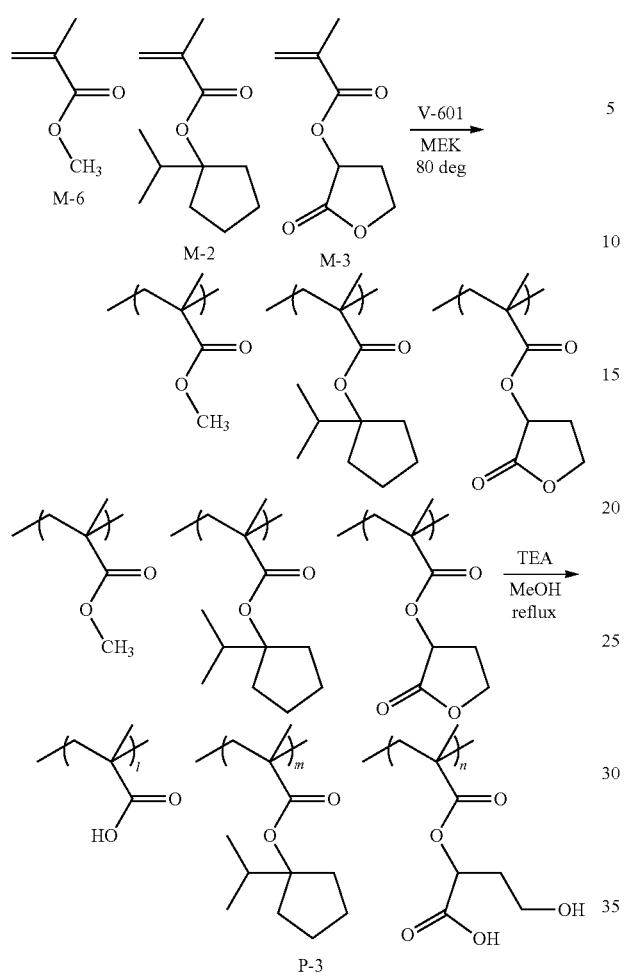

Comparative Example 4

17.9 g of MEK was added to a three-neck flask to which a thermometer, a flow back tube, and a nitrogen introducing tube were connected and heating and flow back were carried out under a nitrogen atmosphere.

A solution where 15.0 g of the compound M-1 described below, 14.9 g of the compound M-2 described below, 3.2 g of the compound M-3 described below, and 3.1 g of azobisisobutyric acid dimethyl (V-601) were dissolved in 67.2 g of MEK was prepared and added dropwise over 4 hours. After finishing the dropwise addition, the reaction solution was heated and stirred for 1 hour. After the reaction solution was cooled to room temperature (20° C.), 34.6 g of 1% aqueous hydrochloric acid was added dropwise thereto and stirred for 1 hour.

An operation of precipitating a polymer by dropwise adding the obtained reaction polymerization solution into a large amount of methanol was performed and settled white powder was filtered. The obtained solid substance was washed with methanol, filtered, and dried and 9.8 g of white powder was obtained.

When performing carbon 13 nuclear magnetic resonance spectrum (600 MHz_13C-NMR) measurement of the polymer compound, decomposition of a constituent unit which was derived from the compound M-2 was observed and the polymer compound was confirmed to be a high molecular weight compound P-2 with a copolymerization composition ratio (a molar ratio) l/m=89/11.

In addition, the standard polystyrene conversion mass average molecular weight (Mw) which was obtained by GPC measurement was 4600 and the molecular weight dispersion degree (Mw/Mn) was 1.60.

The steps of the method for manufacturing a polymer compound of Comparative Example 4 will be described below.

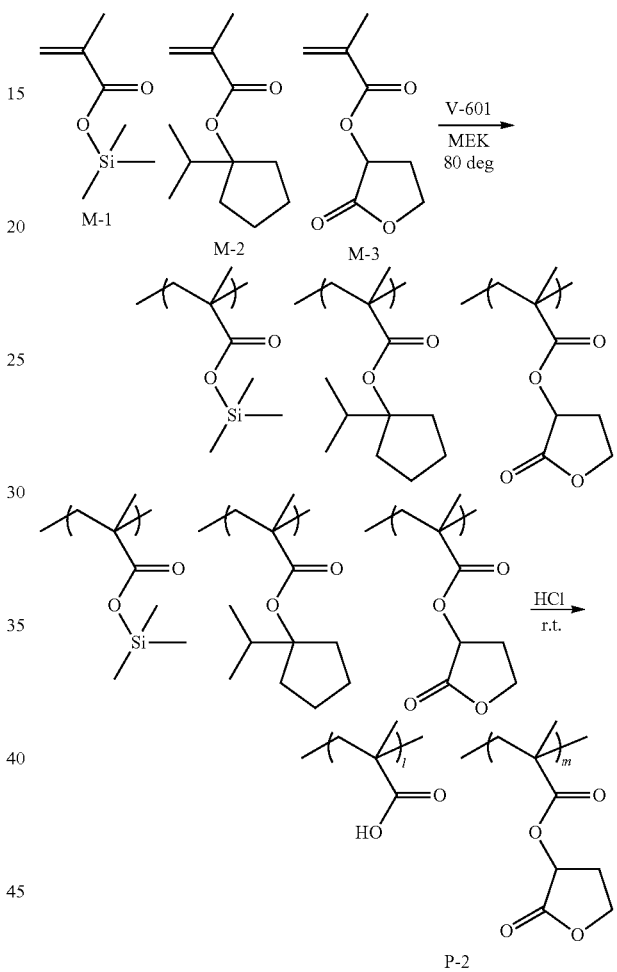

Example 3

22.7 g of MEK was added to a three-neck flask to which a thermometer, a flow back tube, and a nitrogen introducing tube were connected and heating and flow back were carried out under a nitrogen atmosphere.

A solution where 20.0 g of the compound M-7 described below, 15.7 g of the compound M-8 described below, 5.4 g of the compound M-9 described below, and 2.8 g of azobisisobutyric acid dimethyl (V-601) were dissolved in 83.5 g of MEK was prepared and added dropwise over 4 hours. After finishing the dropwise addition, the reaction solution was heated and stirred for 1 hour (step 1).

After the reaction solution was cooled to room temperature (20° C.), 94.2 g of 1.0 M tetrahydrofuran solution of tetrabutyl ammonium fluoride (TBAF) was added dropwise and stirred for 1 hour (step 2).

An operation of precipitating a polymer by dropwise adding the obtained reaction polymerization solution into a large amount of methanol was performed and settled white powder was filtered. The obtained solid substance was washed with methanol, filtered, and dried and 16.5 g of white powder was obtained.

When performing carbon 13 nuclear magnetic resonance spectrum (600 MHz_13C-NMR) measurement of the polymer compound, the polymer compound was confirmed to be a high molecular weight compound P-4 with a copolymerization composition ratio (a molar ratio) l/m/n=48/41/11. In addition, the standard polystyrene conversion mass average molecular weight (Mw) which was obtained by GPC measurement was 9200 and the molecular weight dispersion degree (Mw/Mn) was 1.77.

Steps 1 and 2 of the method for manufacturing a polymer compound of Example 3 will be described below.

[Step 1]

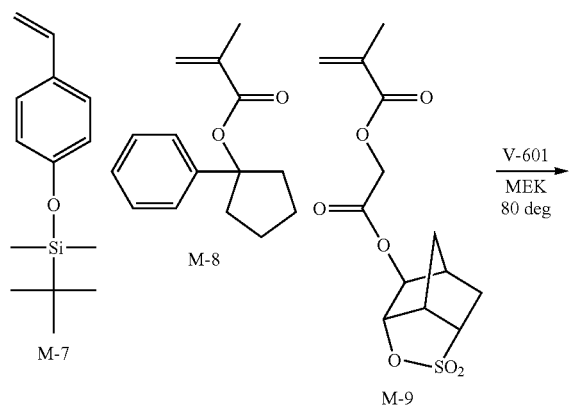

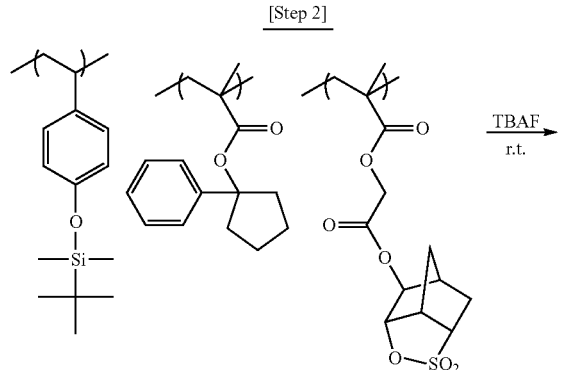

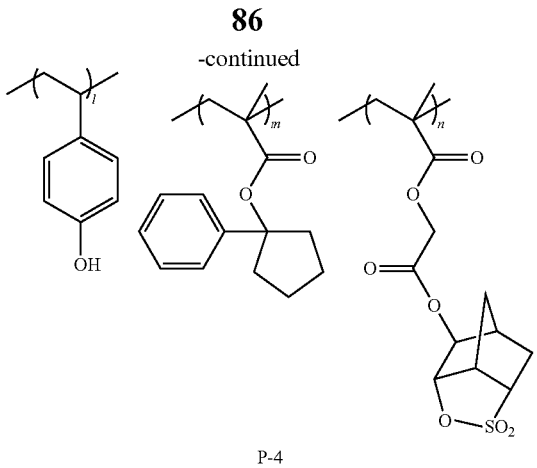

P-4

Comparative Example 5

17.0 g of MEK was added to a three-neck flask to which a thermometer, a flow back tube, and a nitrogen introducing tube were connected and heating and flow back were carried out under a nitrogen atmosphere.

A solution where 10.0 g of the compound M-10 described below, 15.3 g of the compound M-8 described below, 5.3 g of the compound M-9 described below, and 2.7 g of azobisisobutyric acid dimethyl (V-601) were dissolved in 62.13 g of MEK was prepared and added dropwise over 4 hours. After finishing the dropwise addition, the reaction solution was heated and stirred for 1 hour and cooled to room temperature (20° C.).

An operation of precipitating a polymer by dropwise adding the obtained reaction polymerization solution into a large amount of methanol was performed and settled white powder was filtered. The obtained solid substance was washed with methanol, filtered, and dried and 11.6 g of white powder was obtained.

When performing carbon 13 nuclear magnetic resonance spectrum (600 MHz_13C-NMR) measurement of the polymer compound, decomposition of a constituent unit which was derived from the compound M-8 was observed and the polymer compound was confirmed to be a high molecular weight compound P-5 of a copolymerization composition ratio (a molar ratio) l/m/n=50/37/13. In addition, the standard polystyrene conversion mass average molecular weight (Mw) which was obtained by GPC measurement was 4200 and the molecular weight dispersion degree (Mw/Mn) was 1.57.

Steps of the method for manufacturing a polymer compound of Comparative Example 5 will be described below.

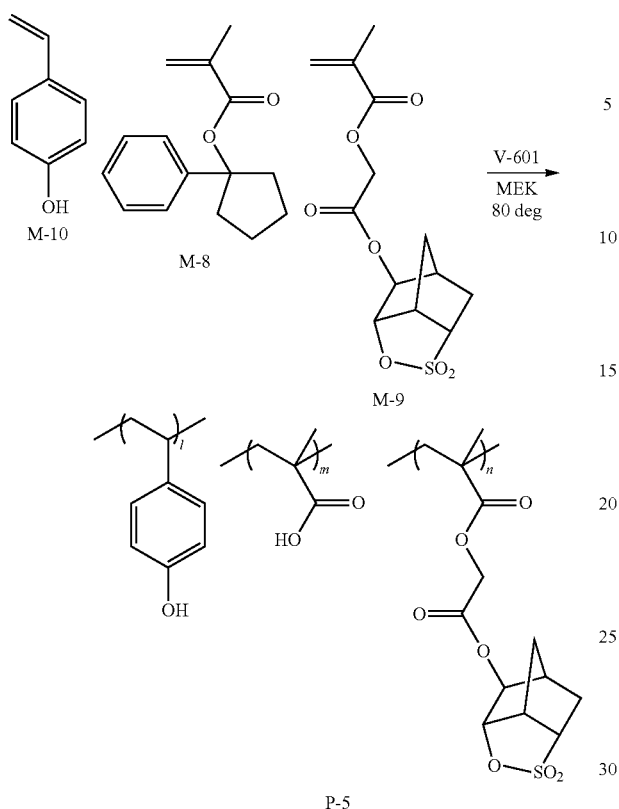

P-5

Comparative Example 6

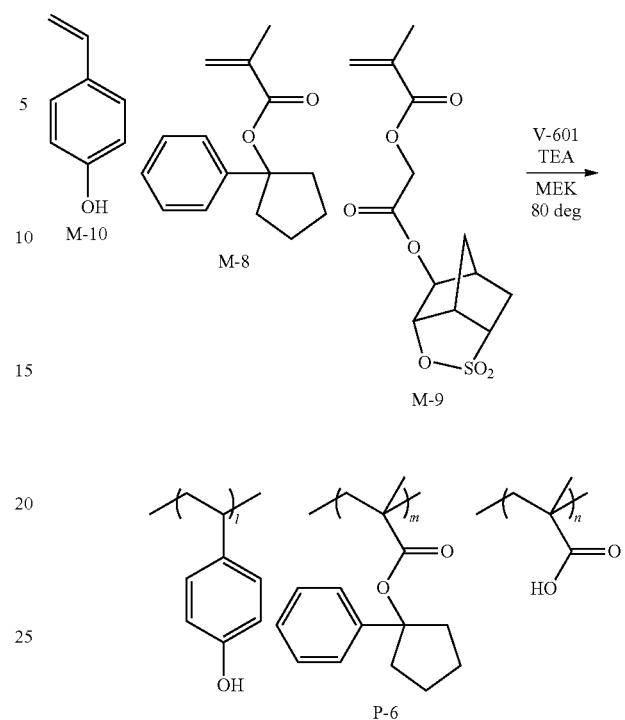

Example 4

17.0 g of MEK was added to a three-neck flask to which a thermometer, a flow back tube, and a nitrogen introducing tube were connected and heating and flow back were carried out under a nitrogen atmosphere.

A solution where 10.0 g of the compound M-10 described below, 15.3 g of the compound M-8 described below, 5.3 g of the compound M-9 described below, 8.4 g of TEA, and 2.7 g of azobisisobutyric acid dimethyl (V-601) were dissolved in 62.13 g of MEK was prepared and added dropwise over 4 hours. After finishing the dropwise addition, the reaction solution was heated and stirred for 1 hour and cooled to room temperature (20° C.).

An operation of precipitating a polymer by dropwise adding the obtained reaction polymerization solution into a large amount of methanol was performed and settled white powder was filtered. The obtained solid substance was washed with methanol, filtered, and dried and 18.9 g of white powder was obtained.

When performing carbon 13 nuclear magnetic resonance spectrum (600 MHz_13C-NMR) measurement of the polymer compound, decomposition of a constituent unit which was derived from the compound M-9 was observed and the polymer compound was confirmed to be a high molecular weight compound P-6 of a copolymerization composition ratio (a molar ratio) l/m/n=49/32/19. In addition, the standard polystyrene conversion mass average molecular weight (Mw) which was obtained by GPC measurement was 7700 and the molecular weight dispersion degree (Mw/Mn) was 1.66.

Steps of the method for manufacturing a polymer compound of Comparative Example 6 will be described below.

21.5 g of MEK was added to a three-neck flask to which a thermometer, a flow back tube, and a nitrogen introducing tube were connected and heating and flow back were carried out under a nitrogen atmosphere.

A solution where 20.0 g of the compound M-7 described below, 19.7 g of the compound M-11 described below, and 2.8 g of azobisisobutyric acid dimethyl (V-601) were dissolved in 80.5 g of MEK was prepared and added dropwise over 4 hours. After finishing the dropwise addition, the reaction solution was heated and stirred for 1 hour (step 1).

After the reaction solution was cooled to room temperature (20° C.), 94.2 g of 1.0 M tetrahydrofuran solution of tetrabutyl ammonium fluoride (TBAF) was added dropwise and stirred for 1 hour (step 2).

An operation of precipitating a polymer by dropwise adding the obtained reaction polymerization solution into a large amount of methanol was performed and settled white powder was filtered. The obtained solid substance was washed with methanol, filtered, and dried and 14.9 g of white powder was obtained.

When performing carbon 13 nuclear magnetic resonance spectrum (600 MHz_13C-NMR) measurement of the polymer compound, the polymer compound was confirmed to be a high molecular weight compound P-7 of a copolymerization composition ratio (a molar ratio) l/m=50/50. In addition, the standard polystyrene conversion mass average molecular weight (Mw) which was obtained by GPC measurement was 9400 and the molecular weight dispersion degree (Mw/Mn) was 1.93.

Steps 1 and 2 of the method for manufacturing a polymer compound of Example 4 will be described below.

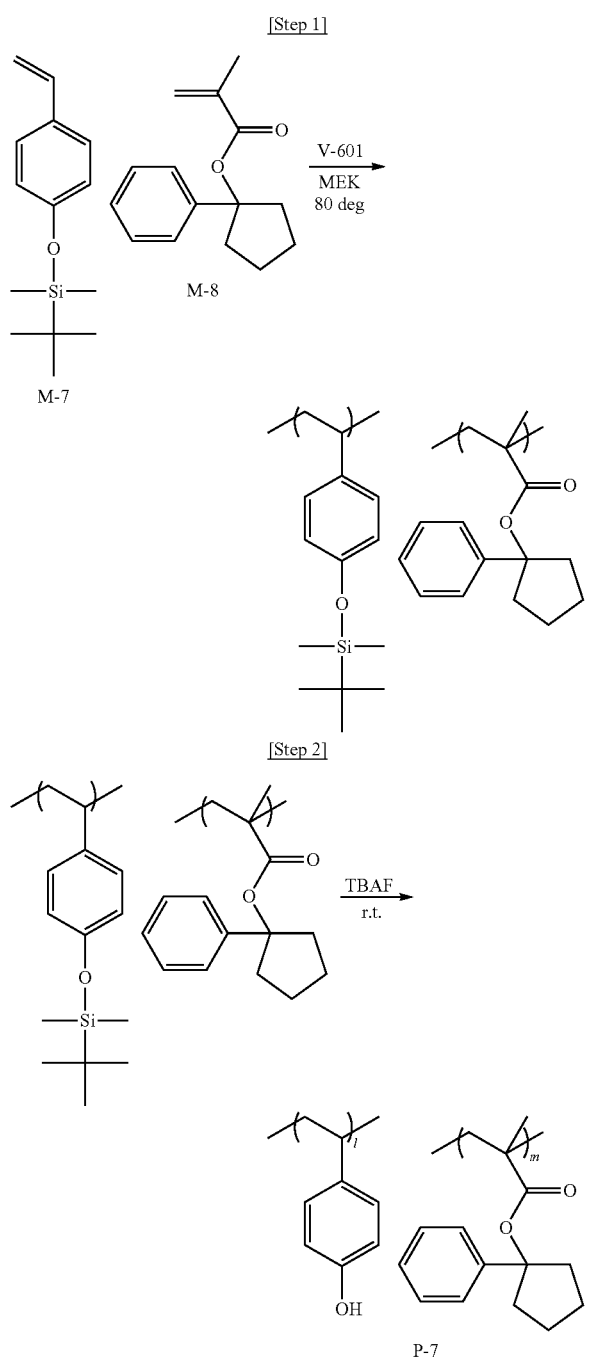

Comparative Example 7

15.8 g of MEK was added to a three-neck flask to which a thermometer, a flow back tube, and a nitrogen introducing tube were connected and heating and flow back were carried out under a nitrogen atmosphere.

A solution where 10.0 g of the compound M-10 described below, 19.2 g of the compound M-8 described below, 8.42 g of TEA, and 2.7 g of azobisisobutyric acid dimethyl (V-601) were dissolved in 59.2 g of MEK was prepared and added dropwise over 4 hours. After finishing the dropwise addition, the reaction solution was heated and stirred for 1 hour and cooled to room temperature (20° C.).

An operation of precipitating a polymer by dropwise adding the obtained reaction polymerization solution into a large amount of methanol was performed and settled white powder was filtered. The obtained solid substance was washed with methanol, filtered, and dried and 16.0 g of white powder was obtained.

When performing carbon 13 nuclear magnetic resonance spectrum (600 MHz_13C-NMR) measurement of the polymer compound, decomposition of a constituent unit which was derived from the compound M-8 was observed and the polymer compound was confirmed to be a high molecular weight compound P-8 of a copolymerization composition ratio (a molar ratio) l/m/n=50/38/12. In addition, the standard polystyrene conversion mass average molecular weight (Mw) which was obtained by GPC measurement was 8500 and the molecular weight dispersion degree (Mw/Mn) was 1.88.

Steps of the method for manufacturing a polymer compound of Comparative Example 7 will be described below.

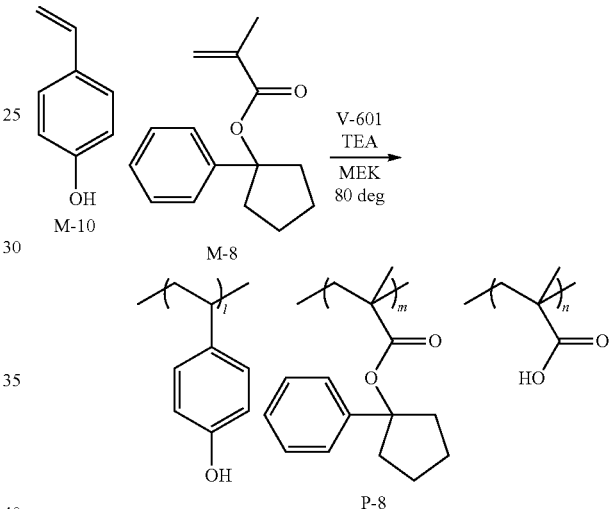

As shown in the results described above, according to the method for manufacturing a polymer compound of the present invention, it was possible to stably manufacture a polymer compound which has a constituent unit which includes a hydroxy group, a constituent unit which includes an acid decomposable group of which a polarity increases due to an effect of an acid, and a constituent unit which includes a base decomposable group without decomposing each of the constituent units (Examples 1 to 3). In addition, it was possible to stably manufacture a polymer compound which has a constituent unit which includes a hydroxy group and a constituent unit which includes an acid decomposable group of which the polarity increases due to an effect of an acid without decomposing each of the constituent units (Example 4).

On the other hand, in a manufacturing method other than the manufacturing method of the present invention, a constituent unit which included an acid decomposable group was decomposed due to an acid which was generated from a constituent unit which includes a hydroxy group (Comparative Examples 1, 4, and 5). In addition, in a case of adding a basic compound in order to neutralize an acid which is generated from a constituent unit which includes a hydroxy group, a constituent unit which includes a base decomposable group was decomposed (Comparative Examples 2, 3, 6, and 7).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for manufacturing a polymer compound, the method comprising:

copolymerizing a monomer for deriving a constituent unit (a0) represented by general formula (a0-1-2), a monomer for deriving a constituent unit (a1) represented by general formula (a1-1), and a monomer for deriving a constituent unit (a20) which includes a —$SO_2$— containing cyclic group or a lactone-containing cyclic group by radical polymerization to obtain a prepolymer (2) which has the constituent unit (a0), the constituent unit (a1) and the constituent unit (a20); and selectively deprotecting the constituent unit (a0) by reacting a compound which has a fluoride anion with the prepolymer (2) to obtain a polymer compound which has a constituent unit (a10) represented by general formula (a10-1), the constituent unit (a1) and the constituent unit (a20),

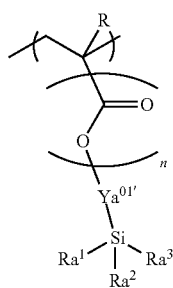

(a0-1-2)

wherein R is a hydrogen atom, an alkyl group with 1 to 5 carbon atoms, or a halogenated alkyl group with 1 to 5 carbon atoms; $Ya^{01'}$ is a single bond, —O—, —C(=O)—O—, —$Y^{21}$—O—, provided that $Y^{21}$ is a divalent hydrocarbon group; $Ra^1$ to $Ra^3$ are each independently a hydrocarbon group; and n is 0 or 1;

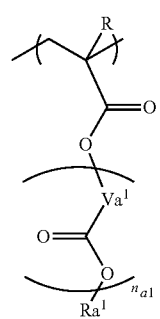

(a1-1)

wherein R is a hydrogen atom, an alkyl group with 1 to 5 carbon atoms or a halogenated alkyl group with 1 to 5 carbon atoms, $Va^1$ is a divalent hydrocarbon group which may have an ether bond, a urethane bond, or an amide bond, $n_{a1}$ is an integer of 0 to 2, $Ra^1$ is an acid dissociable group which is represented by general formula (a1-r-2):

wherein $Ra'^4$, $Ra'^5$ and $Ra'^6$ are each independently a hydrocarbon group and $Ra'^5$ and $Ra'^6$ are bonded with each other to form a ring,; and * designates an atomic bond;

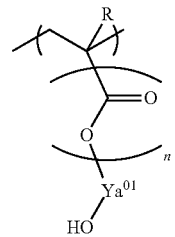

(a10-1)

wherein R is a hydrogen atom, an alkyl group with 1 to 5 carbon atoms, or a halogenated alkyl group with 1 to 5 carbon atoms; n is 0 or 1; and $Ya^{01}$ is a single bond, a divalent hydrocarbon group, or —C(=O)—.

2. The method for manufacturing a polymer compound according to claim 1, wherein the deprotection is performed at room temperature or lower.

* * * * *